(12) United States Patent
Watanabe et al.

(10) Patent No.: US 7,766,638 B2
(45) Date of Patent: Aug. 3, 2010

(54) TABLET PRODUCTION METHOD AND TABLET PRODUCTION APPARATUS

(75) Inventors: Yasushi Watanabe, Numazu (JP); Kimiaki Hayakawa, Shizuoka (JP); Eiichiro Hirota, Shizuoka (JP); Kiyoshi Morimoto, Mishima (JP)

(73) Assignee: Kyowa Hakko Kirin Co., Ltd., Ohtemachi, Chiyoda-ku, Tokyo (JP)

( * ) Notice: Subject to any disclaimer, the term of this patent is extended or adjusted under 35 U.S.C. 154(b) by 139 days.

(21) Appl. No.: 11/808,619

(22) Filed: Jun. 12, 2007

(65) Prior Publication Data

US 2008/0031989 A1    Feb. 7, 2008

Related U.S. Application Data

(62) Division of application No. 10/432,612, filed as application No. PCT/JP01/10663 on Dec. 6, 2001, now abandoned.

(30) Foreign Application Priority Data

Dec. 8, 2000    (JP) .............................. 2000-374331

(51) Int. Cl.
  *B29C 33/60* (2006.01)
  *B29C 43/08* (2006.01)
(52) U.S. Cl. ...................... 425/103; 425/107; 425/218; 425/345
(58) Field of Classification Search .................. 425/107, 425/103, 218, 135, 139, 148, 150, 78, 345
  See application file for complete search history.

(56) References Cited

U.S. PATENT DOCUMENTS

| | | |
|---|---|---|
| 4,373,888 A | 2/1983 | Yamamoto |
| 5,609,883 A | 3/1997 | Valentine |
| 5,700,492 A | 12/1997 | Morimoto |
| 6,079,968 A * | 6/2000 | Schmitz et al. ............... 425/96 |
| 6,776,361 B1 * | 8/2004 | Watanabe et al. ........... 222/195 |
| 6,884,054 B2 * | 4/2005 | Shimada .................... 425/107 |

FOREIGN PATENT DOCUMENTS

| | | |
|---|---|---|
| EP | 0 650 826 A1 | 11/1994 |
| JP | S41-111273 B | 6/1966 |
| JP | 56-14098 | 2/1981 |
| JP | 5 606 1228 | 5/1981 |
| JP | 58-222 17 | 2/1983 |
| JP | 6 336490 | 12/1994 |
| JP | 11-60507 | 3/1999 |
| JP | 11-100602 | 4/1999 |
| JP | 2000-280174 | 10/2000 |

* cited by examiner

*Primary Examiner*—Richard Crispino
*Assistant Examiner*—Thu Khanh T Nguyen
(74) *Attorney, Agent, or Firm*—Bacon & Thomas, PLLC

(57) ABSTRACT

A tablet production apparatus comprising a gas generator G, a lubricant powder discharge means 51 for discharging a lubricant powder into a gas generated from the gas generator G, depending on the supply of the gas from the gas generator G, and mixing the lubricant powder with the gas in dispersed state, a lubricant application means 91 for spraying the lubricant powder discharged from the lubricant powder discharge means 51 and mixed with the gas generated from the gas generation means G in dispersed state, onto each material contacting surface of a die, an upper punch and a lower punch, and an oxygen concentration measuring means 131*a* for measuring the oxygen concentration of the gas existing near the lubricant application means 91. The apparatus is designed such that the amount of the gas supplied into the lubricant application means is adjusted based on the oxygen concentration measured by the oxygen concentration measuring means 131*a*.

2 Claims, 36 Drawing Sheets

Vth1a : threshold of oxygen concentration capable of normally working
Vth2a : one threshold (oxygen concentration threshold)
Vth3a : other threshold (oxygen concentration threshold to automatically stop operation)

Vth1b : threshold of oxygen concentration lower explosion limit capable of normally working
Vth2b : one threshold (concentration threshold of lower explosion limit to announce an alarm)
Vth3b : other threshold (concentration threshold of lower explosion limit to automatically stop operation)

Explosion Limit Oxygen Concentration Test Result

1. Test Condition
   ① Test is executed under normal temperature and normal pressure.
   ② Diluted gas is Nitrogen.
   ③ Oxygen concentration is 21% at highest and 18% 15%, and 12%.
   If explosion is occurred at 12%, 1more % is reduced. If no explosion,
   1 more % is increased.
   ④ Specimen isn't screened.
   ⑤ Lower explosion limit is obtained under each oxygen concentration.
2. Test Method
   ① Fixed amount of specimen is weighed and equivalently placed on the specimen tray
   ② Explosion cylinder made of glass is set, a filter is intervened at the upper part of the cylinder, and a purge nozzle is inserted into the lower part of the cylinder breaking through the filter.
   ③ Purge valve is opened, air with a predetermined concentration is blown in, and the air in the cylinder is displaced.
   ④ Purge nozzle is pulled out and the filter is sealed.
   ⑤ Specimen is dispersed at the pressure mentioned in ⑦, and ignition is confirmed by an eye by means of the discharge electrode.
   ⑥ When the fire exceeds the marking line provided 100mm above the discharge electrode, it was determined to be caught fired.
   ⑦ Blow up pressure of air is 0.70 Kgf/cm2.
3. System Construction

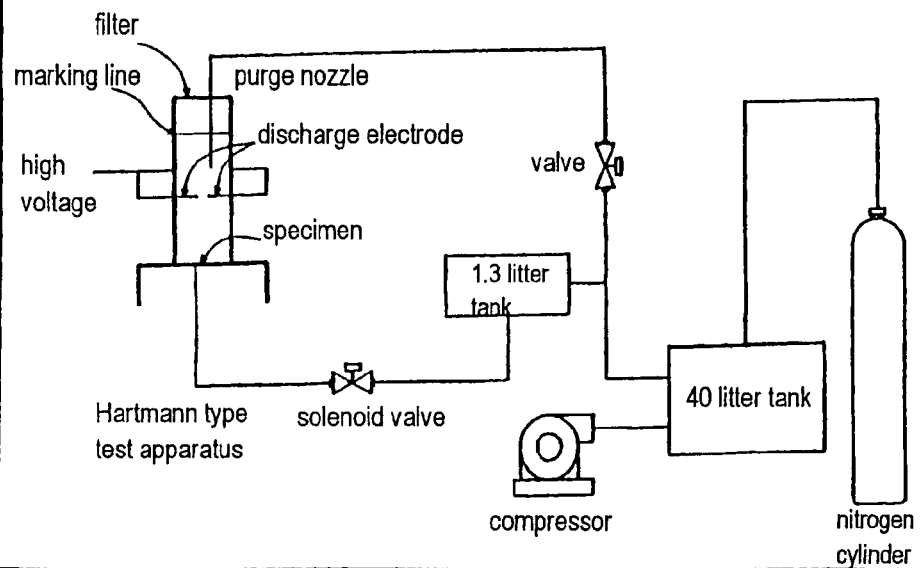

*Fig. 4*

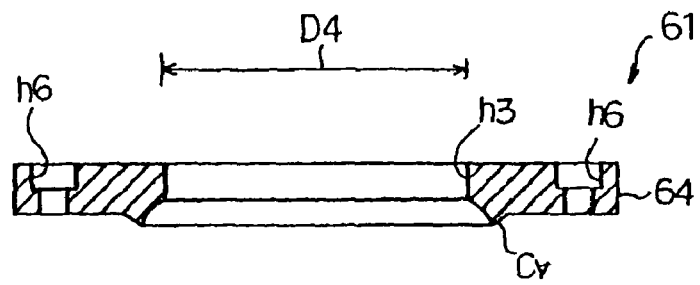
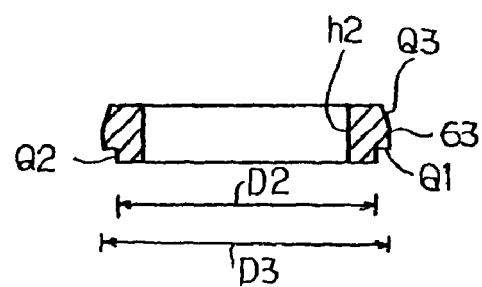
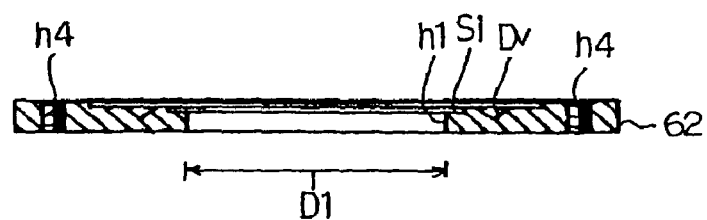
Fig. 17

TABLET PRODUCTION METHOD AND TABLET PRODUCTION APPARATUS

CROSS-REFERENCE TO RELATED APPLICATION

This application is a Divisional based on U.S. application Ser. No. 10/432,612 filed on Sep. 15, 2003, which is the U.S. National Stage proceeding of PCT/JP01/10663 filed on Dec. 6, 2001, and which claims the benefit of Japanese application 2000-374331 filed on Dec. 8, 2000.

TECHNICAL FIELD

The present invention relates to a tablet production method and to a tablet production apparatus, more specifically to a tablet production method wherein tablets are produced by an external lubrication method in an industrially profitable manner and the countermeasure for a dust explosion in carrying out the tablet production method is adequately taken and to a production apparatus applicable for executing the tablet production method.

BACKGROUND ART

An intrabuccally rapidly disintegrating tablet has been noticed recently, which is produced by reducing a lubricant powder included therein or by excluding a lubricant powder therein at all in order to quicken the disintegration time of the tablet so that the tablet can be disintegrated in the buccal cavity when contacting with saliva.

As a production method of such an intrabuccally rapidly disintegrating tablet, already disclosed is a method wherein a lubricant powder is applied on each material contacting surface of a die, an upper punch and a lower punch of a rotary tabletting machine and a molding material is compressed with the lubricated die, upper punch and lower punch (namely an external lubrication method, see JP-B-41-11273, JP-A-56-14098 and JP-A-7-124231).

The tablet production method described in JP-B-41-11273 comprises the steps of charging a fixed amount of material to be tableted in a die, tabletting by compressing the material charged in the die with a pair of an upper punch and a lower punch, and discharging the produced tablet. In a pre-step before charging the molding material in the die, a spray nozzle is provided at a predetermined position above the die for spraying a lubricant, and a lubricant is sprayed from the nozzle to apply the lubricant on a lower surface of the upper punch ("lower surface of upper punch" is called "material contacting surface of upper punch" in this specification) and an upper surface of the lower punch ("lower surface of lower punch" is called "material contacting surface of lower punch" in this specification), both punches corresponding to the die which has come to the position where the nozzle is provided. Then the molding material is charged in the die and is compressed to produce a tablet with the upper punch of which the material contacting surface is applied with the lubricant and the lower punch of which material contacting surface is applied with the lubricant to produce a tablet.

According to the tablet production method described in JP-A-56-14098, in a pre-step before charging a molding material in the die, a diffuser for diffusing a lubricant and a nozzle for spraying air are provided at a predetermined place above a die and a lubricant is diffused on the die which has come to where the diffuser is provided before charging a molding material in the die, thereby placing the lubricant on the material contacting surface of a lower punch provided corresponding to the die. Then a compressed air is injected on the lower punch from the nozzle at the position where the nozzle is provided, thereby blowing up the lubricant placed on the material contacting surface of the lower punch. The blown lubricant is applied on an inner circumference of the die and a material contacting surface of an upper punch. (In this specification "inner circumference of die" is called "material contacting surface of die". Strictly, "material contacting surface of die" refers to the inner circumferential wall of the die which is above the material contacting surface of the lower punch inserted in a predetermined position in the die.) Next, the molding tablet is produced by compressing the molding material using the die, the upper punch and the lower punch of which material contacting surfaces are applied with a lubricant.

According to the tablet production method described in JP-A-7-124231, a spray chamber connected with a pulsating vibration air generator and provided with a spray nozzle for spraying a lubricant is provided above a die. At a pre-step of charging a molding material in the die, the pulsating vibration air generator is driven to generate a pulsating vibration air in the spray chamber when the die comes to the position where the spray chamber is provided, a lubricant is sprayed from the spray nozzle on each material contacting surface of the die, an upper punch and a lower punch, then the molding material is charged in the die, and the charged molding material is compressed to produce a tablet using the upper punch and the lower punch of which the material contacting surfaces are applied with the lubricant.

Although the production methods disclosed in JP-B-41-11273, JP-A-56-14098 and JP-A-7-124231 are practicable for producing experimentally or producing a small amount of tablets, they have a room for improvement for producing a tablet stably for a long time to meet the requirement of industrial production base.

In addition, the inventors of the present invention have had a fear that in case of constructing a large scale tablet production apparatus suitable for industrial production base, a lubricant powder may cause a dust explosion while producing a tablet with such a apparatus.

DISCLOSURE OF THE INVENTION

The present invention is proposed to solve the above-mentioned problems, and the object of the invention is to provide a tablet production method in which tablets are stably produced for a long time to meet the requirement for profitable industrial production base and there is no fear of dust explosion in case of constructing a large scale tablet production apparatus suitable for industrial production base and to provide a tablet production apparatus to execute the method.

The inventors of the present invention have been engaged in the development of a rapidly disintegrating tablet which is quickly disintegrated in a desired place such as an intrabuccally rapidly disintegrating tablet which can be quickly disintegrated in the buccal cavity when contacting with saliva and in the development of an production apparatus for producing such a rapidly disintegrating tablet. They have completed a production apparatus which can be executed in industrial production base.

Further, the inventors have thought that there may be a fear of a dust explosion in the production apparatus or around the production apparatus (such as in a factory where the apparatus is provided) because a powder material is used for producing such a tablet when a large amount of externally lubricated tablets is produced by such a production apparatus.

Therefore, they have analyzed the cause of a dust explosion for reviewing the countermeasure for the apparatus which is suitable for profitable industrial production.

FIG. 36 shows the characteristic causes of a dust explosion.

As shown in FIG. 36, a dust explosion is happened by all of the three causes such as existence of oxygen, existence of combustible material and existence of an ignition source. If one of them is missing, a dust explosion isn't caused.

The inventors of the present invention have reached the present invention by taking countermeasures for removing the three causes for a dust explosion in a new industrially profitable production method wherein a lubricant powder is applied on each material contacting surface of a die, an upper punch and a lower punch and a molding material is compressed to be molded with the die, the upper punch and the lower punch with their material contacting surfaces lubricated and in a new tablet production apparatus for executing the new production method.

(1) A tablet production method comprising the steps of: gas generating step for generating a gas from a gas generation means; lubricant dispersing step for supplying the gas generated from the gas generation means into a lubricant powder discharge means, the discharge means discharging the lubricant powder into the gas for mixing the lubricant powder with the gas in dispersed state, depending on the supply of the gas, thereby discharging the lubricant powder into the gas generated from the gas generation means from the lubricant powder discharge means to mix the lubricant powder with the gas in dispersed state; pneumatic transporting step for pneumatically transporting the lubricant powder mixed with the gas in dispersed state at the lubricant dispersing step into a lubricant application means, the lubricant application means spraying the lubricant powder onto each material contacting surface of a die, an upper punch and a lower punch; lubricant powder applying step for spraying the lubricant powder mixed with the gas in dispersed state onto each material contacting surface of the die, the upper punch and the lower punch by the lubricant application means; and tabletting step for compressing a molding material with the die, the upper punch and the lower punch, on each material contacting surface of which the lubricant powder is applied, wherein the oxygen concentration in the gas existing in transporting system and/or near the lubricant application means is set equal to or less than a lower explosion limit concentration, the system including the gas generation means and the lubricant application means as its initial and end transporting system.

"Lubricant" used in the specification refers to a stearic adjuvant added for reducing the friction between the die and the punches while compressing (tabletting) the molding material and for preventing tabletting problems such as sticking, capping and laminating, example of which include, stearic acid, aluminum stearate, calcium stearate, magnesium stearate, sucrose esters of fatty acid, sodium stearyl phthalamate, talc and so on.

"Lower explosion limit oxygen concentration" in the specification refers to the upper oxygen concentration wherein a dust explosion isn't happened even if an ignition energy is applied when a combustible material with enough concentration for explosion (lubricant powder in the specification) exists.

"Lubricant powder discharge means, discharging the lubricant powder into the gas for mixing the lubricant powder with the gas in dispersed state, depending on the supply of the gas" refers to a lubricant powder discharge means in which its discharging mechanism of the lubricant powder depends on the gas and a lubricant powder is mixed and dispersed with the gas used for discharging the lubricant powder.

More specifically, "lubricant powder discharge means discharging the lubricant powder into the gas generated from the gas generation means from the lubricant powder discharge means to mix the lubricant powder with the gas in dispersed state, depending on the supply of the gas", mentioned is a newly constructed device which is constructed such that an elastic membrane having a penetrating aperture is provided at the bottom of a lubricant powder container. The elastic membrane is vibrated up and down with its center being an antinode of vibration and its peripheral being a node of vibration by supplying a pneumatic transportation gas under the elastic membrane (the gas flow may be a steady pressure flow or a pulsating vibration flow). The lubricant powder placed on the elastic membrane is discharged through its penetrating aperture into the gas flow under the membrane to be mixed and dispersed with the flow.

The amplitude and frequency of the vibration of the elastic membrane with a penetrating aperture are defined by the property (pressure, flow amount and so on) of the gas flow for pneumatic transportation (the gas flow may be a steady pressure flow or a pulsating vibration flow) which is supplied under the elastic membrane. The amount of lubricant powder discharged from the penetrating aperture of the elastic membrane is defined by the vibration amplitude and vibration frequency of the elastic membrane when the size and shape of the aperture are the same. Therefore, if the condition of the gas flow for pneumatic transportation (the gas flow may be a steady pressure flow or a pulsating vibration flow) supplied under the elastic membrane having a penetrating aperture is constant, the lubricant powder is pneumatically transported with a constant concentration while always being mixed and dispersed with the gas flow for pneumatic transportation (the gas flow may be a steady pressure flow or a pulsating vibration flow).

"Transporting system including the gas generation means and the lubricant application means as its initial and end instruments" refers to a conduit airtightly connecting the gas generation means, the lubricant powder discharge means, and the lubricant application means in order.

"Oxygen concentration in the gas existing near the lubricant application means" refers to the oxygen concentration in the gas in the space where the gas discharged from the lubricant application means is admixed with air (normal air including oxygen), more specifically in the gas in the space between a port for spraying a lubricant on the upper punch of the tabletting machine and the material contacting surface of the upper punch or in the gas in the space formed by a port for spraying lubricant on the lower punch of the lubricant application means, the die and the lower punch inserted in a predetermined position in the die.

According to this tablet production method, the lubricant powder is discharged in the gas depending on the gas to be mixed and dispersed with the gas so that a fixed amount of lubricant powder can be mixed and dispersed with a fixed amount of gas as far as the gas to be mixed and dispersed with the lubricant powder is constant.

Thus, according to the tablet production method, the lubricant powder with a constant concentration is always supplied to the lubricant application means, enabling a constant application of a fixed amount of lubricant powder on each material contacting surface of the die, the upper punch and the lower punch.

Because of applying a fixed amount of lubricant powder on the material contacting surfaces of the die and the punches, once the gas generation amount (flow amount, pressure and so on) to be mixed and dispersed with the lubricant powder is determined so as to make the lubricant powder amount applied on the material contacting surfaces thereof most suitable, the amount of lubricant powder on the surfaces can be kept most appropriately by making the gas generation amount constant.

As the result, once the gas generation amount (flow amount, pressure and so on) to be mixed and dispersed with the lubricant powder is controlled so as not to cause tabletting problems such as sticking, capping and laminating and not to generate griding between the die, the upper punch and the lower punch, tablets are stably produced for a long time only by keeping the gas generation amount constant without causing the tabletting problems and the griding.

As mentioned above, the tablet production method is suitable for producing tablets (externally lubricated tablets) at profitable industrial production base.

In addition, according to the tablet production method, the oxygen concentration in the transporting system from the gas generation means to the lubricant application means is under the oxygen concentration of a lower explosion limit, and a dust explosion in the transporting system can be prevented.

Further, according to the tablet production method, if the oxygen concentration contained in the gas around the lubricant application means is under the oxygen concentration of a lower explosion limit, a dust explosion around the lubricant application means is prevented.

(2) According to other embodiment of the tablet production method of the present invention, the oxygen concentration in the gas existing in the system and/or near the lubricant application means of the tablet production method of (1) is set equal to or less than 14%, the system including the gas generation means and the lubricant application means as its initial and end instruments.

In this production method, the oxygen concentration of a lower explosion limit of the lubricant powder is practically defined. The oxygen concentration in the system from the gas generation means to the lubricant application means is defined to be equal to or less than 14%, thereby preventing a dust explosion in the transporting system.

Further, because of the oxygen concentration of 14% in the gas around the lubricant application means, a dust explosion around the lubricant application means is prevented.

In order to prevent a dust explosion in the system from the gas generation means to the lubricant application means and/or around the lubricant application means, the oxygen concentration in the system and/or around the lubricant application means is preferably equal to or less than 13%, more preferably equal to or less than 12%, and still more preferably equal to or less than 12%.

On the other hand, the oxygen concentration of explosion limit is ideally 0%, therefore it goes without saying that the lower limit thereof is equal to or over 0% so as not to cause a dust explosion.

(3) According to other embodiment of the tablet production method of the present invention, the oxygen concentration in the gas existing in the system and/or near the lubricant application means of the tablet production method of (1) is set equal to or less than 8%, the system including the gas generation means and the lubricant application means as its initial and end instruments.

Static safety guide by the National Institute of Industrial Safety recommends keeping the oxygen concentration equal to or less than 8% in order not to cause a dust explosion when the oxygen concentration of lower explosion limit is equal to or above 13% and equal to or less than 14%.

Supposing the oxygen concentration of lower explosion limit is equal to or less than 14%, the oxygen concentration contained in the gas existing in the system from the gas generation means to the lubricant application means and/or around the lubricant application means is set to be equal to or less than 8% in order to clear the static safety guide by the National Institute of Industrial Safety in the tablet production method, thereby preventing dust explosion.

Further, the static safety guide by the National Institute of Industrial Safety recommends keeping the oxygen concentration less than 5% in order not to cause a dust explosion when the oxygen concentration of lower explosion limit is equal to or above 11% and equal to or less than 12%.

Therefore, considering the static safety guide by the National Institute of Industrial Safety, it is more preferable to set the oxygen concentration contained in the gas existing in the system from the gas generation means to the lubricant application means and/or around the lubricant application means equal to or less than 5% in the tablet production method.

It goes without saying that the lower limit of the oxygen concentration contained in the gas is equal to or above 0%.

(4) A tablet production method comprising the steps of:

gas generating step for generating a gas from a gas generation means; lubricant dispersing step for supplying the gas generated from the gas generation means into a lubricant powder discharge means, the discharge means discharging the lubricant powder into the gas for mixing the lubricant powder with the gas in dispersed state, depending on the supply of the gas, thereby discharging the lubricant powder into the gas generated from the gas generation means from the lubricant powder discharge means to mix the lubricant powder with the gas in dispersed state; pneumatic transporting step for pneumatically transporting the lubricant powder mixed with the gas in dispersed state at the lubricant dispersing step into a lubricant application means, the lubricant application means spraying the lubricant powder onto each material contacting surface of a die, an upper punch and a lower punch; lubricant powder applying step for spraying the lubricant powder mixed with the gas in dispersed state onto each material contacting surface of the die, the upper punch and the lower punch by the lubricant application means; tabletting step for compressing a molding material with the die, the upper punch and the lower punch, on each material contacting surface of which the lubricant powder is applied; and surplus lubricant powder suction step for sucking surplus lubricant powder by a suction means, the surplus lubricant powder being such lubricant powder that hasn't been applied on each material contacting surface of the die, the upper punch and the lower punch, of all the lubricant powders that have been sprayed thereonto at the lubricant powder applying step by the lubricant application means; wherein the lubricant powder concentration in the suction means is set equal to or less than a lower explosion limit concentration.

"Lower explosion limit concentration" in the specification refers to the lowest concentration wherein a combustible material (lubricant powder in this specification) causes a fire diffusion when enough ignition energy is applied in atmosphere.

"Lubricant powder concentration in the suction means" specifically means the lubricant powder concentration in parts constructing the suction means such as a suction duct (conduit) when a lubricant powder is mixed and dispersed with the gas admixed with air.

This tablet production method comprises the gas generating step, the lubricant discharging step and the compressing step same as those in the embodiment of the present invention (1).

Therefore, this production method is also suitable for a production method of a tablet (externally lubricated tablet) at an industrial production base like the embodiment (1).

In addition, the lubricant powder concentration in the suction means at the surplus lubricant powder sucking step is set under the concentration of lower explosion limit, thereby preventing a dust explosion in the suction means.

(5) In other embodiment of the tablet production method, the lubricant powder concentration in the suction means of the tablet production method (4) is equal to or less than 70 g/m$^3$.

According to this embodiment, the concentration of lower explosion limit of the lubricant powder in the suction means is specifically defined at the surplus lubricant sucking step to be equal to or under 70 g/m$^3$, more preferably equal to or under 50 g/m$^3$, thereby preventing a dust explosion in the suction means.

(6) According to other embodiment of the tablet production method, a noninflammable gas is used as the gas supplied to the lubricant powder discharge means at the lubricant dispersing step of the above-mentioned embodiments (1)-(5).

"Noninflammable gas" used in the specification refers to the gas mainly comprised of nitrogen ($N_2$) in which a fixed amount of oxygen ($O_2$) gas is removed from air, and to inert gas such as nitrogen ($N_2$) gas, helium (He) gas, and argon (Ar) gas.

In this tablet production method, noninflammable gas is used as a supply gas to the lubricant powder discharge means at the lubricant dispersing step so that a dust explosion isn't happened at all in a place (in the instrument) where the gas mixed and dispersed with the lubricant powder doesn't admix with air.

(7) According to other embodiment of the tablet production method, a pulsating vibration gas is used as the gas supplied to the lubricant powder discharge means at the lubricant dispersing step of any one of the above-mentioned embodiments (1)-(6).

In this embodiment, the lubricant powder discharge means for discharging a lubricant powder into the gas depending on the gas to be mixed and dispersed with the gas is used as a lubricant powder discharge means.

Therefore, when the pulsating vibration gas is used as a supply gas to the lubricant powder discharge means, the amount of lubricant powder discharged from the lubricant powder discharge means depends on the frequency, amplitude and wave shape of the pulsating vibration gas.

According to this tablet production method, when the frequency, amplitude and wave shape of the pulsating vibration gas are constant, a fixed amount of lubricant powder is designed to be always mixed and dispersed with a fixed amount of gas, thereby enabling to supply the lubricant powder with a constant concentration to the lubricant application means.

Thus the lubricant powder with a constant concentration is always supplied to the lubricant application means so that a fixed amount of lubricant powder can be always applied on each material contacting surface of the die, the upper punch and the lower punch.

Namely, a fixed amount of lubricant powder can be applied on those material contacting surfaces with this tablet production method. When the frequency, amplitude and wave shape of the pulsating vibration gas are once determined in such a manner that the amount of lubricant powder to be applied on the material contacting surfaces is designed to be most appropriate, the appropriate amount of lubricant powder applied on the surfaces can be kept only by keeping the frequency, amplitude and wave shape of the pulsating vibration gas constant.

As the result, according to this tablet production method, the frequency, amplitude and wave shape of the pulsating vibration gas are once controlled in such a manner that the lubricant powder amount to be applied on each material contacting surface of the die, the upper punch and the lower punch is adjusted so as not to cause tabletting problems such as sticking, capping and laminating and not to cause griding between the die and the punches. Thereafter, tablets can be stably produced for a long time without causing such tabletting problems for the produced tablets and griding between the die and punches only by keeping the frequency, amplitude and wave shape of the pulsating vibration gas and also keeping the constant amount of lubricant powder to be applied on the material contacting surfaces of the die and punches.

Therefore, a tablet (externally lubricated tablet) can be produced with this production method at an industrial production base.

(8) According to other embodiment of the tablet production method of the present invention, an antistatic means is further provided for any one of the above mentioned embodiments (1)-(7).

When the lubricant powder mixed and dispersed with the gas is transported in piping and instruments, the piping and instruments are charged with static electricity. If the static electricity charged with them is left as it is, sparks are caused and it may be a trigger of a dust explosion.

According to this tablet production method, an antistatic means is provided for the apparatus to execute the above-mentioned methods (1)-(7), thereby preventing sparks caused by static electricity.

Herewith, a dust explosion isn't happened in this tablet production method.

An easiest antistatic means is earthening (by earth) the transporting system for executing the pneumatic transporting step of the lubricant powder. Or a coating compound including an antistat solution or antistat such as cation activator may be painted at least on the transporting system for executing the pneumatic transporting step of the lubricant powder as an antistatic means.

(9) A tablet production apparatus comprising: a gas generator; a lubricant powder discharge means for discharging a lubricant powder into a gas generated from the gas generator for mixing the lubricant powder with the gas in dispersed state, depending on the supply of the gas generated from the gas generator; a lubricant application means for spraying the lubricant powder discharged from the lubricant powder discharge means and mixed with the gas from the gas generator in dispersed state onto each material contacting surface of a die, an upper punch and a lower punch; and an oxygen concentration measuring means for measuring the oxygen concentration of the gas existing in transporting system and/or near the lubricant application means, the system including the gas generator and the lubricant application means as its initial and end instruments, wherein the oxygen concentration in the gas existing in the system and/or near the lubricant application means is adjusted based on the oxygen concentration measured by the oxygen concentration measuring means, the system including the gas generation means and the lubricant application means as its initial and end instruments.

"Lubricant powder discharge means for discharging a lubricant powder into a gas generated from the gas generation means for mixing the lubricant powder with the gas in dispersed state, depending on the supply of the gas generated from the gas generator" in this specification refers to a lubricant powder discharge means in which its discharge mechanism of the lubricant powder depends on the gas and the lubricant powder is mixed and dispersed with the gas used for discharging the lubricant powder.

More specifically, "lubricant powder discharge means for discharging a lubricant powder into a gas generated from the gas generation means for mixing the lubricant powder with the gas in dispersed state, depending on the supply of the gas generated from the gas generator" refers to a newly constructed device constructed such that an elastic membrane having a penetrating aperture is provided at the bottom of a lubricant powder container. The elastic membrane is vibrated up and down with its center being an antinode of vibration and its peripheral being a node of vibration by supplying gas for pneumatic transportation under the elastic membrane (the gas flow may be a steady pressure flow or a pulsating vibration flow). The lubricant powder placed on the elastic membrane is discharged through its penetrating apertures into the gas flow under the membrane to be mixed and dispersed therewith.

The amplitude and frequency of the vibration of the elastic membrane with a penetrating aperture are defined by the property (pressure, flow amount and so on) of the gas flow for pneumatic transportation (the gas flow may be a steady pressure flow or a pulsating vibration flow) which is supplied under the elastic membrane. The amount of lubricant powder discharged from the penetrating apertures of the elastic membrane is defined by the vibration amplitude and vibration frequency of the elastic membrane when the size and shape of the aperture are the same. Therefore, if the gas flow for pneumatic transportation (the gas flow may be a steady pressure flow or a pulsating vibration flow) supplied under the elastic membrane having a penetrating aperture is constant, the lubricant powder is pneumatically transported while always being mixed and dispersed with the gas flow for pneumatic transportation (the gas flow may be a steady pressure flow or a pulsating vibration flow) with a constant concentration.

"Transporting system including the gas generation means and the lubricant application means as its initial and end instruments" refers to a conduit airtightly connecting the gas generation means, the lubricant powder discharge means, the lubricant application means in order.

"Oxygen concentration in the gas existing near the lubricant application means" refers to the oxygen concentration in the gas in the space where the gas discharged from the lubricant application means is admixed with air (normal air including oxygen), more specifically in the gas in the space between a port for spraying lubricant on the upper punch of the lubricant application means and the material contacting surface of the upper punch or in the gas in the space formed by a port for spraying lubricant on the lower punch of the lubricant application means, the die and the lower punch inserted in a predetermined position in the die.

Noninflammable gas is generated from the gas generation means.

This tablet production method uses the lubricant powder discharge means for discharging the lubricant powder into the gas depending on the gas generated from the gas generation means to be mixed and dispersed with the gas so that a fixed amount of lubricant powder can be mixed and dispersed with a fixed amount of gas as far as the generation amount of gas (flow amount, pressure and so on) generated from the gas generation means is constant.

Thus, according to this tablet production method, the lubricant powder with a constant concentration is always supplied to the lubricant application means, enabling a constant application of a fixed amount of lubricant powder on each material contacting surface of the die, the upper punch and the lower punch.

Because of applying a fixed amount of lubricant powder on the material contacting surfaces of the die and punches, once the gas generation amount (flow amount, pressure and so on) generated from the gas generation means is determined so as to make the lubricant powder amount applied on the material contacting surfaces thereof most suitable, the amount of lubricant powder applied on the surfaces can be kept most appropriately by making the gas generation amount (flow amount, pressure and so on) constant.

As the result, once the gas generation amount (flow amount, pressure and so on) generated from the gas generation means is controlled so as not to cause tabletting problems such as sticking, capping and laminating and not to generate griding between the die, the upper punch and the lower punch, tablets are stably produced for a long time only by keeping the gas generation amount (flow amount, pressure and so on) constant without causing the tabletting problems and the griding.

As mentioned above, the tablet production method is suitable for producing tablets (externally lubricated tablets) at an industrial production base.

In addition, according to the tablet production method, the gas amount generated from the gas generation means is controlled based on the oxygen concentration measured by the oxygen concentration measuring means.

Therefore, when a noninflammable gas is generated from the gas generation means, air in the space in the transporting system from the gas generation means to the lubricant application means and air (normal air including oxygen) around the lubricant application means are exchanged with the noninflammable gas.

If all or a part of the air in the space in the system from the gas generation means to the lubricant application means and/or all or a part of the air (normal air including oxygen) around the lubricant application means are exchanged with the noninflammable gas to reduce the oxygen amount in the gas existing in those spaces, a dust explosion is prevented in the space in the lubricant application means, in the space between the lubricant spray port for upper punch of the lubricant application means and the material contacting surface of the upper punch, or in the space formed by the lubricant spray port for lower punch of the lubricant application means, the die and the lower punch inserted in a predetermined position in the die.

Namely, this tablet production apparatus is constructed such that the gas amount generated from the gas generation means is controlled based on the oxygen concentration measured by the oxygen concentration measuring means so that the oxygen amount contained in the gas existing in the space in the transporting system from the gas generation means to the lubricant application means and the oxygen amount contained in the gas existing in the space around the lubricant application means are reduced. Therefore, dust explosion is prevented from causing in those spaces.

(10) According to other embodiment of the tablet production apparatus of the present invention, the oxygen concentration in the gas existing in the system and/or near the lubricant application means in the above-mentioned embodiment (9) is set equal to or less than the oxygen concentration of explosion limit, the system including the gas generation means and the lubricant application means as its initial and end instruments.

In this tablet production apparatus, the oxygen concentration in the gas in the system from the gas generation means to the lubricant application means or near the lubricant application means is equal to or less than the oxygen concentration of explosion limit by the gas amount generated from the gas generation means, thereby preventing a dust explosion in the transporting system or around the lubricant application means.

(11) According to other embodiment of the tablet production apparatus of the present invention, the oxygen concentration in the gas existing in the system and/or near the lubricant application means in the above-mentioned embodiment (9) is set equal to or less than 14%, the system including the gas generation means and the lubricant application means as its initial and end instruments.

In this production apparatus, the oxygen concentration in the gas around the lubricant application means is practically defined. The oxygen concentration in the system from the gas generation means to the lubricant application means and/or around the lubricant application means is defined to be equal to or less than the oxygen concentration of explosion limit, namely 14%, thereby preventing a dust explosion in the system and/or around the lubricant application means.

In order to prevent a dust explosion in the system from the gas generation means to the lubricant application means and/or near the lubricant application means, the oxygen concentration in the gas in the system and/or near the lubricant application means is preferably equal to or less than 13%, more preferably equal to or less than 12%, and still more preferably equal to or less than 12%.

On the other hand, the oxygen concentration of explosion limit is ideally 0%, therefore the lowest limit thereof is equal to or over 0% so as not to cause a dust explosion.

(12) According to other embodiment of the tablet production apparatus of the present invention, the oxygen concentration in the gas existing in the system and/or near the lubricant application means in the above-mentioned embodiment (9) is equal to or less than 8%, the system including the gas generation means and the lubricant application means as its initial and end transporting system.

Static safety guide by the National Institute of Industrial Safety recommends keeping the oxygen concentration equal to or less than 8% in order not to cause a dust explosion when the oxygen concentration of explosion limit is equal to or above 13% and equal to or less than 14%.

Supposing the oxygen concentration of lower explosion limit is equal to or less than 14%, the oxygen concentration contained in the gas existing in the system from the gas generation means to the lubricant application means and/or near the lubricant application means is set to be equal to or less than 8% in order to clear the static safety guide by the National Institute of Industrial Safety in the tablet production method, thereby preventing a dust explosion in the system and/or around the lubricant application means.

Further, the static safety guide by the National Institute of Industrial Safety recommends keeping the oxygen concentration equal to or less than 5% in order not to cause a dust explosion when the oxygen concentration of explosion limit is equal to or above 11% and equal to or less than 12%.

Therefore, considering the static safety guide by the National Institute of Industrial Safety, it is more preferable to set the oxygen concentration contained in the gas existing in the transporting system from the gas generation means to the lubricant application means and/or around the lubricant application means equal to or less than 5% in the tablet production method.

It goes without saying that the lower limit of the oxygen concentration contained in the gas existing in the transporting system from the gas generation means to the lubricant application means and/or around the lubricant application means is equal to or above 0% because the ideal oxygen concentration therein is ideally 0%.

(13) Other embodiment of the tablet production apparatus according to the present invention comprises a gas generator; a lubricant powder discharge means for discharging a lubricant powder into a gas generated from the gas generator for mixing the lubricant powder with the gas in dispersed state, depending on the supply of the gas generated from the gas generator; a lubricant application means for spraying the lubricant powder discharged from the lubricant powder discharge means and mixed with the gas generated from the gas generator in dispersed state onto each material contacting surface of a die, an upper punch and a lower punch; a suction means for sucking thereinto the lubricant powder sprayed from the lubricant application means; and a lubricant powder concentration measuring means provided in the suction means, for measuring a lubricant powder concentration sucked into the suction means, whereby the concentration of the lubricant powder to be sucked into the suction means is adjusted based on the lubricant powder concentration measured by the lubricant powder concentration measuring means.

According to this tablet production apparatus, the lubricant powder sprayed from the lubricant application means is immediately sucked by means of the suction means. Therefore, the lubricant powder sprayed from the lubricant spray port for upper punch of the lubricant application means to the material contacting surface of the upper punch doesn't scatter around the lubricant application means, thereby preventing a dust explosion around the lubricant application means.

In addition, the concentration of the lubricant powder to be supplied in the suction means (more specifically in the suction duct of the suction means) is controlled based on the lubricant powder concentration measured by the lubricant powder concentration measuring means. Hence, the concentration of the lubricant powder to be supplied in the suction means (more specifically in the suction duct of the suction means) is set to be equal to or under the lower explosion limit concentration, preventing a dust explosion in the suction means (more specifically in the suction duct of the suction means).

(14) According to other embodiment of the tablet production apparatus, the lubricant powder concentration to be sucked into the suction means (more specifically in the suction duct of the suction means) in the embodiment (13) is equal to or less than a lower explosion limit concentration.

In this tablet production apparatus, because the concentration of the lubricant powder to be supplied into the suction means (more specifically in the suction duct of the suction means) is equal to or less than the lower explosion limit so that a dust explosion isn't caused in the suction means (more specifically in the suction duct of the suction means).

(15) Other embodiment of the tablet production apparatus is characterized in that the lubricant powder concentration to be sucked into the suction means in the embodiment (13) is equal to or less than 70 $g/m^3$.

According to this tablet production apparatus, the concentration of lower explosion limit of the lubricant powder to be supplied in the suction means in the embodiment (13) is specifically defined to be equal to or under 70 $g/m^3$, more preferably equal to or under 50 $g/m^3$. Therefore, when a tablet is produced with the production apparatus, a dust explosion is prevented in the suction means (more specifically in the suction duct of the suction means).

(16) According to other embodiment of the tablet production apparatus, the gas generator in any one of the embodiments (9)-(15) generates a noninflammable gas therefrom.

In this embodiment, a noninflammable gas is generated from the gas generation means as the gas to be mixed and dispersed with the lubricant powder, preventing a dust explosion in the transporting system from the gas generation means to the lubricant application means.

(17) According to other embodiment of the tablet production apparatus, the gas generator in any one of the embodiments (9)-(16) generates a pulsating vibration gas therefrom.

In this embodiment, the pulsating vibration gas is used as a supply gas to be mixed and dispersed with the lubricant powder, and the amount of lubricant powder depends on the frequency, amplitude and wave shape of the pulsating vibration gas.

According to this tablet production apparatus, when the frequency, amplitude and wave shape of the pulsating vibration gas used for mixing and dispersing with the lubricant powder are constant, a fixed amount of lubricant powder is designed to be always mixed and dispersed with a fixed amount of gas, thereby enabling to supply the lubricant powder with a constant concentration to the lubricant application means.

Thus a fixed amount of lubricant powder is always supplied to the lubricant application means so that a fixed amount of lubricant powder can be always applied on each material contacting surface of the die, the upper punch and the lower punch under a constant condition.

Namely, a fixed amount of lubricant powder can be applied on each material contacting surfaces of the die, the upper punch and the lower punch with this tablet production method. When the frequency, amplitude and wave shape of the pulsating vibration gas are once determined in such a manner that the amount of lubricant powder to be applied on the material contacting surfaces makes most suitable, the appropriate amount of lubricant powder applied on the surfaces can be kept only by keeping the frequency, amplitude and wave shape of the pulsating vibration gas constant.

As the result, according to this tablet production apparatus, the frequency, amplitude and wave shape of the pulsating vibration gas are controlled in such a manner that the lubricant powder amount to be applied on each material contacting surface of the die, the upper punch and the lower punch is adjusted so as not to cause tabletting problems such as sticking, capping and laminating and not to cause griding between the die and the punches. Thereafter, tablets can be stably produced for a long time without causing such tabletting problems for the produced tablets and griding between the die and punches only by keeping the suitable frequency, amplitude and wave shape of the pulsating vibration gas and also keeping the suitable amount of lubricant powder to be applied on the material contacting surfaces of the die and punches.

Therefore, a tablet (externally lubricated tablet) can be produced with this production apparatus at an industrial production base.

(18) Other embodiment of the tablet production apparatus comprises: a gas generator; a lubricant powder discharge means for discharging a lubricant powder into a gas generated from said gas generator for mixing the lubricant powder with said gas in dispersed state, depending on the supply of said gas generated from said gas generator; a lubricant application means for spraying said lubricant powder discharged from said lubricant powder discharge means and mixed with said gas generated from said gas generator in dispersed state onto each material contacting surface of a die, an upper punch and a lower punch; a suction means for sucking thereinto said lubricant powder sprayed from said lubricant application means; and a spray amount measuring means for measuring the lubricant powder concentration at an optional point from said lubricant powder discharge means to said lubricant application means, whereby the flow amount to be sucked into said suction means is adjusted based on the lubricant powder concentration calculated from the amount of said lubricant powder measured by said spray amount measuring means and the flow amount sucked into said suction means and further the amount of the lubricant powder which is mixed with said gas generated from said gas generator in dispersed state is adjusted so as to make the concentration of said lubricant powder equal to or less than a lower explosion limit concentration, when said lubricant powder concentration reaches said lower explosion limit concentration.

In this tablet production apparatus, the lubricant powder concentration is observed by the lubricant powder amount measuring means. When it reaches its lower explosion limit concentration, the lubricant powder amount mixed and dispersed with the gas generated from the gas generation means is controlled to be under the lower explosion limit concentration, thereby preventing a dust explosion.

(19) According to other embodiment of the tablet production apparatus, the concentration of such lubricant powder as to be sucked into the suction means in the above-mentioned apparatus (18) is equal to or less than a lower explosion limit as predetermined.

In this tablet production apparatus, the concentration of the lubricant powder supplied into the suction means is equal to or less than the lower explosion limit concentration, thereby preventing a dust explosion in the suction means.

(20) According to other embodiment of the tablet production apparatus, the concentration of such lubricant powder as to be sucked into the suction means in the above-mentioned embodiment (19) is equal to or less thin 70 $g/m^3$.

According to this embodiment, the concentration of the lower explosion limit of the lubricant powder to be supplied in the suction means in the above-mentioned embodiment (19) is specifically defined to be equal to or under 70 $g/m^3$, more preferably equal to or under 50 $g/m^3$. Therefore, when a tablet is produced with this production apparatus, a dust explosion is prevented in the suction means (more specifically in the suction duct of the suction means).

(21) According to other embodiment of the tablet production apparatus, the gas generator in the above-mentioned embodiments in (18) or (19) generates a noninflammable gas therefrom.

In this embodiment, a noninflammable gas is generated from the gas generation means so that a dust explosion isn't caused at all in a place (instrument) where the gas mixing and dispersing the lubricant powder doesn't mix with air.

(22) According to other embodiment of the tablet production apparatus of the present invention, the gas generator in any one of the above-mentioned embodiments (18)-(21) generates a pulsating vibration gas therefrom.

In this embodiment, when the frequency, amplitude and wave shape of the pulsating vibration gas to be supplied in the lubricant powder discharge means are constant at the lubricant dispersing step, a fixed amount of lubricant powder is always mixed and dispersed with a fixed amount of gas, thereby achieving the above-mentioned corresponding system (7).

(23) According to other embodiment of the tablet production apparatus, an antistatic means is further equipped in any one of the above-mentioned embodiments (9)-(22).

In this production apparatus, the antistatic means is provided so as not to cause sparks derived from static electricity, thereby preventing sparks caused by static electricity.

Thus, such a tablet production apparatus doesn't generate a dust explosion while producing a tablet.

BRIEF DESCRIPTION OF DRAWINGS

FIG. 4 is an abridgement of an experimental method and its result carried out by Kabushikikaisha Kankyo Eisei Kenkyusho in order to obtain a practical value of a lower explosion limit concentration of a lubricant powder and that of an explosion limit oxygen concentration.

FIG. 13 is an explanatory detailed view of a lubricant storage hopper, FIG. 13b is a plane view showing a substantial part of the lubricant storage hopper shown in FIG. 13a.

FIG. 17 is a sectional view diagrammatically showing the construction of the elastic membrane installation means shown in FIG. 15.

FIG. 18 is a plane diagram showing a position of a pulsating vibration gas supply port provided for a dispersion chamber when the dispersion chamber is seen from top.

FIG. 19 is a plane diagram showing a position of a pulsating vibration gas supply port and its discharge port provided for a dispersion chamber when the dispersion chamber is seen from top.

BEST MODE FOR CARRYING OUT THE INVENTION

Now the present invention will be detailed referring to the attached drawings.

Preferred Embodiment of the Present Invention 1

Figure 1:
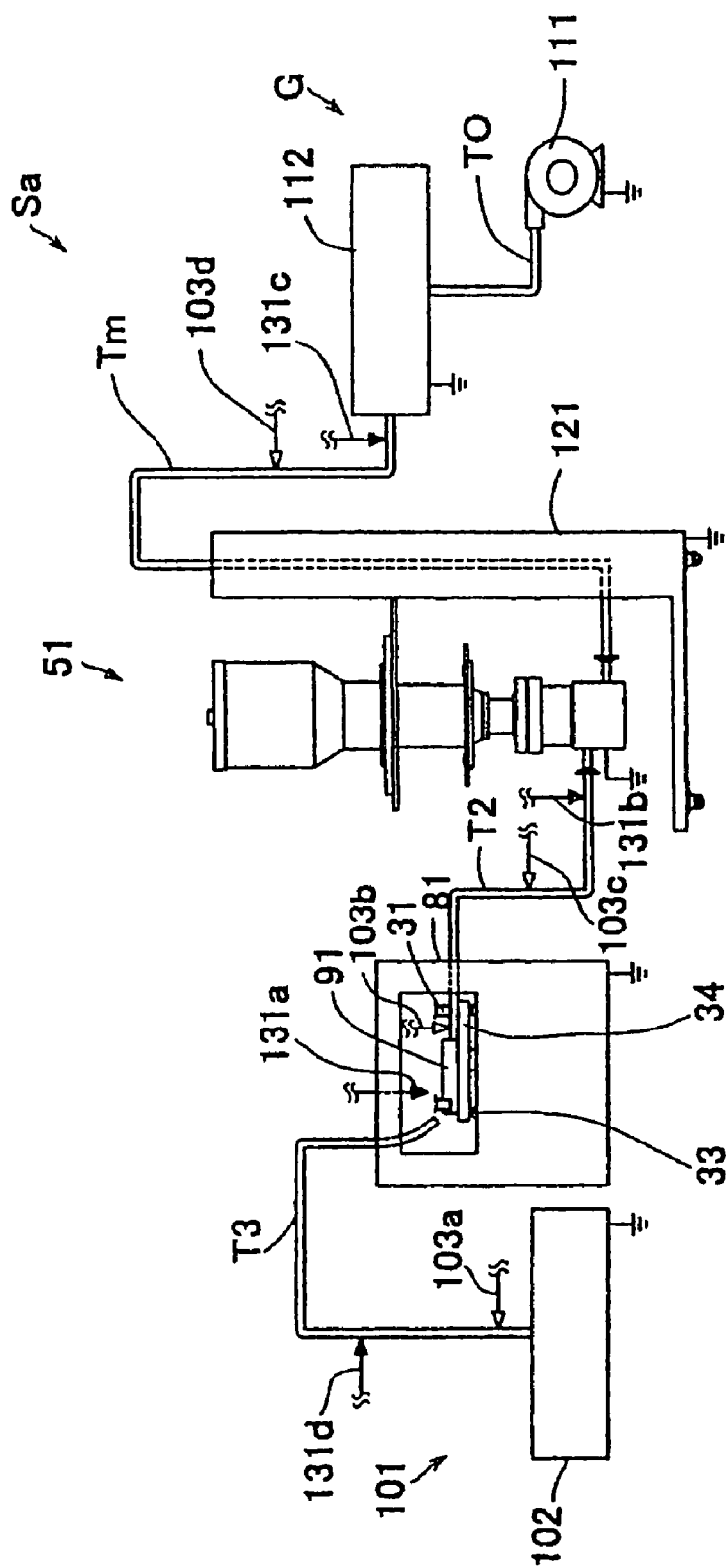
FIG. 1 diagrammatically shows one construction of the tablet production apparatus according to the present invention.

FIG. 1 diagrammatically shows one construction of the tablet production apparatus according to the present invention.

Tablet production apparatus (eternally lubricating type tabletting machine) Sa has a gas generator G, a lubricant powder discharge means 51 for discharging a lubricant powder to the gas generated from the gas generator G depending on the gas generated from the gas generator G to be mixed and dispersed, a lubricant application means 91 for spraying the lubricant powder mixed and dispersed with the gas generated from the gas generator G on each material contacting surface of a die, an upper punch and a lower punch, an oxygen concentration measuring means 131a for measuring the oxygen concentration contained in the gas existing around the lubricant application means 91, and oxygen concentration measuring means 131b and 131c for measuring the oxygen concentration in the transporting system from the gas generator G to the lubricant application means 91.

If airtightness in the transporting system from the gas generator G to the lubricant application means 91 is adequately kept, the oxygen concentration measuring means 131b and 131c aren't always provided.

The member shown with the reference numeral 81 in FIG. 1 is a rotary type tabletting machine.

The reference numeral 121 in FIG. 1 refers to a controller which entirely controls and observes the tablet production apparatus (externally lubricating type tabletting machine).

The gas generator G is provided with an oxygen removing means 112 for removing the oxygen in the air to be supplied to a conduit Tm from a blower 111 when the blower 111 and the blowers 111 are driven.

The blower 111 and the controller 121 are connected with a signal line so as to control the drive amount of blower 111 by the controller 121.

Several kinds of oxygen removing means 112 may be used if the oxygen concentration contained in a compressed air generated from the blower 111 is adequately reduced comparing with the explosion limit oxygen concentration when a compressed air with the flow amount added the maximum value of a spray flow and the maximum value of a control flow is generated from the blower 111 in case of applying a lubricant powder on each material contacting surface of a die (see die 32 . . . in FIG. 23), on each material contacting surface of an upper punch 31 . . . and on each material contacting surface of a lower punch 33 . . . of the rotary type tabletting machine 81.

From the blower 111, a conduit T0, the oxygen removing means 112, the conduit Tm, the lubricant powder discharge means 51, a conduit T2 to the lubricant application means 91 of the tablet production means (externally lubricating type tabletting machine) Sa are kept airtightly.

More specifically, a blow port of the blower 111 is connected with one end of the conduit T0 airtightly, the other end of the conduit T0 is connected with a supply port of the oxygen removing means 112 airtightly, a discharge port of the oxygen removing means 112 is connected with one end of the conduit Tm airtightly, the other end of the conduit Tm is connected with a gas supply port (gas supply port 55a in FIG. 12) of the lubricant powder discharge means 51 airtightly, a discharge port (discharge port 55b in FIG. 12) of the lubricant powder discharge means is connected with the other end of the conduit T2 airtightly, the other end of the conduit T2 is connected with a lubricant introduction port of the lubricant spray means 91 airtightly so that gas conduit from the supply port of the blower 111 to the lubricant spray port for upper punch (lubricant spray port for upper punch 94 shown in FIG. 23, FIG. 24 and FIG. 25) of the lubricant spray means 91 is kept airtight.

The oxygen removing means 112 is provided with a column charged with a deoxidizer, for example an iron powder, in such a manner that oxygen in the air is removed while being passed in the column.

As for oxygen measuring means 131a, 131b, 131c, a well-known oxygen concentration measuring means such as an oxygen analyzer (product name: MODEL1100, brand name: ceramatec, product of ADVANCED IONIC TECHNOLOGIES INC., importer: AICHI SANGYO TECHNICAL TRADING COMPANY) may be used.

The oxygen measuring means 131a, 131b, 131c may be an oxygen measuring means which announces an alert when detecting the oxygen concentration above the limit concentration to announce an alert if the oxygen concentration to announce the alert is input in the measuring means in advance.

Otherwise, the detected values from the oxygen concentration measuring means 131a, 131b, 131c are sent to the controller 121 and the oxygen concentration to announce an alarm may be input in the controller 121, or an alarm is announced by the controller 121 when each one of the oxygen concentration measuring means 131a, 131b, 131c detects the oxygen concentration above the alarm limit.

The air supplied from the blower 111 to the conduit T0 by driving the blower 111 is further supplied to the lubricant powder discharge means 51 via the conduit Tm after removing oxygen in the oxygen removing means 112.

The lubricant powder discharge means 51 is designed to discharge the lubricant powder depending on the gas supplied via the conduit Tm of which oxygen is removed by the oxygen removing means 112 and to mix and disperse the lubricant powder with the gas.

The construction and operation of the lubricant powder discharge means 51 are detailed later so that its explanation is omitted here.

The lubricant powder discharged from the lubricant powder discharge means 51 in the gas in which oxygen is removed by the oxygen removing means 112 to be mixed and dispersed together is fed to the lubricant application means 91 via the conduit T2.

The lubricant application means 91 is provided at a predetermined position (lubricant spray point R1 in FIG. 23) on a turntable 34 of the rotary type tabletting machine 81.

Figure 23:
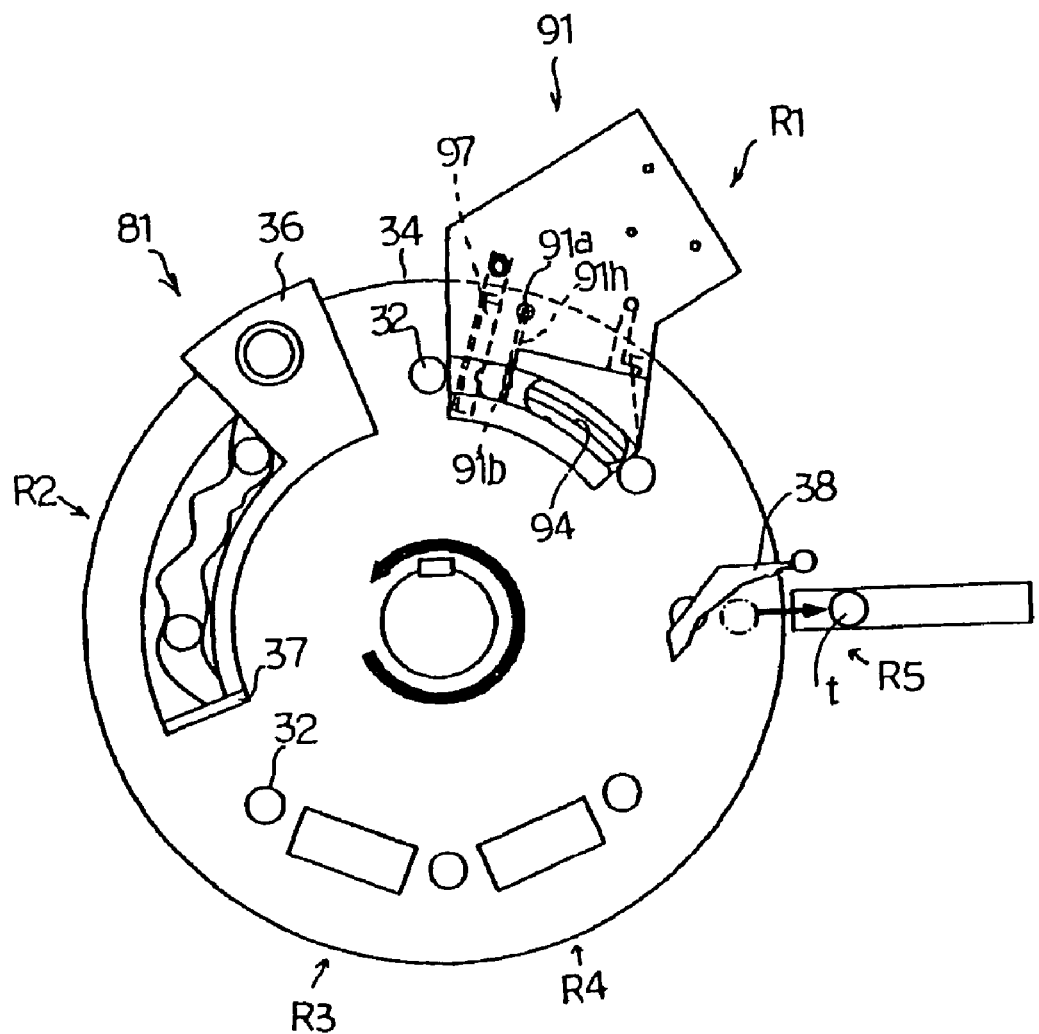
FIG. 23 is a plane view diagrammatically showing a rotary type tabletting machine applied to an externally lubricating type tabletting machine used in the present invention.

The lubricant powder supplied to the lubricant application means 91 via the conduit T2 while being mixed and dispersed in the gas of which oxygen is removed is sequentially applied on each contacting surface of the plural dies (plural dies 32 . . . in FIG. 23) provided on the turntable 34 of the rotary type tabletting machine 81, each material contacting surface of upper punch 31 correspondingly provided for each one of the plural dies (plural dies 32 in FIG. 23) and each material contacting surface of the lower punch 33 correspondingly provided for each one of plural dies (plural dies 32 . . . in FIG. 23).

The construction and operation of the lubricant application means 91 are detailed later so that its explanation is omitted here.

Further, the tablet production apparatus (externally lubricating type tabletting machine) Sa has a suction means 101 and the lubricant powder concentration measuring means 103a.

The suction means 101 is provided with a dust collector 102 and a suction duct (conduit) T3.

When the suction means 101 (more specifically the dust collector 102) is driven to collect the lubricant powder sucked in the suction duct (conduit) T3 at a dust collection filter (not shown) provided in the dust collector 102.

Signals are sent and received via a signal line (not shown) between the dust collector 102 and the dust controller 121 such that the controller 121 can drive and stop the collector 102 or control the drive amount at a desirable amount.

According to this tablet production apparatus (externally lubricating type tabletting machine) Sa, when the suction means 101 is driven, surplus lubricant powder, which has been sprayed from the lubricant application means 91 on each material contacting surface of the die, the material contacting surface of the upper punch provided for each one of the plural dies, and the material contacting surface of the lower punch provided for each one of the plural dies, is designed to be sucked and removed by the suction means (lubricant suction means) 101.

Figure 26:
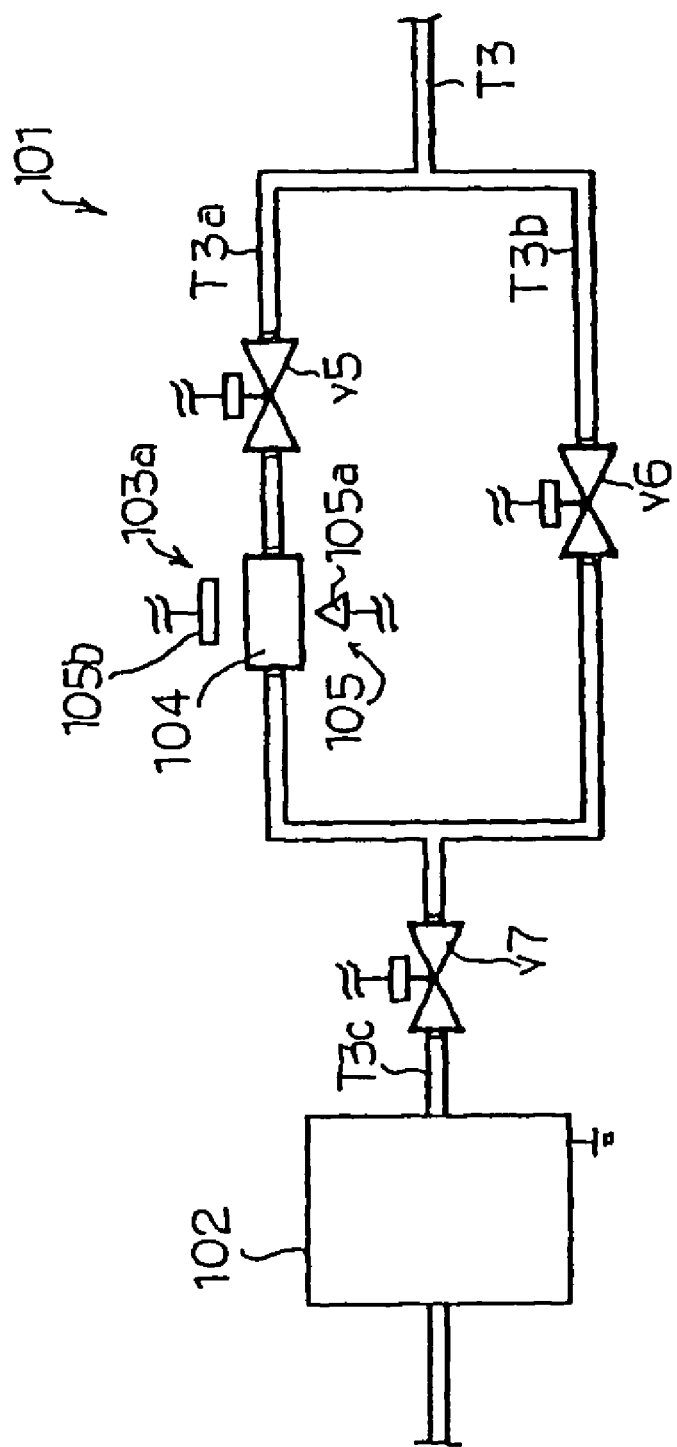
FIG. 26 shows the enlarged diagrammatic construction around the suction means (lubricant suction means) shown in FIG. 10.

The lubricant powder concentration measuring means 103*a* (scattering type powder concentration measuring means 103*a* in FIG. 26) is provided for the suction duct (conduit T3 (more specifically a branch pipe T3*a* in FIG. 26)) of the suction means (lubricant suction means) 101 in such a manner that the concentration of the powder (lubricant powder) in the suction duct (conduit T3 (more specifically a branch pipe T3*a* in FIG. 26)) of the suction means (lubricant suction means) 101 is measured when the suction means (lubricant suction means) 101 is driven by the lubricant powder concentration measuring means 103*a*.

In this embodiment, the value detected by the lubricant powder concentration measuring means 103*a* is sent to the controller 121.

As shown in FIG. 1, an antistatic means is provided for each one of the blower 111, the oxygen removing means 112, the controller 121, the lubricant powder discharge means 51, the rotary tabletting machine 81 and the suction means (lubricant suction means) 101 of the tablet production apparatus (externally lubricating type tabletting machine) Sa for preventing the static electricity charge by earthing those めmeans.

In this embodiment, each one of the blower 111, the oxygen removing means 112, the controller 121, the lubricant powder discharge means 51, the rotary tabletting machine 81 and the suction means (lubricant suction means) 101 is grounded (earthed), however it isn't necessary to ground all of them for preventing the tablet production apparatus (externally lubricating type tabletting machine) Sa from being charged with static electricity. At least one of them may be grounded (earthed).

In order to avoid a static electricity of the tablet production apparatus (externally lubricating type tabletting machine) Sa, the conduits Tm, T2 or T3 may be grounded if necessary. Otherwise the blower 111, the oxygen removing means 112, the controller 121, the lubricant powder discharge means 51, the rotary tabletting machine 81, the suction means (lubricant suction means) 101, the conduits Tm, T2 or T3 may be done with an antistatic procedure such as applying a paint including an antistat solution or an antistat such as cation activator.

Further, a first safety means is provided for the controller 121 of the tablet production apparatus (externally lubricating type tabletting machine) Sa.

The first safety means has a first alarm means provided for the controller 121.

A first program is stored to activate the first alarm means in a memory of a processing unit of the controller 121.

Figure 2:
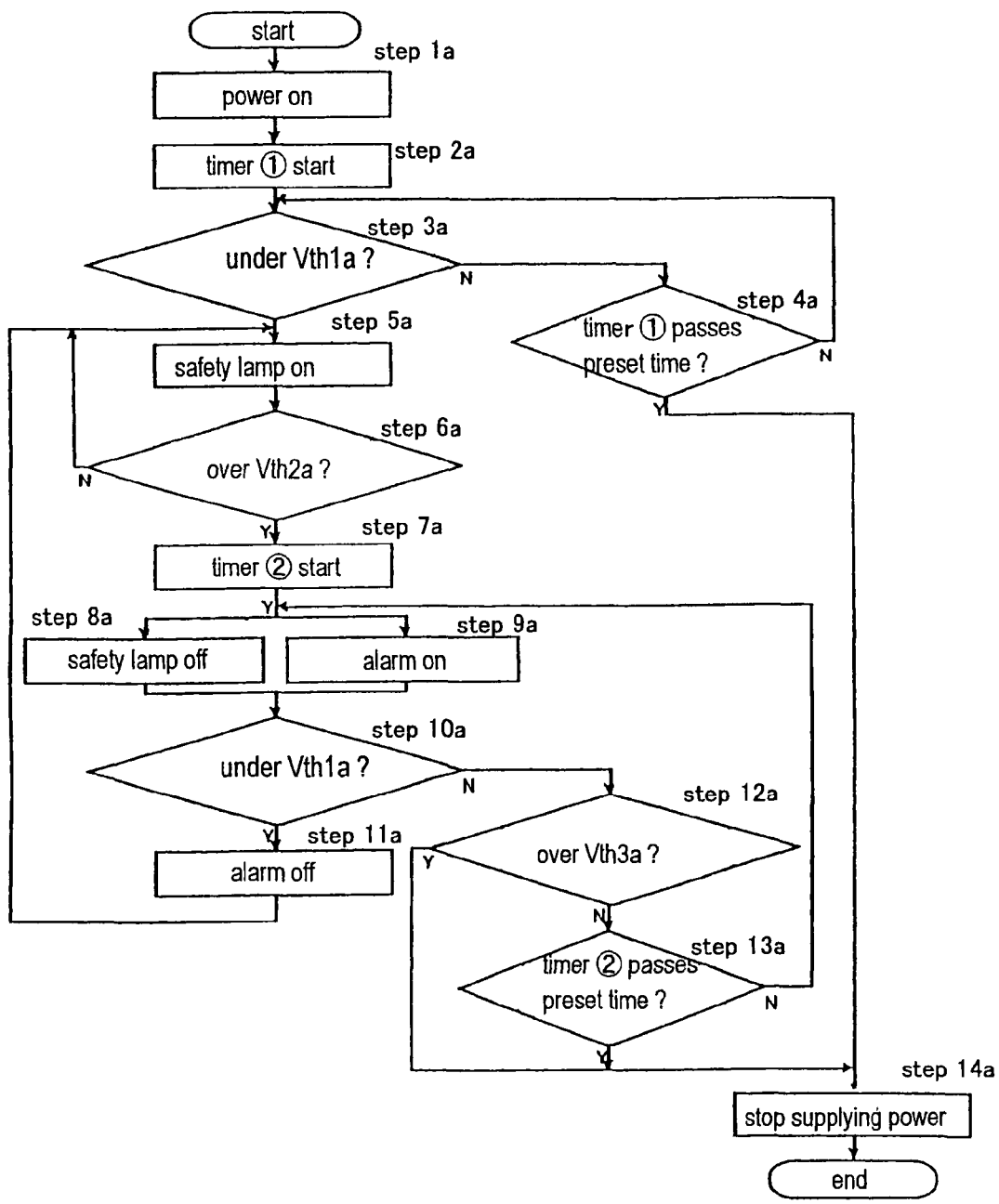
FIG. 2 is a flow chart diagrammatically explaining a first program stored in a control means of the tablet production apparatus shown in FIG. 1.

FIG. 2 is a flow chart diagrammatically explaining the first program.

As a threshold of the oxygen concentration, the first program has two large and small thresholds Vth3*a*, Vth2*a*, and a threshold of oxygen concentration capable of normally working Vth1*a* (for example, threshold of oxygen concentration capable of normally working=5%) having the value under the smaller threshold Vth2 of those two values Vth3*a*, Vth2*a*.

The smaller threshold Vth2*a* of the two thresholds Vth3*a*, Vth2*a* is provided as the threshold (hereinafter called as "oxygen concentration threshold to announce an alarm") for determining to announce an alarm or not and is quite a low oxygen concentration value comparing with the oxygen concentration of lower explosion limit (for example, smaller threshold Vth2*a*=11%).

The threshold Vth3*a*, which is larger than the other one Vth2*a* (oxygen concentration threshold to announce an alarm), of the two thresholds Vth3*a* and Vth2*a* is a threshold (hereinafter called as oxygen concentration threshold to automatically stop operation) provided for determining to automatically stop the tablet production apparatus (externally lubricating type tabletting machine) Sa under operation or not and is the same as or a little smaller than the oxygen concentration of explosion limit (for example, the other threshold Vth3*a*=14%).

The first program is designed to be started when the value detected by the oxygen concentration measuring means 131*a* once becomes less than the threshold of oxygen concentration capable of normally working Vth1*a* (for example, threshold of oxygen concentration capable of normally working=5%) after the tablet production apparatus (externally lubricating type tabletting machine) Sa is turned on (see step 3*a*, step 6*a*, step 10*a* and step 12*a* in FIG. 2).

For producing tablets with the tablet production apparatus (externally lubricating type tabletting machine) according to the first program, after the oxygen concentration (detected value) detected by the oxygen concentration measuring means 131*a* once becomes under the threshold of oxygen concentration capable of normally working Vth1*a* which is provided as a value under one threshold (oxygen concentration threshold to announce an alarm) Vth2*a* (see step 3*a*), and becomes the other threshold (oxygen concentration threshold to announce an alarm) Vth2*a* (see step 6*a*), then an alarm means (not shown) provided for the controller 121 outputs a warning to inform operators of the possibility of a dust explosion (see step 9*a*).

As the first alarm means (not shown), an alarm buzzer may be provided for the controller 121 so that the alarm buzzer sounds when the oxygen concentration (detected value) detected by the oxygen concentration measuring means 131*a* becomes the other threshold (oxygen concentration threshold to announce an alarm) Vth2*a*. Or an alarm lamp may be provided for the controller 121 so that the alarm lamp is turned on or flashed when the oxygen concentration (detected value) detected by the oxygen concentration measuring means 131*a* becomes the other threshold (oxygen concentration threshold to announce an alarm) Vth2*a*. Otherwise, both an alarm buzzer and an alarm light are provided so that the alarm buzzer sounds and simultaneously the alarm lamp is turned on or flashed when the oxygen concentration (detected value) detected by the oxygen concentration measuring means 131*a* becomes the other threshold (oxygen concentration threshold to announce an alarm) Vth2*a*.

Further, as a first alarm means (not shown), one threshold (oxygen concentration threshold to announce an alarm) Vth2*a* is input in the oxygen concentration measuring means 131*a* in advance and the measuring means 131*a* itself sounds an alarm and/or flashes an alarm lamp when the oxygen concentration (detected value) detected by the oxygen concentration measuring means 131*a* becomes the other threshold (oxygen concentration threshold to announce an alarm) Vth2*a*.

In this embodiment, considering an operator's convenience using the tablet production apparatus Sa, a security lamp (not shown) is further provided for the first alarm means (not shown). When the oxygen concentration (detected value) detected by the oxygen concentration measuring means 131*a* becomes below the oxygen concentration threshold capable of normal working Vth1*a*, the security lamp (not shown) is turned on (see step 3a and step 5a). When the oxygen concentration (detected value) detected by the oxygen concentration measuring means 131a becomes the other threshold (oxygen concentration threshold to announce an alarm) Vth2a, the security lamp (not shown) is turned off (see step 6a and step 8a).

For producing tablets with the tablet production apparatus (externally lubricating type tabletting machine) Sa according to the first program, after the oxygen concentration (detected value) detected by the oxygen concentration measuring means 131a once becomes under the threshold of oxygen concentration capable of normally working Vth1a (for example, threshold of oxygen concentration capable of normally working=5%) which is provided as a value under one threshold (oxygen concentration threshold to announce an alarm) Vth2a, and becomes the other threshold (oxygen concentration threshold to automatically stop operation) Vth3a, then the gas generator G (more specifically the blower 111 constructing the gas generator G), the suction means 101 (more specifically the dust collector 102 constructing the suction means 101) and the rotary type tabletting machine 81 are automatically stopped (see step 12a, step 13a and step 14a).

Further according to the first program, if the oxygen concentration (detected value) detected by the oxygen concentration measuring means 131a doesn't become under the threshold of oxygen concentration capable of normally working Vth1a (for example, threshold of oxygen concentration capable of normally working=5%) after a timer ① counts a fixed time since the gas generator G (more specifically the blower 111 constructing the gas generator G) starts operating, the tablet production apparatus (externally lubricating type tabletting machine) Sa is automatically stopped (see step 4a).

One threshold (oxygen concentration threshold to announce an alarm) Vth2a isn't limited if it is smaller than the other threshold (oxygen concentration threshold to automatically stop operation) Vth3a, however, it is selected from under the oxygen concentration recommended by the static safety guide of the National Institute of Industrial Safety corresponding to the oxygen concentration of explosion limit of the used lubricant powder. Generally the half value of the oxygen concentration of explosion limit of the lubricant powder to be used may be selected expecting safety.

Further, a second safety means is provided for the controller 121 of the tablet production apparatus (externally lubricating type tabletting machine) Sa.

Figure 3:
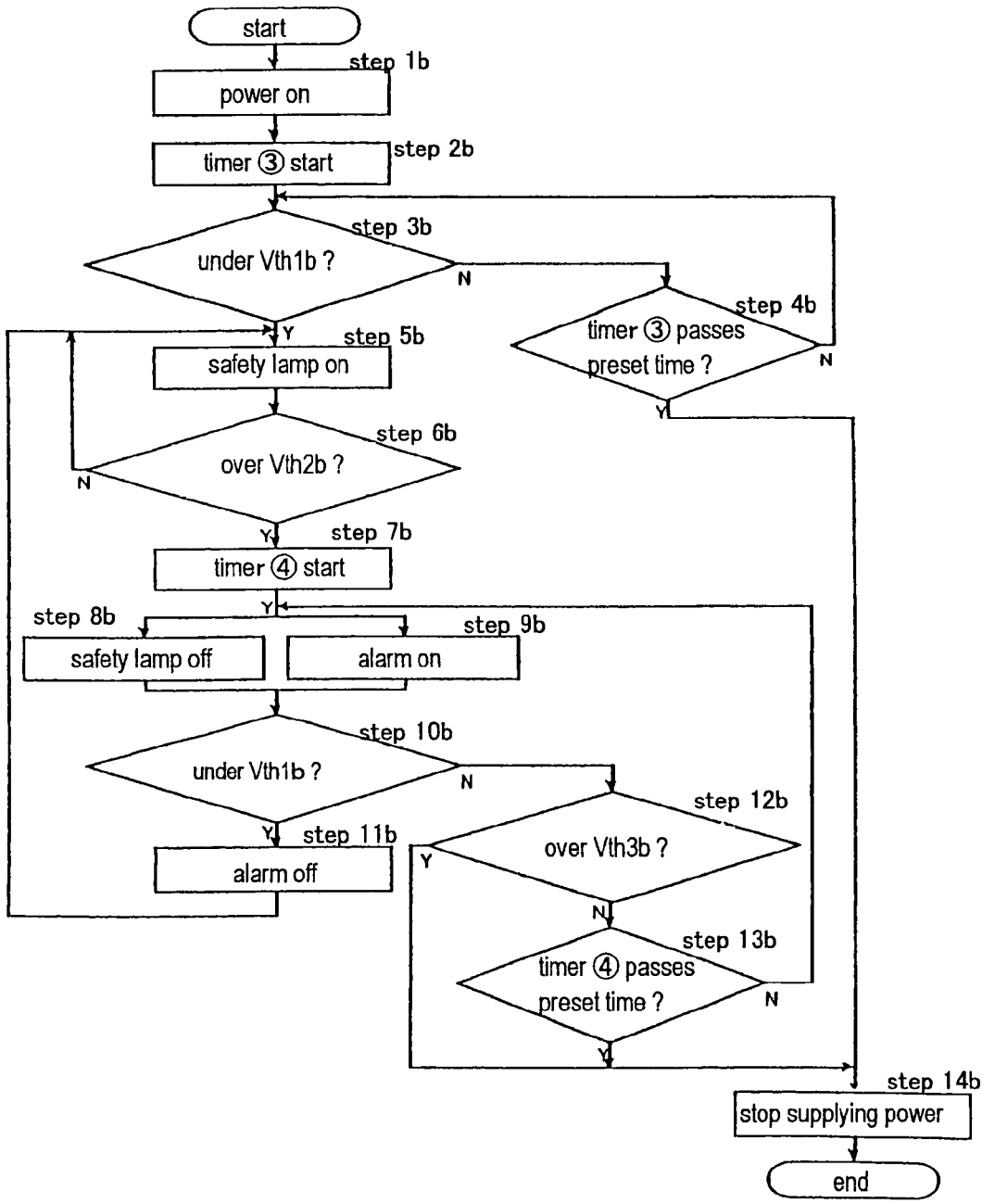
FIG. 3 is a flow chart diagrammatically explaining a second program stored in a control means of the tablet production apparatus shown in FIG. 1.

FIG. 3 is a flow chart diagrammatically explaining the second program.

The second safety means has a second alarm means provided for the controller 121.

A second program is stored to activate the second alarm means in a memory of a processing unit of the controller 121.

As a threshold of the lubricant powder concentration of lower explosion limit, the second program has at least two large and small thresholds Vth3b, Vth2b, and a threshold of oxygen concentration of lower explosion limit capable of normally working Vth1b (for example, threshold of oxygen concentration lower explosion limit capable of normally working=25 g/m$^3$) having the value under the smaller value Vth2b of those two values Vth3b, Vth2b.

The smaller threshold Vth2b (concentration threshold of lower explosion limit to announce an alarm) of the two thresholds Vth3b, Vth2b has a quite low lubricant powder concentration value comparing with the lubricant powder concentration of lower explosion limit (for example, one threshold Vth2b (concentration threshold of lower explosion limit to announce an alarm)=½ of the lubricant powder concentration of lower explosion limit) (Vth1<Vth2b<Vth3b).

The threshold Vth3b (concentration threshold of lower explosion limit to automatically stop operation), which is larger than the other one Vth2b (concentration threshold of lower explosion limit to announce an alarm), of the two thresholds Vth3b and Vth2b is equal to or a little smaller than the value of the lower explosion limit concentration (for example, the other threshold Vth3b (concentration threshold of lower explosion limit to automatically stop operation)=70 g/m$^3$).

The second program is designed to start watching when the value detected by the oxygen concentration measuring means 103a once becomes below the concentration threshold of lower explosion limit capable of normally working Vth1b (for example, concentration threshold of lower explosion limit capable of normally working) after the tablet production apparatus (externally lubricating type tabletting machine) Sa is turned on (see step 3b, step 6b, and step 12b).

For producing tablets with the tablet production apparatus Sa (externally lubricating type tabletting machine) according to the second program, after the lubricant powder concentration (detected value) detected by the lubricant powder concentration measuring means 103a once becomes under one threshold of oxygen concentration of lower explosion limit capable of normally working Vth1b which is provided as a value under the other threshold Vth2b (concentration threshold of lower explosion limit to announce an alarm), and becomes the other threshold (concentration threshold of lower explosion limit to announce an alarm) Vth2b (see step 6b), then an alarm means (not shown) provided for the controller 121 outputs a warning to inform operators of the possibility of dust explosion (see step 9b).

As a second alarm means (not shown), an alarm buzzer may be provided for the controller 121 so that the alarm buzzer sounds when the lubricant powder concentration (detected value) detected by the lubricant powder concentration measuring means 103a becomes the other threshold Vth2b (concentration threshold of lower explosion limit to announce an alarm). Or an alarm lamp may be provided for the controller 121 so that the alarm lamp is turned on or flashed when the lubricant powder concentration (detected value) detected by the lubricant powder concentration measuring means 103a becomes the other threshold Vth2b (concentration threshold of lower explosion limit to announce an alarm). Otherwise, both an alarm buzzer and an alarm light are provided for the controller 121 so that the alarm buzzer sounds and simultaneously the alarm lamp is turned on or flashed when the lubricant powder concentration (detected value) detected by the lubricant powder concentration measuring means 103a becomes the other threshold (concentration threshold of lower explosion limit to announce an alarm) Vth2b.

In this embodiment, considering an operator's convenience using the tablet production apparatus Sa, a security lamp (not shown) further provided for the second alarm means (not shown). When the lubricant powder concentration (detected value) detected by the lubricant powder concentration measuring means 103a becomes below the concentration threshold of lower explosion limit capable of normally working Vth1b (see step 3b), the security lamp (not shown) is turned on (see step 4b). When the lubricant powder concentration (detected value) detected by the lubricant powder concentration measuring means 103a becomes the other threshold (concentration threshold of lower explosion limit to announce an alarm) Vth2b (see step 6b), the security lamp (not shown) is turned off (see step 8b).

For producing tablets with the tablet production apparatus (externally lubricating type tabletting machine) Sa according to the second program, after the lubricant powder concentration (detected value) detected by the lubricant concentration measuring means 103a once becomes under the concentration threshold of lower explosion limit capable of normally working (for example, concentration threshold of lower explosion limit capable of normally working=12.5 m$^3$) which is provided as a value under one threshold (concentration threshold of lower explosion limit to announce an alarm) Vth2b, and becomes the other threshold (concentration threshold of lower explosion limit to automatically stop operation) Vth3b, then the gas generator G (more specifically the blower 111 constructing the gas generator G), the suction means 101 and the rotary type tabletting machine 81 are automatically stopped (see step 12b and step 14b).

Further according to the second program, if the lubricant powder concentration (detected value) detected by the lubricant powder concentration measuring means 103a doesn't become under the concentration threshold of lower explosion limit capable of normally working (for example, concentration threshold of lower explosion limit capable of normally working=12.5 g/m$^3$) Vth1b after a timer ③ counts a fixed time since the suction means 101 (more specifically the dust collector 102 constructing the suction means 101) starts operating, the tablet production apparatus (externally lubricating type tabletting machine) Sa is automatically stopped (see step 4b).

The tablet production apparatus Sa uses the lubricant powder discharge means wherein a lubricant powder is discharged in the gas depending on the gas generated from the gas generator G, and is mixed and dispersed with the gas generated from the gas generator G, thereby enabling to mix and disperse a fixed amount of lubricant powder with a fixed amount of gas as far as the generation amount (flow rate, pressure and so on) of the gas generated from the gas generator G is constant.

Lubricant powder with a constant concentration is thus designed to be supplied into the lubricant application means 91 of the tablet production apparatus Sa so that a fixed amount of lubricant powder can be always applied on each material contacting surface of the dies 32 . . . , the upper punches 31 . . . , the lower punches 33 . . . .

As the result, a fixed amount of lubricant powder can be applied with this tablet production apparatus Sa on each material contacting surface of the dies 32 . . . , the upper punches 31 . . . , and the lower punches 33 . . . . Therefore, once the gas generation amount (flow amount, pressure and so on) generated from the gas generator is controlled such that the amount of lubricant applied on those material contacting surfaces becomes suitable, the amount of lubricant powder applied on those material contacting surfaces is kept suitable by keeping the gas generation amount constant.

Accordingly, once the gas generation amount (flow amount, pressure and so on) generated from the gas generator G is controlled such that the amount of lubricant applied on the dies 32 . . . , the upper punches 31 . . . and the lower punches 32 . . . becomes the amount not to cause tabletting problems such as sticking, capping and laminating and not to generate griding between the dies 32 . . . , the upper punches 31 . . . and the lower punches 33 . . . , tablets are stably produced for a long time only by keeping the gas generation amount constant without causing the tabletting problems and the griding.

Accordingly, the tablet production apparatus Sa is used as an apparatus suitable for producing tablets (externally lubricated tablets) at an industrial production base.

In addition, according to the tablet production apparatus Sa, the oxygen concentration measuring means 131a is provided for measuring the oxygen concentration in the gas around the lubricant application means 91 and the gas amount generated from the gas generator G is controlled based on the oxygen concentration measured by the oxygen concentration measuring means 131a.

When a noninflammable gas is used as a supply gas generated from the gas generator G, the air (natural air including oxygen) in the transporting system from the gas generator G to the lubricant application means 91, namely the space in the conduit T0, the oxygen removing means 112, the conduit Tm, the lubricant powder discharge means 51, the conduit T2, and the lubricant application means 91, and around the lubricant application means 91, is displaced with the noninflammable gas.

If all or a part of the air in the space in the transporting system from the gas generator G to the lubricant application means 91 and all or a part of the air (normal air including oxygen) around the lubricant application means 91 are exchanged with the noninflammable gas to reduce the oxygen amount in the gas existing in those spaces, a dust explosion is prevented in the space in the transporting system from the gas generator G to the lubricant application means 91, in the space between the lubricant spray port for upper punch (lubricant spray port for upper punch 94 in FIG. 20) of the lubricant application means 91 and the material contacting surface of the upper punch 31, or in the space formed by the lubricant spray port for lower punch (lubricant spray port for lower punch 91b in FIG. 25) of the lubricant application means 91, the die 32 and the lower punch 33 inserted in a predetermined position in the die 32.

Namely, this tablet production apparatus Sa is constructed such that the gas amount generated from the gas generator G is controlled based on the oxygen concentration measured by the oxygen concentration measuring means 131a so that the oxygen amount contained in the gas existing in the space in the transporting system from the gas generator G to the lubricant application means 91 and the oxygen amount contained in the gas existing in the space around the lubricant application means 91 are reduced. Therefore, a dust explosion is prevented from causing in the space in the transporting system from the gas generator G to the lubricant application means 91 and around the lubricant application means 91.

In addition, the lubricant powder concentration to be supplied in the suction means 101 (more specifically a suction duct (conduit)) T3 is controlled based on the lubricant powder concentration measured by the lubricant powder concentration measuring means 103a. Hence, the lubricant powder concentration to be supplied in the suction means 101 (more specifically a suction duct (conduit)) T3 is set to be under the lower explosion limit concentration, thereby preventing a dust explosion in the suction means 101 (more specifically a suction duct (conduit)) T3.

In this tablet production apparatus Sa, the antistatic means is provided so that the apparatus Sa isn't charged with a static electricity.

Accordingly, in the production of tablets by using the tablet production apparatus Sa, because sparks aren't generated by a static electricity, the tablet production apparatus Sa isn't charged with a static electricity, thereby preventing a dust explosion.

Next, the operation of the tablet production apparatus (externally lubricating type tabletting machine) Sa is explained.

Powder material to be a raw material of a tablet is prepared when a tablet is produced with the tablet production apparatus (externally lubricating type tabletting machine) Sa.

The powder material to be a raw material of a tablet is contained in a powder material storage hopper (not shown) of the rotary type tabletting machine 81.

Lubricant powder is contained in the lubricant powder discharge means 51.

Next, the controller 121 is turned on to actuate the oxygen concentration measuring means 131a and the lubricant powder concentration measuring means 103a respectively.

Then the rotary type tabletting machine 81 is driven to rotate the turntable 34, the plural upper punches 31 . . . , and the plural lower punches 34 . . . .

Further, the blower 111, the oxygen removing means 112 and the suction means (lubricant suction means) 101 are driven.

In this time, it is confirmed that the value (oxygen concentration) detected by the oxygen concentration measuring means 131a becomes adequately lower than the lower explosion limit concentration by controlling the driving amount of blower 111 with the controller 121.

More specifically, it is confirmed whether the security lamp of the first safety means provided for the controller 121 is turned on or not in the tablet production apparatus (externally lubricating type tabletting machine) Sa.

When the blower 111 is driven to supply the gas, of which the oxygen is removed by the oxygen removing means 112, into the lubricant powder discharge means 51, the lubricant powder is discharged into the gas depending on the supply amount of gas, the supply pressure and/or flow amount of gas supplied to the discharge means 51 and is supplied to the lubricant application means 91 while being mixed and dispersed in the gas.

The lubricant powder which is mixed and dispersed with the gas without containing oxygen and is supplied to the lubricant application means 91 is sequentially sprayed on each material contacting surface of the dies (plural dies 32 . . . shown in FIG. 23), each material contacting surface of the upper punches 31 . . . and each material contacting surface of the lower punches 33 . . . which are fed in the lubricant application means 91 by the rotation of the turntable 34, the upper punches 31 . . . and the lower punches 33 . . . of the rotary type tabletting machine 81.

According to the above-mentioned procedures, the lubricant powder is sequentially applied on each material contacting surface of the dies (plural dies 32 . . . shown in FIG. 23), each material contacting surface of the upper punches 31 . . . and each material contacting surface of the lower punches 33 . . . which are fed in the lubricant application means 91 by the rotation of the turntable 34, the upper punches 31 . . . and the lower punches 33 . . . of the rotary type tabletting machine 81.

Driving the suction means 101, surplus lubricant powder is sucked by means of the suction means 101 together with air. The surplus lubricant is a part of the lubricant powder sprayed on each material contacting surface of the dies (plural dies 32 . . . shown in FIG. 23), each material contacting surface of the upper punches 31 . . . and each material contacting surface of the lower punches 33 . . . which are fed in the lubricant application means 91 by the rotation of the turntable 34, the upper punches 31 . . . and the lower punches 33 . . . of the rotary type tabletting machine 81 and is a lubricant powder which isn't applied on those material contacting surfaces.

The lubricant powder measuring means 103a is provided for the suction duct (conduit T3 (more specifically, the branch pipe T3a shown in FIG. 26)) of the suction means (lubricant suction means) 101 to measure the concentration of the powder (lubricant powder) in the suction duct when the suction means (lubricant suction means) 101 is driven.

By controlling the driving amount of blower 111 and the driving amount of suction means (lubricant suction means) 101 with the controller 121, the detected value (concentration of lubricant powder) measured by the lubricant powder concentration measuring means 103a is adjusted to be under one threshold (concentration threshold of lower explosion limit to announce an alarm) Vth2b which is an adequately smaller value than the lower explosion limit concentration of the lubricant powder.

Then, the powder material stored in the powder material storage hopper (not shown) of the rotary type tabletting machine 81 is supplied to each space formed with each one of the dies 32 . . . , each one of the lower punches 33 . . . inserted into a predetermined position in each one of the dies 32 . . . .

Thus supplied material is compressed (tabletted) with each one of the dies 32 . . . having the material contacting surface applied with the lubricant powder, each one of the lower punches 33 . . . having the material contacting surface applied with the lubricant powder, and each one of the upper punches 31 . . . having the material contacting surface applied with the lubricant powder, thereby producing a tablet.

The produced tablets are observed.

In order to reduce the amount of lubricant powder applied on the produced tablet if necessary, the controller 121, for example, makes the driving amount of suction means (lubricant suction means) 101 larger so that the application amount of lubricant powder on each material contacting surface of the dies 32 . . . , on each material contacting surface of the lower punches 33 . . . , and on each material contacting surface of the upper punches 31 . . . .

Finishing such control, the tablet production apparatus Sa produces a tablet in earnest at an industrial production base under the conditions determined in mentioned above.

When a tablet of the same size and the same shape is produced from the same material with the tablet production apparatus Sa, with the same construction of the rotary type tabletting machine 81 and with the same driving amount, if the determined conditions are stored in the memory of the controller 121, the next tablet production can be easily started.

While producing a tablet with the tablet production apparatus Sa, when the oxygen concentration (detected value) detected by the oxygen concentration measuring means 131a becomes above one threshold (oxygen concentration threshold to announce an alarm) Vth2a, a security lamp is turned off and an alarm is output from the first alarm means (not shown) so as to warn operators of the possibility of a dust explosion.

Accordingly, at the time of output of an alarm from the first alarm means (not shown), the operators can prevent a dust explosion before happens in and around the tablet production apparatus Sa during production of a tablet by inspecting and repairing the apparatus Sa.

Further according to the tablet production apparatus Sa, when the oxygen concentration (detected value) detected by the oxygen concentration measuring means 131a becomes the other threshold (oxygen concentration threshold to automatically stop operation) Vth3a during production, the gas generator G (more specifically, the blower 111 constructing the gas generator G), the suction means 101 and the rotary type tabletting machine 81 are automatically stopped, thereby preventing a dust explosion in and around the tablet production apparatus Sa.

In addition, while producing a tablet with the tablet production apparatus Sa, when the lubricant powder concentration (detected value) detected by the lubricant powder concentration measuring means 103a becomes above one threshold (threshold of lower explosion limit concentration to announce an alarm) Vth2b, a security lamp is turned of f and an alarm is output from the second alarm means (not shown) so as to warn operators of the possibility of a dust explosion.

Accordingly, at the time of output of an alarm from the second alarm means (not shown), the operators can prevent a dust explosion before happens in and around the tablet production apparatus Sa during production of a tablet by inspecting and repairing the apparatus Sa.

Further according to the tablet production apparatus Sa, when the lubricant powder concentration (detected value) detected by the lubricant powder concentration measuring means 103a becomes the other threshold (threshold of lower explosion limit concentration to automatically stop operation) Vth3b during production, the gas generator G (more specifically, the blower 111 constructing the gas generator G), the suction means 101 and the rotary type tabletting machine 81 are automatically stopped, thereby preventing a dust explosion in and around the tablet production apparatus Sa.

In this tablet production method, the lubricant powder is discharged in the gas depending on the gas to be mixed and dispersed therein, therefore, a fixed amount of lubricant powder can be mixed and dispersed with a fixed amount of gas as far as the gas to be mixed and dispersed with the lubricant is constant.

Thus, according to the tablet production method, a fixed amount of lubricant powder is designed to be supplied in the lubricant application means so that a fixed amount of lubricant powder can be applied on each material contacting surface of the dies 32 . . . , the upper punches 31 . . . and the lower punches 33 . . . .

As the result, a fixed amount of lubricant powder can be applied with this tablet production apparatus Sa on each material contacting surface of the dies 32 . . . , the upper punches 31 . . . and the lower punches 33 . . . . Therefore, once the gas generation amount (flow amount, pressure and soon) to be mixed and dispersed is controlled such that the amount of lubricant applied on those material contacting surfaces becomes suitable, the amount of lubricant powder applied on those material contacting surfaces is kept suitable by keeping the gas generation amount constant.

Further according to the tablet production method, if the gas generation amount (flow amount, pressure and so on) to be mixed and dispersed with the lubricant powder is controlled in such a manner the amount of lubricant powder is designed to be the amount so as not to cause tabletting problems such as sticking, capping and laminating on the produced tablet and not to generate griding between the dies 32 . . . , the upper punches 31 . . . and the lower punches 32 . . . , tablets are stably produced for a long time only by keeping the gas generation amount (flow amount, pressure and so on) constant without causing such tabletting problems and such griding.

Accordingly, the tablet production method is suitable for producing tablets (externally lubricated tablets) at an industrial production base.

In addition, according to the tablet production method, the oxygen concentration contained in the gas in the transporting system from the gas generation means G to the lubricant application means 91 is designed to be under the oxygen concentration of lower explosion limit, thereby preventing a dust explosion in the system.

Further, the oxygen concentration contained in the gas around the lubricant application means 91 is under the oxygen concentration of the lower explosion limit so that a dust explosion isn't occurred even around the lubricant application means 91.

In addition, according to the tablet production method, the lubricant powder concentration in the suction means 101 (more specifically the suction duct (conduit) T3 constructing the suction means 101) is under the lower explosion limit concentration at the surplus lubricant powder suction step, thereby preventing a dust explosion in the suction duct 101.

Further, the antistatic means is provided for the tablet production apparatus Sa so that sparks of a static electricity aren't generated. Therefore, a dust explosion is prevented at a tablet production procedure with the tablet production apparatus.

The first alarm means (not shown) is provided for the tablet production apparatus Sa to automatically stop the apparatus Sa immediately after the value detected by the oxygen concentration measuring means 131a becomes over the other threshold (threshold of oxygen concentration to automatically stop operation) Vth3a during operation, thereby preventing a dust explosion at a tabletting procedure.

Further, the second alarm means (not shown) is provided for the tablet production apparatus Sa to automatically stop the apparatus sa immediately after the value detected by the lubricant powder concentration measuring means 103a becomes above the other threshold (threshold concentration of lower explosion limit to automatically stop operation) Vth3b so that a dust explosion isn't occurred while producing a tablet with the apparatus Sa.

Next, practical values of the lower explosion limit concentration of the lubricant powder and practical values of the oxygen concentration of explosion limit are explained hereinafter.

Figure 5:
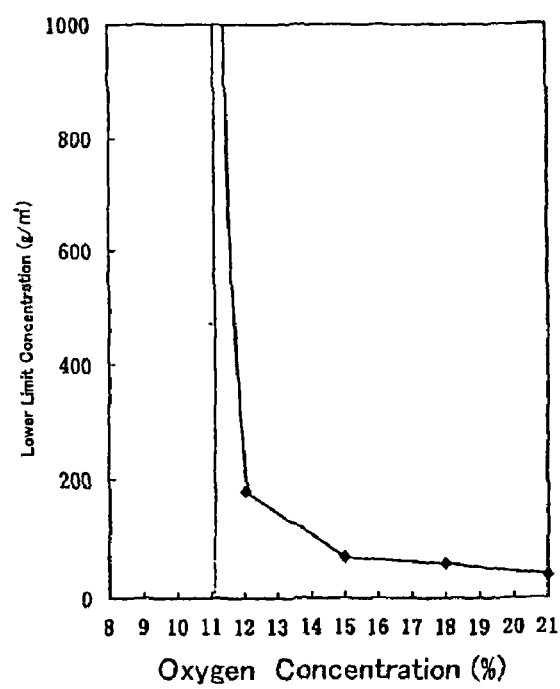
FIG. 5 is an abridgement of an experimental method and its result carried out by Kabushikikaisha Kankyo Eisei Kenkyusho in order to obtain a practical value of a lower explosion limit concentration of a lubricant powder and that of an explosion limit oxygen concentration.

FIG. 4 and FIG. 5 are an abridgement of an experimental method and its result carried out by Kabushikikaisha Kankyo Eisei Kenkyusho (address: 6-2 Shintoden 1-chome, Hamamatsu-shi, Shizuoka Pref. Japan) in order to obtain a practical value of the lower explosion limit concentration of the lubricant powder and that of the oxygen concentration of explosion limit.

Lubricant powder which was generally used for producing pharmaceutical tablets, namely magnesium stearate (Pharmacopoeia of Japan: product of Junsei Kagaku Co., Ltd, particle size: 10 µm) was used as a specimen.

This experiment was comprised of three kinds of test, an explosion test, an ignition energy test, and an explosion limit oxygen concentration test.

A spherical explosion test apparatus with 30 liters of capacity was used a gunpowder (10 kJ) as an ignition source.

In the explosion test, the dust concentration in the spherical explosion test apparatus with 30 liters capacity was set as four kinds like 125 g/m$^3$, 250 g/m$^3$, 500 g/m$^3$, 750 g/m$^3$, and a test is carried our for each concentration.

Conditions of the explosion test was such that the temperature was 21° C. and the moisture content was 21%.

Each maximum pressure increase speed (bar/sec) at the dust concentration of 125 g/m$^3$, 250 g/m$^3$, 500 g/m$^3$, 750 g/m$^3$ was 967.3, 1099.5, 1028.0 and 822.5 respectively.

Kst (bar·m/sec) at the dust concentration of 125 g/m$^3$, 250 g/m$^3$, 500 g/m$^3$, 750 g/m$^3$ was 300.6, 341.6, 319.4 and 255.6 respectively.

The explosion class was evaluated to be "3" based on the Kst (bar·m/sec) at each dust concentration of 125 g/m$^3$, 250 g/m$^3$, 500 g/m$^3$, 750 g/m$^3$.

The maximum explosion pressure (bar) was 7.71, 8.68, 8.12 and 7.41 for the dust concentration of 125 g/m$^3$, 250 g/m$^3$, 500 g/m$^3$, 750 g/m$^3$ respectively.

The ignition energy test was carried out with a blow-up type ignition energy measuring device.

The ignition energy test was executed for three kinds of the dust concentration in the blow-up type ignition energy measuring device like at 250 g/m³, 500 g/m³, and 750 g/m³.

A specimen which was left in a desiccator for 24 hours and adequately dried was used.

The ignition energy under the condition that the dust concentration in the blow-up type ignition energy measuring device was 250 g/m³ was 0.3 mJ<ignition energy<1 mJ.

From the results of the explosion test and the ignition energy test, the specimen was evaluated that it had an ignition and explosion possibility by a static electricity because it was a dust with remarkably large explosion possibility and it had a low ignition energy like (below) 1 mJ.

Further, the specimen was also evaluated that fire around the place where the specimen is handled is required to be noticed because the specimen might be burned with the fire of a gas burner.

In the past, it had not been noticed that an anti explosion countermeasure was required for a small apparatus (for example small scale test apparatus) using a lubricant powder such as magnesium stearate and so on. However, from the result of these tests, it made clear that an adequate anti explosion countermeasure was required for the apparatus using magnesium stearate and so on, specifically for the large apparatus for an industrial production line which used a large amount of lubricant powder such as magnesium stearate and so on.

The test conditions, method and apparatus of the test of the oxygen concentration of explosion limit are shown in FIG. 4.

The test apparatus used for the test of the oxygen concentration of explosion limit is explained hereinafter.

The test apparatus is shown with a figure in the column 3 in FIG. 4.

The test apparatus has a compressor, a 40 liter tank, a nitrogen tank, a 1.3 liter tank, and the Hartmann type explosion test apparatus. The 40 liter tank and the compressor are connected with a conduit such that the air generated by driving the compressor is supplied in the 40 liter tank. The 40 liter tank and the nitrogen tank are connected with a conduit such that the nitrogen gas generated from the nitrogen tank is supplied to the 40 liter tank.

According to the above-mentioned construction, the oxygen concentration contained in the gas in the 40 liter tank is varied by appropriately controlling the driving amount of compressor and the release amount of nitrogen gas from the nitrogen tank.

Further, a conduit is connected to the 40 liter tank and is branched into two conduits in its midstream. One branch pipe is connected to the 1.3 liter tank, and the other branch pipe is connected to a purge nozzle provided at the upper part of the Hartmann type explosion test apparatus.

A valve (purge valve) is provided for the other branch pipe.

One end of a conduit is connected to the 1.3 liter tank. The other end of the conduit connected to the 1.3 liter tank is provided under the specimen tray of the Hartmann type explosion test apparatus.

A solenoid valve is provided for the conduit connecting the 1.3 liter tank and the Hartmann type explosion test apparatus.

The Hartmann type explosion test apparatus has a cylindrical case made of glass (called as explosion cylinder hereinafter) wherein a specimen tray for containing a specimen, a discharge electrode, and an explosion making line are provided in order from bottom to top.

The marking line is provided above the discharge electrode with 100 mm distance.

High voltage current is designed to be supplied to the discharge electrode to generate discharge from the discharge electrode.

Top of the explosion cylinder is designed to be intervened with a filter.

Further the purge nozzle is inserted from the top of the explosion cylinder to its bottom.

Next, test conditions of the test of the explosion limit oxygen concentration are briefly explained.

Test conditions of the test of the explosion limit oxygen concentration are shown in the column 1 in FIG. 4.

Namely, the test of the explosion limit oxygen concentration was carried out as follows.

① The test of the explosion limit oxygen concentration was carried out at a room temperature and a normal pressure.

② Nitrogen (N2) was used as a diluting gas.

③ Maximum oxygen concentration was 21% and the test was carried out under the oxygen concentration of 18%, 15%, and 12%. If a specimen exploded at the concentration of 12%, a test was carried out by further lowering the oxygen concentration by the rate of 1%. If a specimen didn't explode, the specimen was observed whether it didn't explode or not by heightening the oxygen concentration by the rate of 1%.

④ Specimen was used for a test without being screened.

⑤ Observing whether the specimen exploded or not in the above-mentioned ③, the oxygen concentration of explosion limit of the specimen was obtained.

Next, the test method of the explosion limit oxygen concentration is briefly explained.

Test methods of the explosion limit oxygen concentration are shown in the column 2 in FIG. 4.

Namely, the explosion limit oxygen concentration test was carried out as follows.

① Specimen (magnesium stearate (Pharmacopoeia of Japan product of Junsei Kagaku Co., Ltd, particle size: 10 μm) was measured in such a manner that the dust in the test apparatus became a fixed concentration and the measured specimen (magnesium stearate (Pharmacopoeia of Japan: product of Junsei Kagaku Co., Ltd, particle size: 10 μm)) was placed on the specimen tray evenly.

This explosion limit oxygen concentration test was carried out by changing the dust concentration in the test apparatus.

② The explosion cylinder was set and the filter was inserted at the upper part of the explosion cylinder. Then the purge nozzle was inserted from the top of the explosion cylinder into the bottom thereof so as to burst through the filter.

③ The valve (purge valve) provided for the branch pipe connecting the 40 liter tank and the purge nozzle was opened to feed the gas with a fixed oxygen concentration into the explosion cylinder, thereby displacing the air in the explosion cylinder with the gas having a fixed oxygen concentration.

④ The purge nozzle is pulled out of the explosion cylinder and the top of the explosion cylinder was sealed with the filter.

⑤ The solenoid valve was opened to supply the gas with a fixed oxygen concentration at a pressure of 0.70 Kgf/cm² from the other end of the conduit provided under the specimen tray of the Hartmann type explosion test apparatus, one end of the conduit being connected to the 1.3 liter tank, and to disperse the specimen (magnesium stearate (Pharmacopoeia of Japan: product of Junsei Kagaku Co., Ltd, particle size: 10 µm)) in the explosion cylinder. Then a high voltage current is supplied to the discharge electrode to discharge electricity from the discharge electrode. At this time whether the specimen (magnesium stearate (Pharmacopoeia of Japan: product of Junsei Kagaku Co., Ltd, particle size: 10 µm)) dispersed in the explosion cylinder caught fire or not was visually observed.

⑥ When the upper end of the fire caught with the specimen (magnesium stearate (Pharmacopoeia of Japan: product of Junsei Kagaku Co., Ltd, particle size: 10 µm)) exceeded the fire marking line provided 100 mm above the discharge electrode, it was determined the specimen (magnesium stearate (Pharmacopoeia of Japan: product of Junsei Kagaku Co., Ltd, particle size: 10 µm) caught fire.

The result of the explosion limit oxygen concentration test is shown in the column 4, test result, in FIG. 5.

From the table and graph shown in the test result in the column 4 in FIG. 5, the explosion limit oxygen concentration of the specimen (magnesium stearate (Pharmacopoeia of Japan: product of Junsei Kagaku Co., Ltd, particle size: 10 µm)) was equal to or above 11% and equal to or less than 12% when the temperature was equal to or above 20° C. and equal to or less than 21° C. and the moisture content was equal to or above 21% and equal to or less than 35%.

When the above-mentioned explosion limit oxygen concentration test was carried out using calcium stearate (Pharmacopoeia of Japan: product of NOF Corporation, particle size: 10 µm), it was found that the explosion limit oxygen concentration of the specimen (calcium stearate (Pharmacopoeia of Japan: product of NOF Corporation, particle size: 10 µm)) was equal to or above 13% and equal to or less than 14% when the temperature was equal to or above 20° C. and equal to or less than 21° C. and the moisture content was equal to or above 21% and equal to or less than 35%.

According to the static safety guide by the National Institute of Industrial Safety, it was found that the oxygen concentration was preferably controlled equal to or under 8% in order not to cause a dust explosion when the explosion limit oxygen concentration was equal to or above 13% and equal to or less than 14% and it was preferably controlled equal to or under 5% in order not to cause a dust explosion when the explosion limit oxygen concentration was equal to or above 11% and equal to or less than 12%.

Checking the lower explosion limit concentration (g/m$^3$) of magnesium stearate (Pharmacopoeia of Japan: product of Junsei Kagaku Co., Ltd, particle size: 10 µm), it was equal to or above 30 g/m$^3$ and equal to or less than 50 g/m$^3$ in the gas with oxygen concentration of 21%.

Checking the lower explosion limit concentration (g/m$^3$) of calcium stearate (Pharmacopoeia of Japan: product of NOF Corporation, particle size: 10 µm), it was equal to or above 60 g/m$^3$ and equal to or less than 70 g/m$^3$.

Checking the explosion limit oxygen concentration test and the lower explosion limit concentration of several lubricant powder (particle size: 10 µm), it was found that each explosion limit oxygen concentration and lower explosion limit concentration of several lubricant powders (particle size: 10 µm) was similar to that of magnesium stearate (Pharmacopoeia of Japan: product of Junsei Kagaku Co., Ltd, particle size: 10 µm) and calcium stearate (Pharmacopoeia of Japan: product of NOF Corporation, particle size: 10 µm).

Next, the oxygen removal capacity required for the oxygen removing means 112 comprising the tablet production apparatus Sa.

The oxygen removing means 112 requires the oxygen removal capacity which can adequately reduce the oxygen concentration in the gas lower than the explosion limit oxygen concentration, the gas being used for applying a lubricant powder on each material contacting surface of the die (dies 32 . . . in FIG. 23), each material contacting surface of the upper punches 31 . . . and each material contacting surface of the lower punches 33 . . . of the rotary type tabletting machine 81 from the lubricant application means 91 when a tablet is produced at a normal industrial production base.

For producing a tablet at an industrial production base, in general, it requires a spray flow amount of about 50 NL/min. at maximum and a control flow amount of about 70 NL/min. at maximum for applying a lubricant powder on each material contacting surface of the die (dies 32 . . . in FIG. 23), each material contacting surface of the upper punches 31 . . . and each material contacting surface of the lower punches 33 . . . of the rotary type tabletting machine 81 from the lubricant application means 91.

The maximum spray flow amount and the maximum control flow amount for applying a lubricant powder on each material contacting surface of the die (dies 32 . . . in FIG. 23), each material contacting surface of the upper punches 31 . . . and each material contacting surface of the lower punches 33 . . . of the rotary type tabletting machine 81 from the lubricant application means 91 were obtained by multiplying 1.2 as a safe factor by the maximum spray flow amount and control flow amount thereof obtained when the inventors have actually produced several kinds of tablets with the tablet production apparatus Sa of the present invention using a commercially available rotary type tabletting machine, the apparatus being able to produce a tablet at an industrial production base without causing tabletting problems on the produced tablets such as sticking, laminating and capping.

As the result of generating a compressed air (flow amount=120 NL/min.) added the spray flow amount and the control flow amount to pass through commercially available oxygen removing means, it has been found the oxygen removing means 112 can reduce the oxygen concentration contained in the flow amount of 120 NL/min. under 0.5%.

Figure 6:
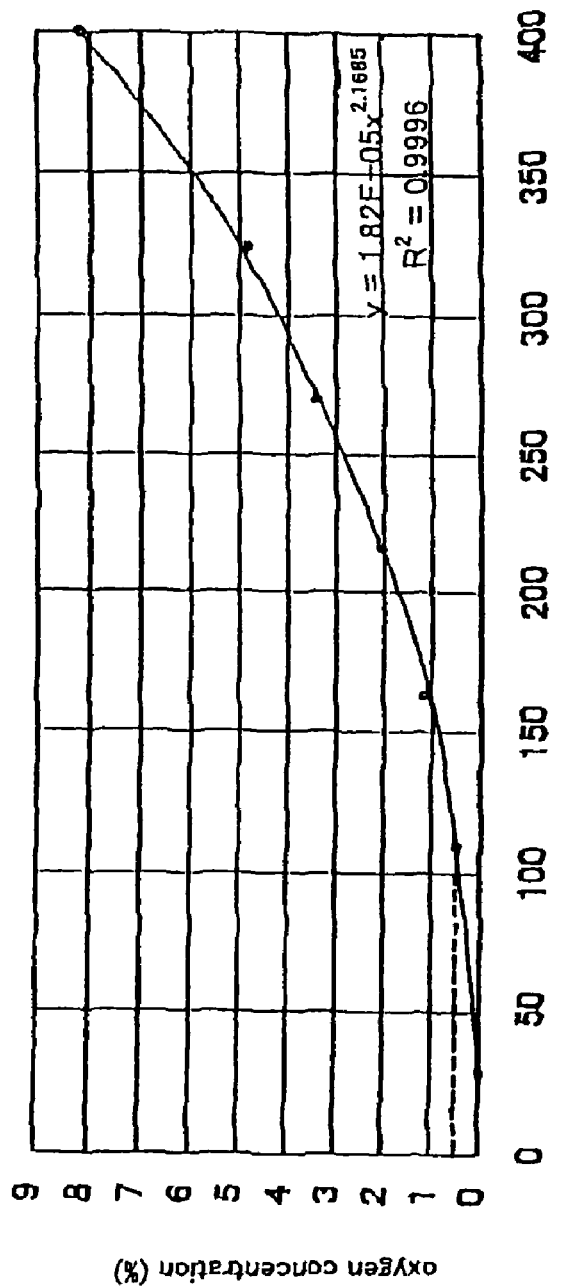
FIG. 6 is a graph exemplifying a preferable removing capacity of an oxygen removing means used for the tablet production apparatus shown in FIG. 1.

It is preferable to use an oxygen removing means which has a capacity more than the oxygen removal capacity shown in the graph in FIG. 6 as the oxygen removing means 112 of the tablet production apparatus Sa.

Next, the tablet production apparatus Sa is actually assembled and a tablet is really produced with the apparatus Sa to measure the oxygen concentration and the lubricant powder concentration in and around the tablet production apparatus Sa.

The oxygen concentration measuring means 131d is provided for measuring the oxygen concentration in the suction duct (conduit) T3 constructing the suction means 101 of the tablet production apparatus Sa.

The oxygen concentration in the transporting system around the oxygen removing means 112 of the tablet production apparatus Sa is measured by the oxygen concentration measuring means 131c.

The oxygen concentration around the lubricant powder discharge means 51 of the tablet production apparatus Sa is measured by the oxygen concentration measuring means 131b.

The oxygen concentration in the transporting system around the lubricant application means 91 of the tablet production apparatus Sa is measured by the oxygen concentration measuring means 131a.

The oxygen concentration in the transporting system around the dust collection passage of the tablet production apparatus Sa is measured by the oxygen concentration measuring means 131d.

The lubricant powder concentration measuring means 103b, 103c, and 103d in FIG. 1 are provided for measuring the lubricant powder concentration in the tablet production apparatus Sa.

The lubricant powder concentration in the transporting system around the oxygen removing means 112 of the tablet production apparatus Sa is measured by the lubricant powder concentration measuring means 103d.

The lubricant powder concentration in the transporting system around the lubricant powder discharge means 51 of the tablet production apparatus Sa is measured by the lubricant powder concentration measuring means 103c.

The lubricant powder concentration around the lubricant application means 91 of the tablet production apparatus Sa is measured by the lubricant powder concentration measuring means 103b.

The lubricant powder concentration in the transporting system around the dust collection passage of the tablet production apparatus Sa is measured by the lubricant powder concentration measuring means 103a.

With the tablet production apparatus Sa mentioned above, and according to the above-mentioned tablet production method, a tablet without causing tabletting problems were produced at an industrial production base.

Compressed air (flow amount=100 NL/min.) was generated by driving the blower 111.

The oxygen concentration in the transporting system around the oxygen removing means 112 was equal to or less than 0.5%.

The powder concentration around the oxygen removing means 112 was 0 g/m$^3$.

Static electricity charge to the transporting system around the oxygen removing means 112 wasn't observed.

From the above-mentioned results, it was found that a powder explosion would not occur because the oxygen concentration around the oxygen removing means 112 was remarkably lower than the explosion limit oxygen concentration, there was no powder (combustible material), and also the static electricity charge into the transporting system around the oxygen removing means 112 wasn't observed.

The oxygen concentration in the transporting system around the lubricant powder discharge means 51 was equal to or less than 0.5%.

The powder concentration around the lubricant powder discharge means 51 was 33.5 g/m$^3$.

Static electricity charge to the transporting system around the lubricant powder discharge means 51 wasn't observed.

From the above-mentioned results, it was found that a powder explosion would not occur because the powder concentration around the lubricant powder discharge means 51 was higher than the lower explosion limit concentration but the oxygen concentration was remarkably lower than the explosion limit oxygen concentration and also the static electricity charge into the transporting system around the lubricant powder discharge means 51 wasn't observed.

The oxygen concentration around the lubricant application means 91 was equal to or less than 0.5%.

The powder concentration around the lubricant application means 91 was 33.3 g/m$^3$.

Static electricity charge to the transporting system around the lubricant application means 91 wasn't observed.

From the above-mentioned results, it was confirmed that a powder explosion would not occur because the powder concentration around the lubricant application means 91 was higher than the lower explosion limit concentration but the oxygen concentration was remarkably lower than the explosion limit oxygen concentration and also the static electricity charge into the transporting system around the lubricant application means 91 wasn't observed.

The oxygen concentration in the transporting system around the dust collection passage was equal to or less than 21%.

The powder concentration in the transporting system around the dust collection passage was 0.91 g/m$^3$.

Static electricity charge to the transporting system around the dust collection passage wasn't observed.

From the above-mentioned results, it was cleared that a powder explosion would not occur because the powder concentration around the dust collection passage was higher than the lower explosion limit concentration but the powder (combustible material) concentration was kept remarkably lower than the explosion limit oxygen concentration and also the static electricity charge into the transporting system around the dust collection passage wasn't observed.

Preferred Embodiment of the Present Invention 2

Figure 7:
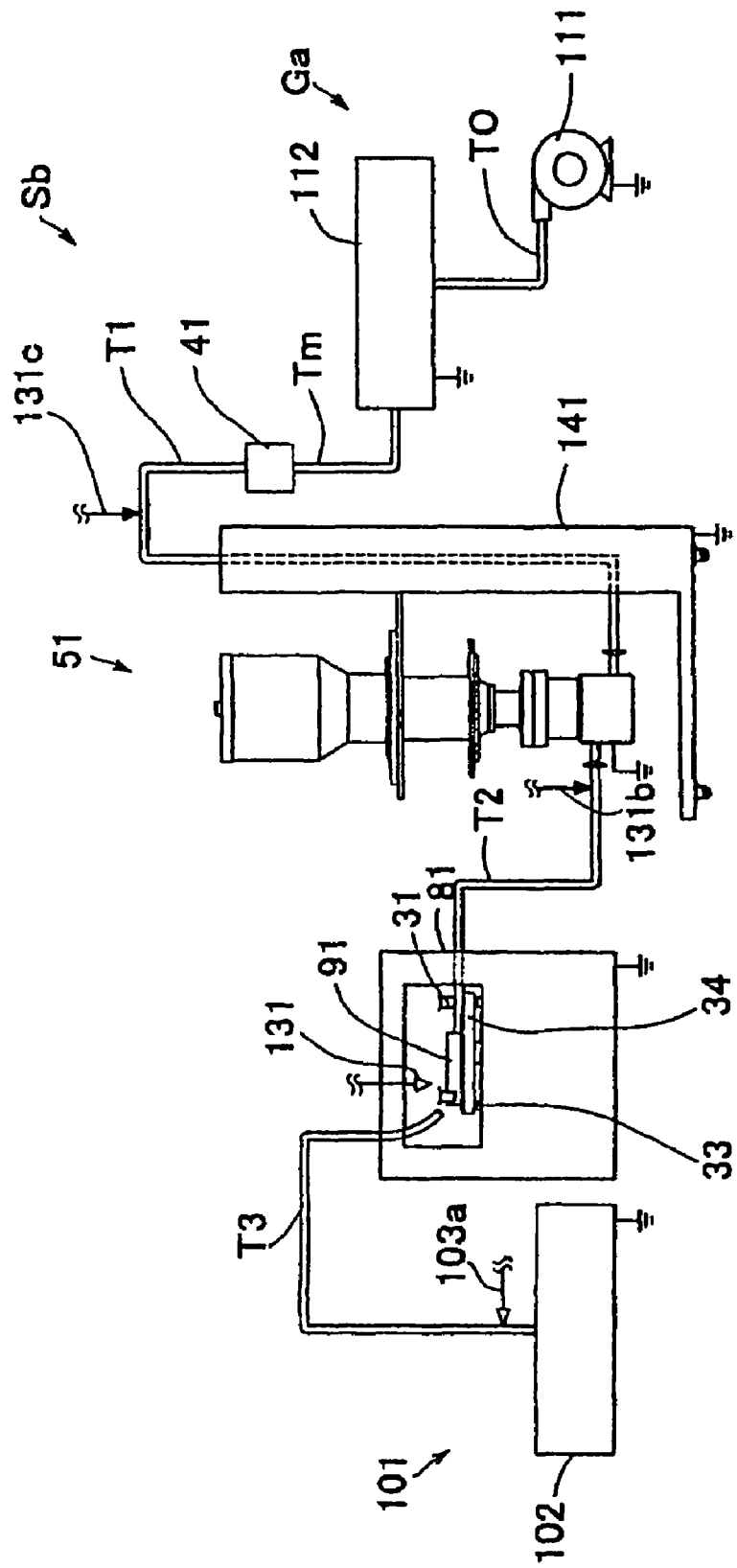
FIG. 7 diagrammatically shows other embodiment of the tablet production apparatus according to the present invention.

FIG. 7 diagrammatically shows other construction of the tablet production apparatus according to the present invention.

The tablet production apparatus (externally lubricating type tabletting machine) Sb uses the gas generator Ga in which a pulsating vibration gas generator 41 is further provided for the gas generator G shown in FIG. 1.

More specifically, the gas generator Ga has a blower 111, an oxygen removing means 112 for removing oxygen in a compressed air to be fed to a conduit Tm when the blower 111 is driven, and the pulsating vibration gas generator 41.

Figure 11A:
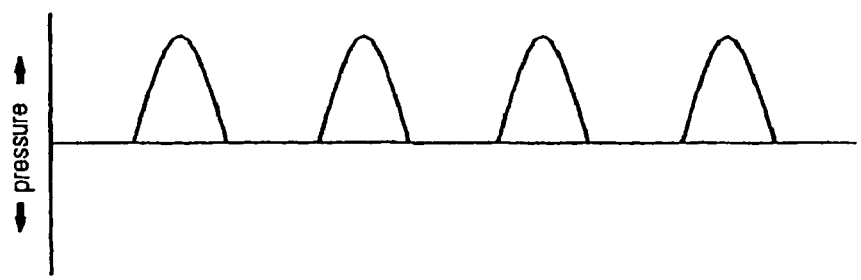
FIG. 11 is an explanatory view exemplifying a positive pulsating vibration gas.
Figure 11B:
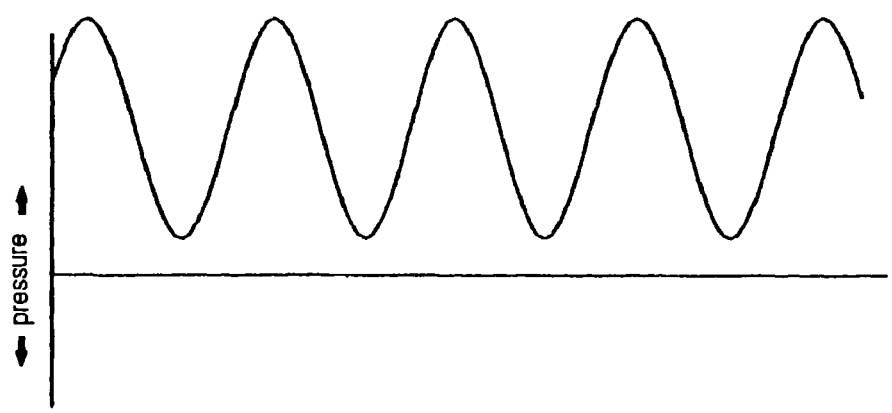

The vibration gas generator 41 is constructed so as to change the gas which is generated by driving the blower 111 of which oxygen is removed by the oxygen removing means 112 to a pulsating vibration gas (pulsating gas with a fixed frequency as shown in FIG. 11a and FIG. 11b).

The pulsating vibration gas generator 41 and a controller 121 are connected with a signal line (not shown) to send and receive signals therebetween. Pulsating vibration gas with a desirable frequency and desirable wave shape is generated by driving or stopping the pulsating vibration gas generator 41 or by controlling its drive amount by means of the controller 121.

The construction of the pulsating vibration gas generator 41 and the pulsating vibration gas are detailed hereinafter, so precise explanation is omitted here.

According to the tablet production apparatus (externally lubricating type tabletting machine) Sb, the blower 111, a conduit T0, the oxygen removing means 112, a conduit Tm, the pulsating vibration gas generator 41, a conduit T1, a lubricant powder discharge means 51, a conduit T2, and a lubricant application means 91 are airtightly kept.

More specifically, a blow port of the blower 111 is connected with one end of the conduit T0 airtightly, the other end of the conduit T0 is connected with a supply port of the oxygen removing means 112 airtightly, a discharge port of the oxygen removing means 112 is connected with one end of the conduit Tm airtightly, the other end of the conduit Tm is connected with a gas supply port (gas supply port 42a in FIG. 32) of the pulsating vibration gas generator 41 airtightly, a gas discharge port (gas discharge port 42b in FIG. 32) of the pulsating vibration gas generator 41 is connected with one end of the conduit T1 airtightly, the other end of the conduit T1 is connected with an air supply port of the lubricant powder discharge means 51 airtightly, a discharge port (discharge port 55b in FIG. 12) of the lubricant powder discharge means is connected with one end of the conduit T2 airtightly, the other end of the conduit T2 is connected with a lubricant introduction port of the lubricant spray means 91 airtightly so that the gas passage from the suction port of the blower 111 to the lubricant spray port for upper punch (lubricant spray port for upper punch 94 shown in FIG. 26) of the lubricant spray means 91 is kept airtight.

Figure 32:
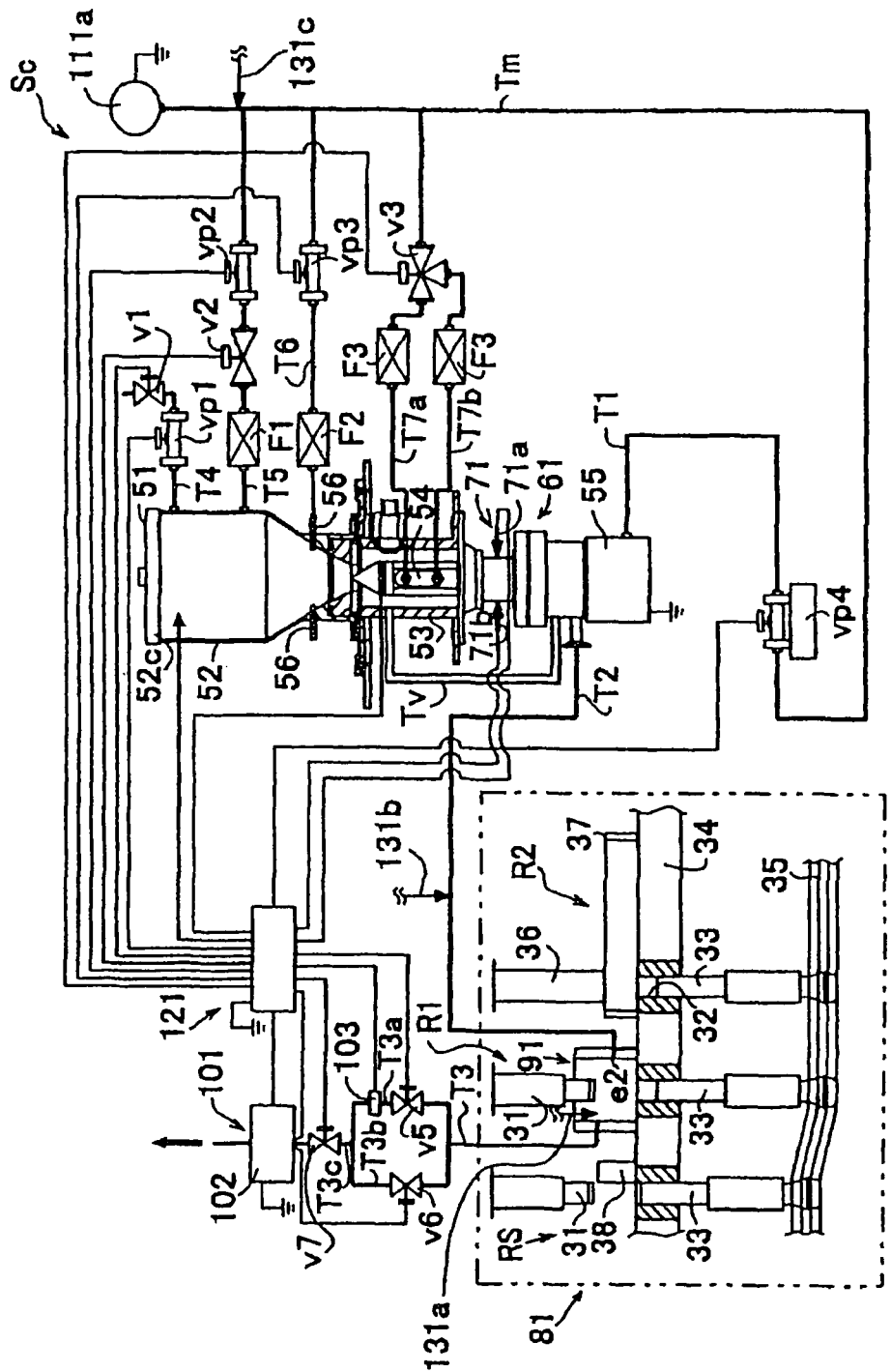
FIG. 32 diagrammatically shows the entire construction of the tablet production apparatus shown in FIG. 8.

For supplying a pulsating vibration gas to the lubricant powder discharge means 51, the blower is driven 111 by driving the pulsating vibration gas generator (see pulsating vibration gas generator 41 in FIG. 32). The gas which is sent to the conduit Tm from the blower 111 and of which oxygen is removed by the oxygen removing means 112 is changed into a pulsating vibration gas so as to be supplied to the lubricant powder discharge means 51.

Accordingly, when the pulsating vibration gas generator 41 is provided, the frequency, amplitude of the pulsating vibration gas generated from the pulsating vibration gas generator (see pulsating vibration gas generator 41 in FIG. 7) are controlled by the controller 121.

The amount of lubricant powder discharged from the lubricant discharge means 51 depends on the frequency of the pulsating vibration gas supplied to the lubricant powder discharge means 51 if the driving amount of blower 111 is constant in case of supplying the pulsating vibration gas to the lubricant powder discharge means 51.

Therefore, if the frequency of the pulsating vibration gas supplied to the lubricant powder discharge means 51 is increased, the discharge amount of lubricant powder discharged from the lubricant powder discharge means 51 is also increased, thereby enabling to supply lubricant powder with high concentration to the lubricant spray means 91.

Further, if the frequency of the pulsating vibration gas supplied to the lubricant powder discharge means 51 is lowered, the discharge amount of lubricant powder discharged from the lubricant powder discharge means 51 is also reduced, thereby enabling to supply lubricant powder with low concentration to the lubricant spray means 91.

Other constructions of the tablet production apparatus (externally lubricating type tabletting machine) Sb are the same as the tablet production apparatus (externally lubricating type tabletting machine) Sa shown in FIG. 1, so their explanations are omitted here.

Next, the operation of the tablet production apparatus (externally lubricating tabletting machine) Sb is explained.

Powder material to be a raw material of a tablet is prepared when a tablet is produced with the tablet production apparatus (externally lubricating type tabletting machine) Sb.

The powder material to be a raw material of a tablet is contained in a powder material storage hopper (not shown) of the rotary type tabletting machine 81.

Lubricant powder is contained in the lubricant powder discharge means 51.

Next, the controller 121 is turned on to actuate the oxygen concentration measuring means 131a and the lubricant powder measuring means 103a respectively.

The rotary type tabletting machine 81 is driven to rotate the turntable 34, the plural upper punches 31 . . . , the plural lower punches 34 . . . .

The blower 111, the pulsating vibration gas generator 41 and the suction means (lubricant suction means) 101 are driven at a desired driving amount.

The operation of the tablet production apparatus Sb is the same as that of the tablet production apparatus Sa in that each one of the blower 111 and the suction means (lubricant suction means) 101 is driven at a desirable driving amount when the apparatus Sb is operated. They are different in that the pulsating vibration gas generator 41 of the tablet production apparatus Sb is driven at a desirable driving amount and the supply amount of lubricant powder to the lubricant application means 91 is increased by enlarging the driving amount of pulsating vibration gas generator 41 even if the driving amount of blower 111 isn't changed when the supply amount of lubricant powder to the lubricant application means is small. Further, for stopping the tablet production apparatus (externally lubricating type tabletting machine) Sb (including automatic stop), the pulsating vibration gas generator 41 is also stopped other than stopping the blower 111 and the suction means (lubricant suction means) 101.

Preferred Embodiment of the Present Invention 3

Figure 8:
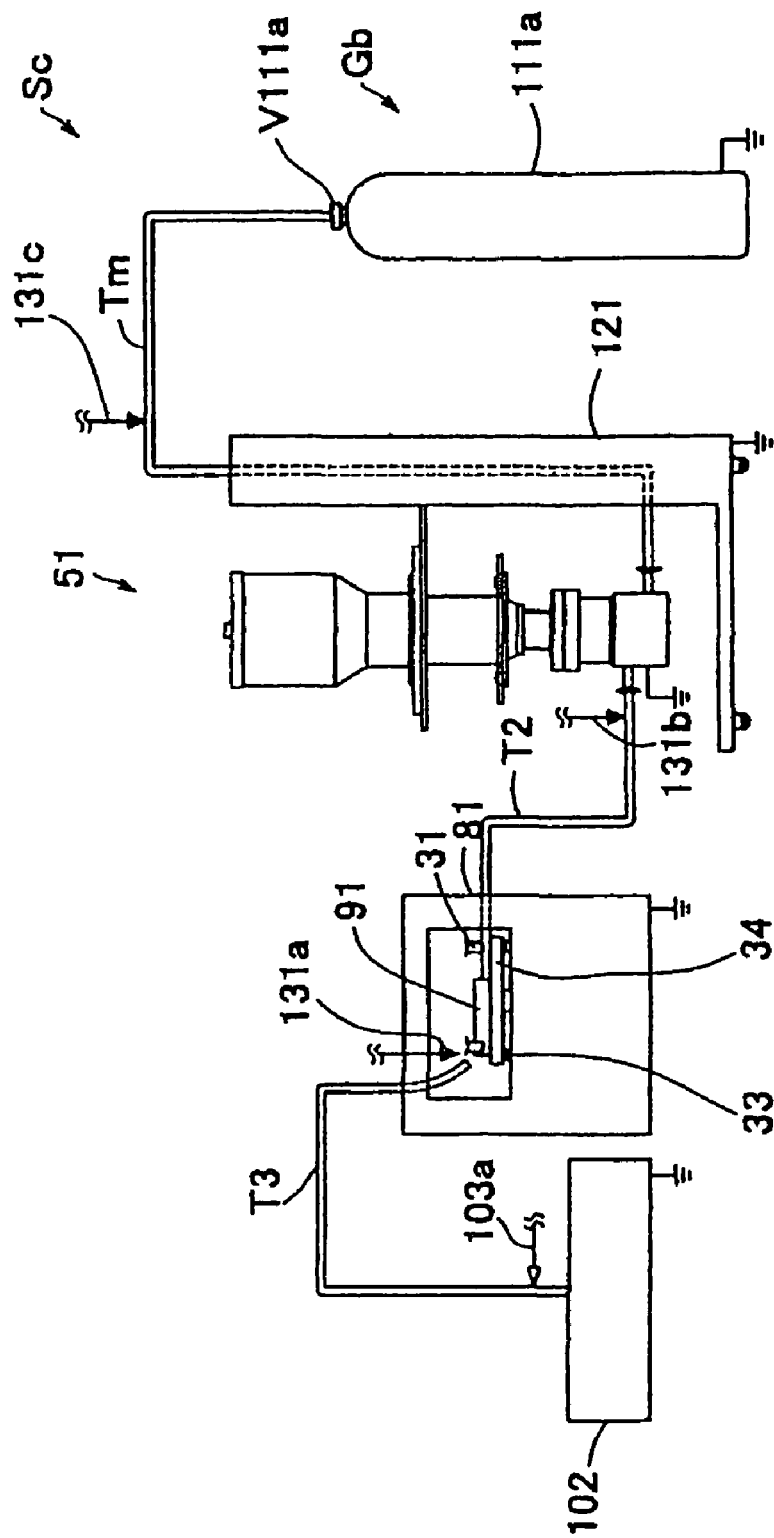
FIG. 8 diagrammatically shows other embodiment of the tablet production apparatus according to the present invention.

FIG. 8 diagrammatically shows other construction of the tablet production apparatus according to the present invention.

This tablet production apparatus (externally lubricating type tabletting machine) Sc uses a noninflammable gas generator 111a as the gas generator Ga and the oxygen removing means 112 which is a necessary part of the tablet production apparatus (externally lubricating type tabletting machine) Sa isn't provided. Other constructions are the same as those of the tablet production apparatus (externally lubricating type tabletting machine) Sa so that the corresponding members have the same reference numerals and their explanations are omitted here.

As the noninflammable gas generator 111a, for example, a gas container charged with a noninflammable gas such as nitrogen ($N_2$) gas, helium (He) gas and Argon (Ar) gas is used.

The member shown with the reference numeral v111a in FIG. 8 is a valve for controlling the flow amount and pressure of the noninflammable gas supplied to the lubricant powder discharge means 51 from the noninflammable gas generator 111a.

Electromagnetic valve using solenoid is used as the valve 111a in this embodiment. The valve v111a and a controller 121 are connected with a signal line (not shown) to send and receive signals therebetween. The flow amount and pressure of the noninflammable gas generated from the noninflammable gas generator 111a are controlled by the opening degree of the valve v111a by the signal sent from the controller 121.

Next, the operation of the tablet production apparatus (externally lubricating tabletting machine) Sc is explained.

Powder material to be a raw material of a tablet is prepared when a tablet is produced with the tablet production apparatus (externally lubricating tabletting machine) Sc.

The powder material to be a raw material of a tablet is contained in a powder material storage hopper (not shown) of the rotary type tabletting machine 81.

Lubricant powder is contained in a lubricant powder discharge means 51.

Next, the controller 121 is turned on to actuate an oxygen concentration measuring means 131a and a lubricant powder measuring means 103a respectively.

Rotary type tabletting machine 81 is driven to rotate a turntable 34, plural upper punches 31 . . . , plural lower punches 34 . . . .

Then the valve v111a provided for the noninflammable gas generator 111a is opened at a desirable degree and a suction means (lubricant suction means) 101 is driven at a desirable amount.

The operation of the tablet production apparatus (externally lubricating tabletting machine) Sc is the same as that of the tablet production apparatus (externally lubricating tabletting machine) Sa other than the valve v111a of the inflammable gas generator 111a is preferably opened when the apparatus Sc is operated and the valve v111a is closed when the apparatus Sc is stopped (including automatically stop). So the explanation of the same constructions is omitted here.

Preferred Embodiment of the Present Invention 4

Figure 9:
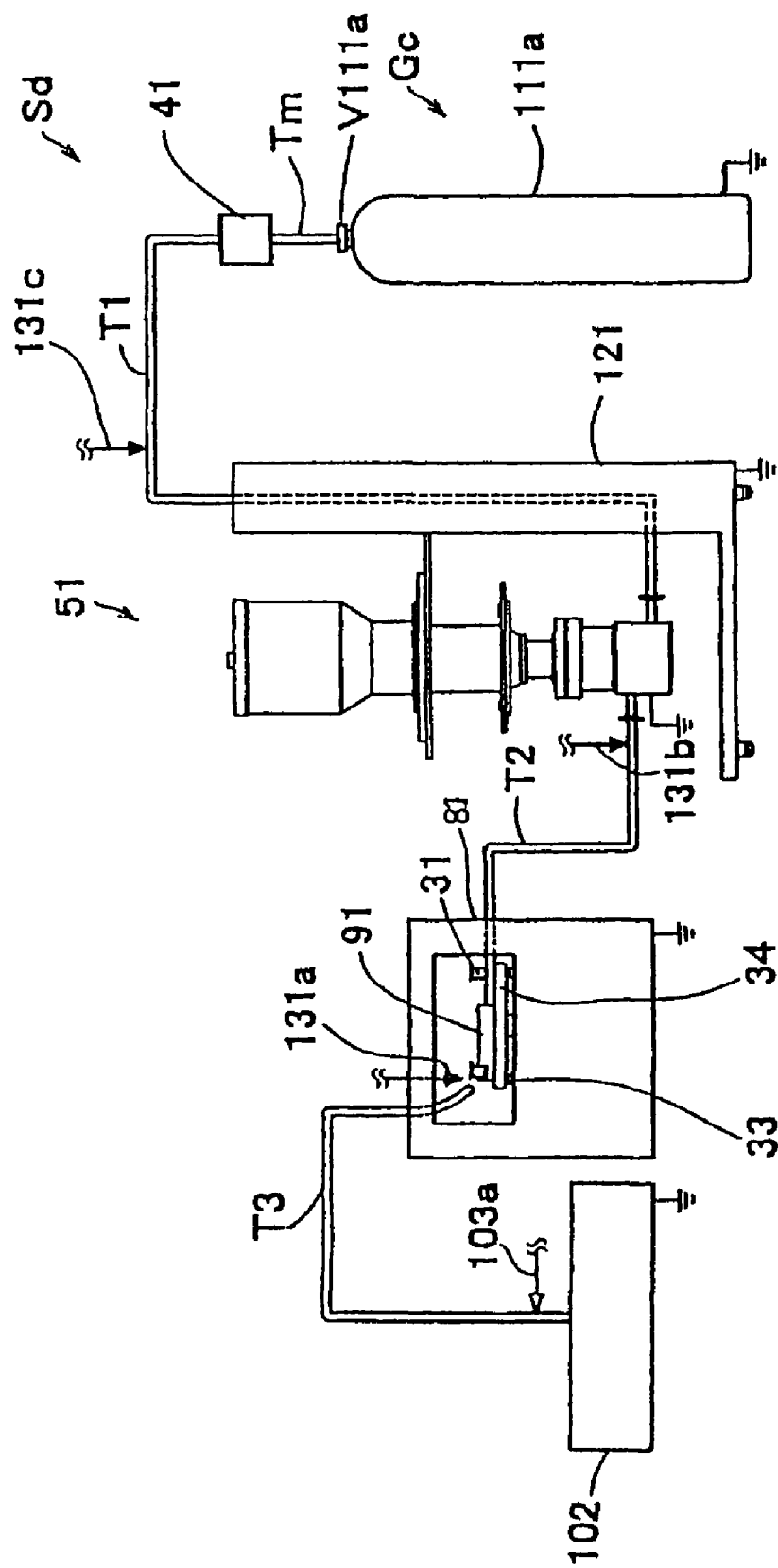
FIG. 9 diagrammatically shows other embodiment of the tablet production apparatus according to the present invention.

FIG. 9 diagrammatically shows other construction of the tablet production apparatus according to the present invention.

In this tablet production apparatus (externally lubricating type tabletting machine) Sd, the pulsating vibration gas generator 41 is further connected to the gas generator Ga of the tablet production apparatus (externally lubricating type tabletting machine) Sb using the inflammable gas generator 111a as the gas generator Gb. Other constructions are the same as those of the tablet production apparatus (externally lubricating type tabletting machine) Sc shown in FIG. 8 so that the corresponding members have the same reference numerals and their explanations are omitted here.

Next, the operation of the tablet production apparatus (externally lubricating tabletting machine) Sd is explained.

Powder material to be a raw material of a tablet is prepared when a tablet is produced with the tablet production apparatus (externally lubricating tabletting machine) Sd.

The powder material to be a raw material of a tablet is contained in a powder material storage hopper (not shown) of a rotary type tabletting machine 81.

Lubricant powder is contained in a lubricant powder discharge means 51.

Next, a controller 121 is turned on to actuate an oxygen concentration measuring means 131a and a lubricant powder concentration measuring means 103a respectively.

The rotary type tabletting machine 81 is driven to rotate a turntable 34, plural upper punches 31 . . . , plural lower punches 34 . . . .

Then a valve v111a provided for the noninflammable gas generator 111a is opened at a desirable degree and each one of the pulsating vibration gas generator 41 and a suction means (lubricant suction means) 101 is driven at a desirable amount.

The operation of the tablet production apparatus (externally lubricating tabletting machine) Sc is the same as that of the tablet production apparatus (externally lubricating tabletting machine) Sc other than the valve v111a of the inflammable gas generator 111a is preferably opened and the suction means (lubricant suction means) 101 is driven at a desirable driving amount when the apparatus Sd is operated. Further when the pulsating vibration gas generator 41 is driven at a desirable driving amount and the supply amount of lubricant powder to the lubricant application means 91 is small, if the driving amount to the pulsating vibration gas generator 41 is increased, the supply amount of lubricant powder to the lubricant application means 91 is increased even if the opened degree of the valve v111a isn't changed. In addition, for stopping the tablet production apparatus (externally lubricating type tabletting machine) Sb (including automatic stopping), the suction means (lubricant suction means) 101 is stopped with the valve v111a closed and further the pulsating vibration gas generator 41 is stopped. Other constructions are the same as the tablet production apparatus Sc, therefore, the explanation of the same operations is omitted here.

Next, the constructing members of the tablet production apparatus Sa, Sb, Sc and Sd are explained in detail.

In the following explanation, the construction of the tablet production apparatus Sb is mainly explained among the apparatuses Sa, Sb, Sc and Sd.

(Explanation of the Members Constructing the Tablet Production Apparatus Sb)

Figure 10:
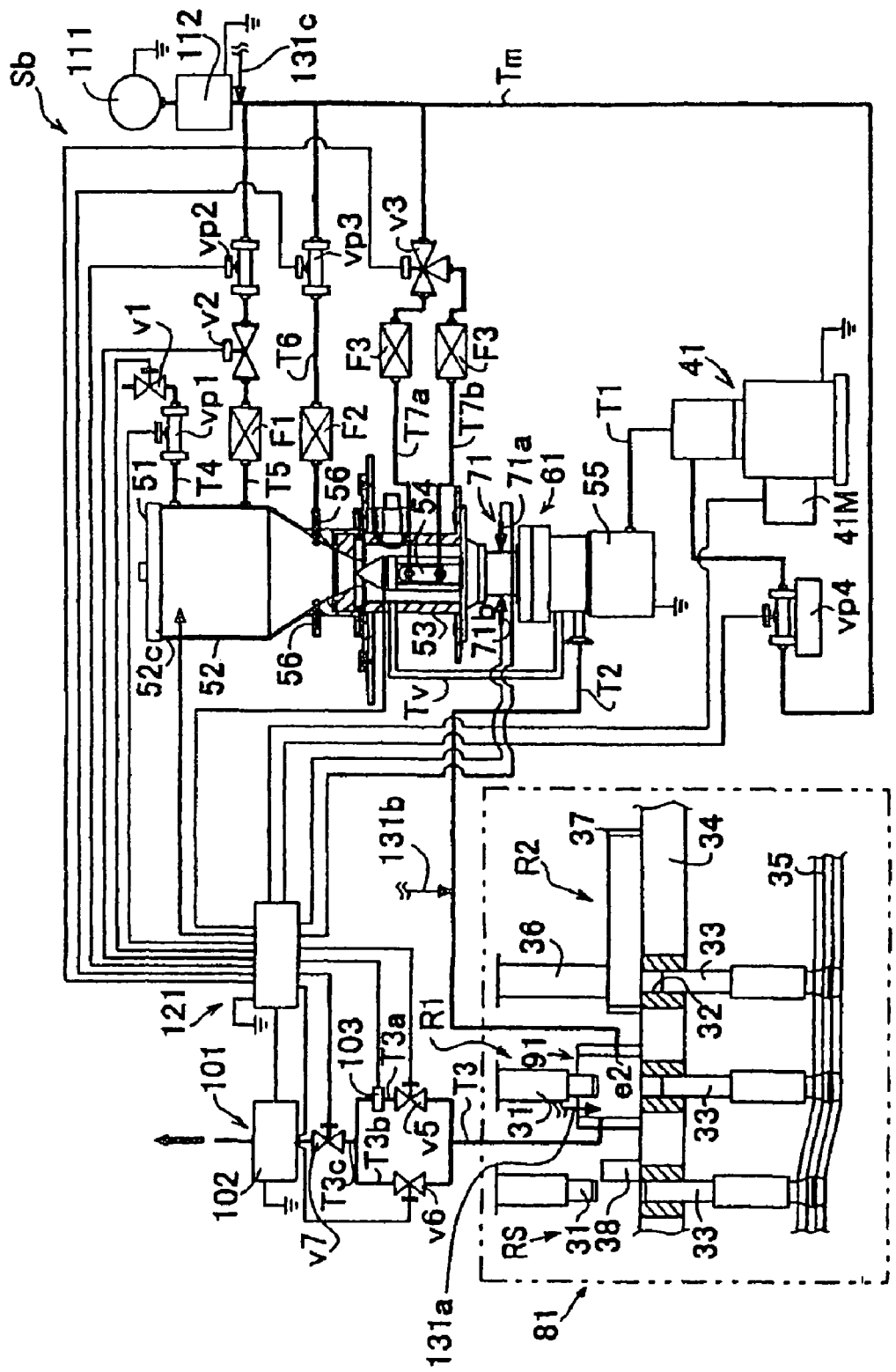
FIG. 10 diagrammatically shows the entire construction of the tablet production apparatus shown in FIG. 2.

FIG. 10 diagrammatically shows the entire construction of the tablet production apparatus (called as "externally lubricating type tabletting machine" hereinafter) Sb.

The externally lubricating type tabletting machine Sb has a pulsating vibration gas generator 41, a lubricant powder discharge means 51, a rotary type tabletting machine 81, a lubricant application means 91 provided at a fixed position of the rotary type tabletting machine 81, a lubricant suction means 101 for sucking surplus lubricant among the lubricant sprayed from the lubricant application means 91, a blower 111, an oxygen removing means 112, and a controller 121 for controlling and observing the entire externally lubricating type tabletting machine S.

The blower 111 and the pulsating vibration gas generator 41 of the externally lubricating type tabletting machine S are connected with a conduit Tm in such a manner that a compressed air generated by driving the blower 111 is supplied to the pulsating vibration gas generator 41 after the oxygen in the compressed air is removed by the oxygen removing means 112.

The pulsating vibration gas generator 41 and the lubricant powder discharge means 51 are connected with a conduit T1. The pulsating vibration gas generator 41 changes the compressed gas which is supplied via the conduit Tm after its oxygen is removed into a positive pulsating vibration gas to supply the conduit T1.

FIG. 11 is an explanatory view exemplifying a positive pulsating vibration gas.

"Pulsating vibration gas" means air wave of which pressure is changed.

"Positive" means that the pressure is higher than the pressure (atmospheric pressure) out of the externally lubricating type tabletting machine S.

The positive pulsating vibration gas supplied in the conduit T1 may be a pulsating vibration gas of which the peak amplitude is positive and the valley is atmospheric pressure as shown in FIG. 11a or may be a positive pulsating vibration gas of which the peak and valley are positive as shown in FIG. 11b.

The lubricant powder discharge means 51 and the lubricant application means 91 are connected with a conduit T2.

When the positive pulsating vibration gas is supplied to the lubricant powder discharge means 51 via the conduit T1, a lubricant powder is quantitatively mixed and dispersed with the positive pulsating vibration gas to be supplied to the conduit T2.

The lubricant powder thus supplied with the positive pulsating vibration gas to the conduit T2 is pneumatically transported in the conduit T2 together with the positive pulsating vibration gas to be supplied in the lubricant application means 91 and to be sequentially sprayed on the surface S31 (lower face) of the upper punch 31, the surface S32 (inner circumference) of the die 32 and the surface S33 (upper face) of the lower punch 33 contained in the lubricant application means 91.

The lubricant application means 91 and the suction means (lubricant suction means) 101 are connected with a conduit T3.

When the suction means (lubricant suction means) 101 is driven, surplus amount of lubricant which is sprayed on the surface S31 (lower face) of the upper punch 31, the surface S32 (inner circumference) of the die 32 and the surface S33 (upper face) of the lower punch 33 in the lubricant application means 91 is designed to be sucked and removed through a conduit T3.

Next, each member consisting the externally lubricating type tabletting machine S.

Figure 12:
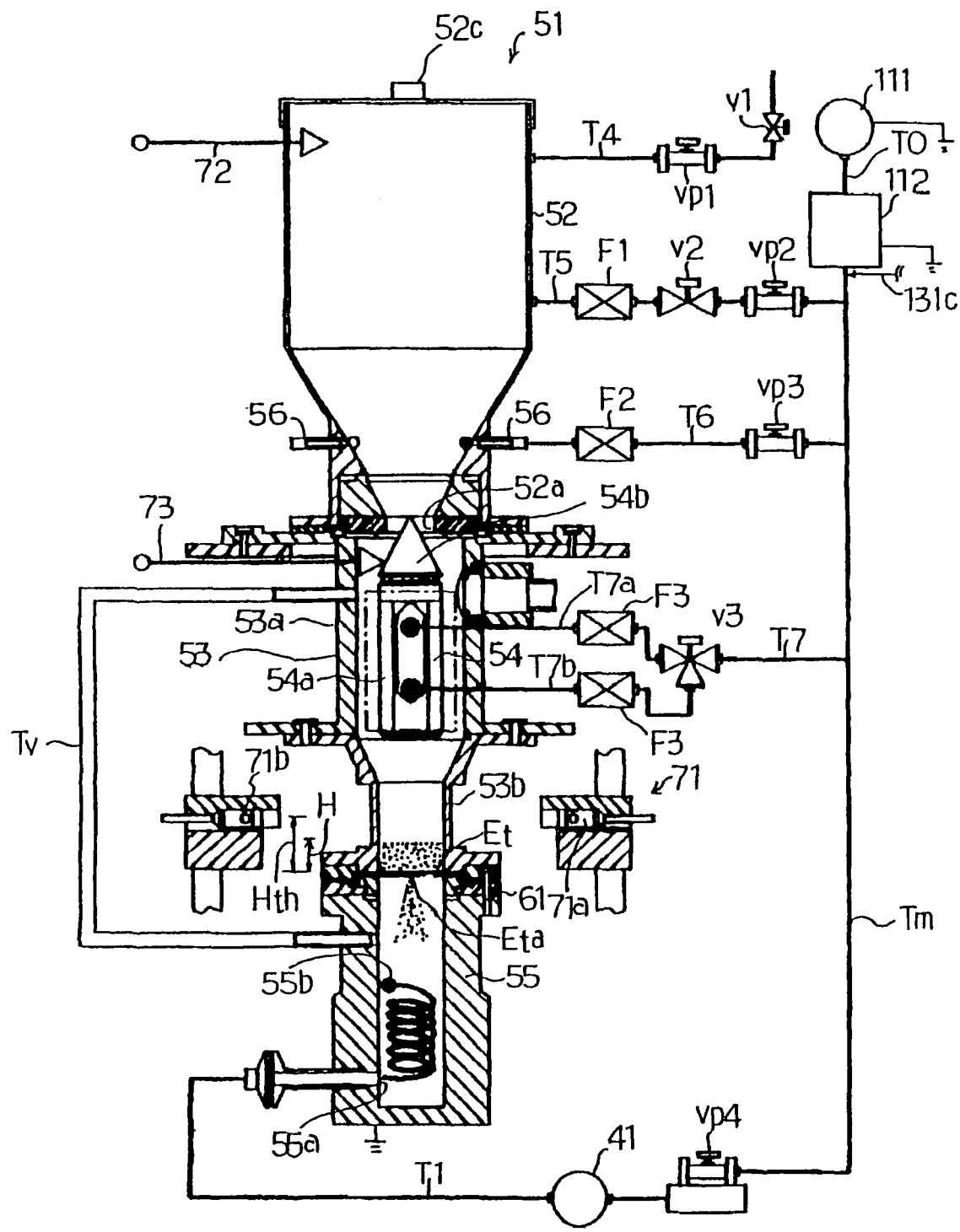
FIG. 12 is an explanatory view of a lubricant powder discharge means.

FIG. 12 is an explanatory view of a lubricant powder discharge means.

The lubricant powder discharge means 51 has a lubricant storage hopper 52, a cylindrical body 53 airtightly connected to a material discharge port 52a of the lubricant storage hopper 52, a material feed valve 54 provided for the material discharge port 52a of the hopper 52 so as to open and close the port 52a, an elastic membrane Et provided to from the bottom of the cylindrical body 53, and a dispersion chamber 55 airtightly connected under the cylindrical body 53 via the elastic membrane Et.

Gas injection means 56, 56 are provided in the lubricant storage hopper 52 around the material discharge port 52a.

Figure 13A:
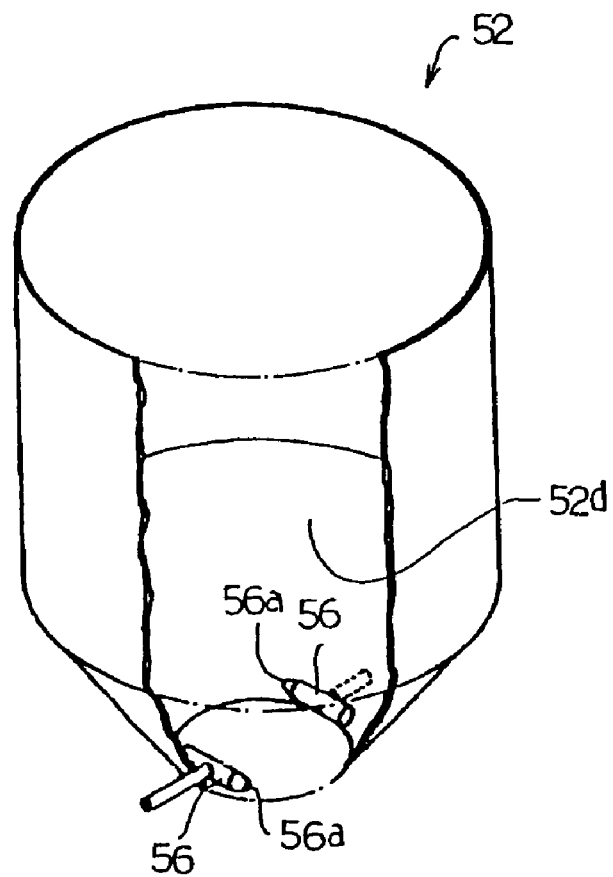
FIG. 13a is an oblique perspective view showing the lubricant storage hopper.
Figure 13B:
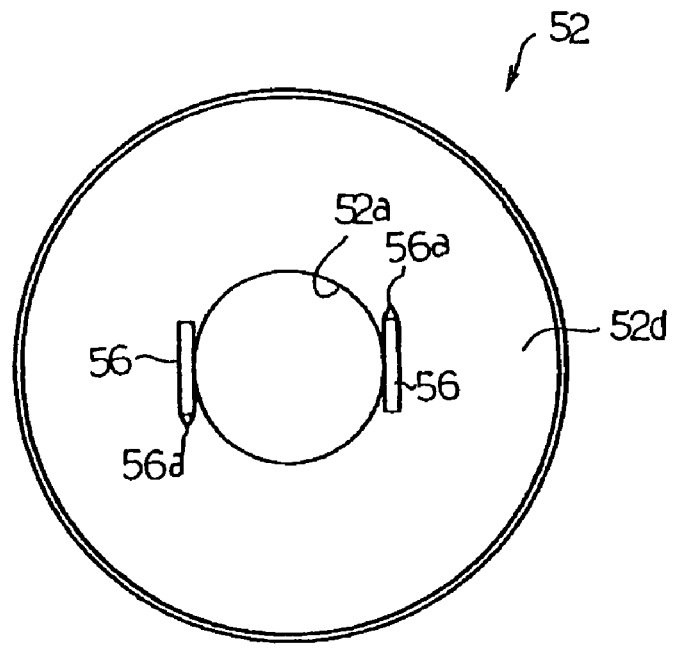

FIG. 13 is an explanatory detailed view of the lubricant storage hopper 52, FIG. 13a is an oblique perspective view showing the lubricant storage hopper 52, FIG. 13b is a plane view showing a substantial part of the lubricant storage hopper 52 shown in FIG. 13a.

Each one of the gas injections means 56, 56 is provided in a substantially tangential direction against the inner circumference of the lubricant storage hopper 52.

More specifically, each one of the gas generator 56, 56 is provided at the upper outer circumference of the material discharge port 52a in the area of a corn part 52d of the lubricant storage hopper 52 and in a substantially tangential direction against the material discharge port 52a.

In FIG. 12 and FIG. 13 two gas injection means are provided, however, the number of the gas injection means 56 isn't limited to two. It may be one or more than three. If more than two gas injection means 56 are provided, each injection port 56a . . . of the gas injection means 56 . . . is arranged in such a manner that gas is injected in the same rotational direction.

The reference numeral 52c in FIG. 12 is a cover detachably provided for the material feed port 52b of the lubricant storage hopper 52.

In this embodiment, the cover 52c is airtightly attached on the material feed port 52b of the lubricant storage hopper 52.

A conduit T4 is connected to the lubricant storage hopper 52 so as to be communicated with atmospheric air.

Further, the lubricant storage hopper 52 and the conduit Tm are connected with a conduit T5 for which a switch valve v2 and a pressure regulating valve vp2 are provided.

The member shown with F1 provided for the conduit T5 is a filter for removing dust in the air supplied in the conduit T5. The filter F1 is provided if necessary.

Each one of the gas injection means 56, 56 and the conduit Tm are connected with a conduit T6. FIG. 12 only shows the conduit T6 is connected to one of the gas injection means 56 and the conduit T6 connected to the other gas injection means 56 is omitted.

A pressure regulating valve vp3 is provided for the conduit T6.

The member shown with F2 provided for the conduit T6 is a filter for removing dust in the air supplied in the conduit T6. The filter F2 is provided if necessary.

In this embodiment the material feed valve 54 has a plug 54b and an open-close driving means (actuator) 54a for moving the plug 54b up and down.

Driving of open-close operation of the material feed valve 54 is done by air.

The material feed valve 54 and the conduit Tm are connected with a conduit T7.

The conduit T7 is divided into two branch pipes T7a, T7b to be connected to the open-close driving means (actuator) 54a of the material feed valve 54.

In this embodiment a switch valve v3 is provided for the conduit T7 in such a manner that the plug 54b of the material feed valve 54 does down to open the material discharge port 52a of the lubricant storage hopper 52 when the branch pipe T7a side of the switch valve v3 is opened and the branch pipe T7b side is closed, and the plug 54b of the material feed valve 54 does up to close the material discharge port 52a of the lubricant storage hopper 52 when the branch pipe T7b side of the switch valve v3 is opened and the branch pipe T7a side is closed.

The member shown with F3 provided for each one of the branch pipes T7a, T7b is a filter for removing dust in the air supplied in the conduit T7. The filter F3 is provided if necessary.

Next the construction of the elastic membrane Et is explained.

Figure 14:
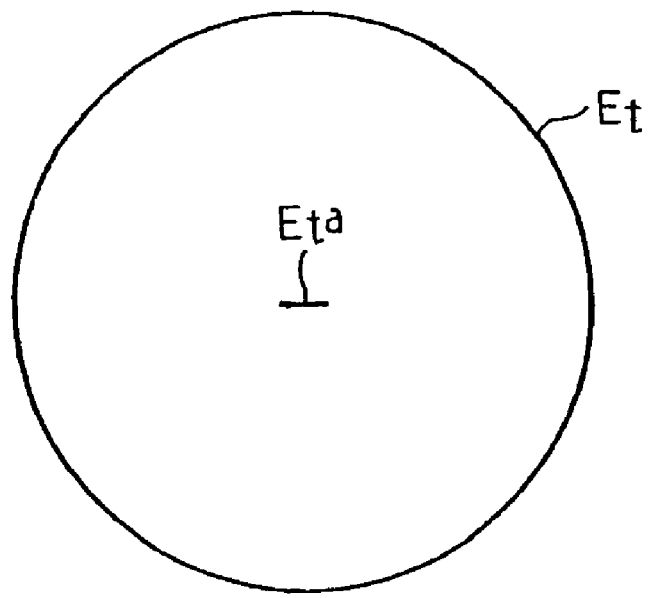
FIG. 14 is a plane view diagrammatically showing an elastic membrane.

FIG. 14 is a plane view diagrammatically showing the elastic membrane Et.

The elastic membrane Et is made of an elastic material like a synthetic rubber such as a silicone rubber and has a penetrating aperture Eta at the center thereof. The penetrating aperture Eta is formed like a slit.

The elastic membrane Et is provided between the cylindrical body 53 and the dispersion chamber 55 by means of an elastic membrane installation means 51.

Figure 15:
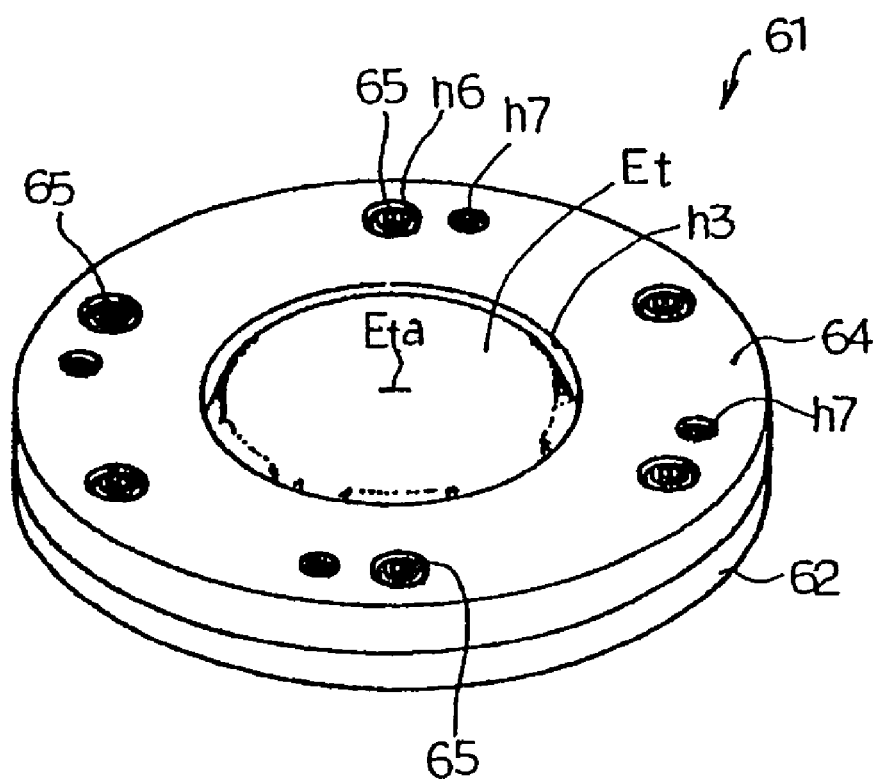
FIG. 15 is a perspective view when an elastic membrane is attached to an elastic membrane installation means used in the lubricant powder discharge means.
Figure 16:
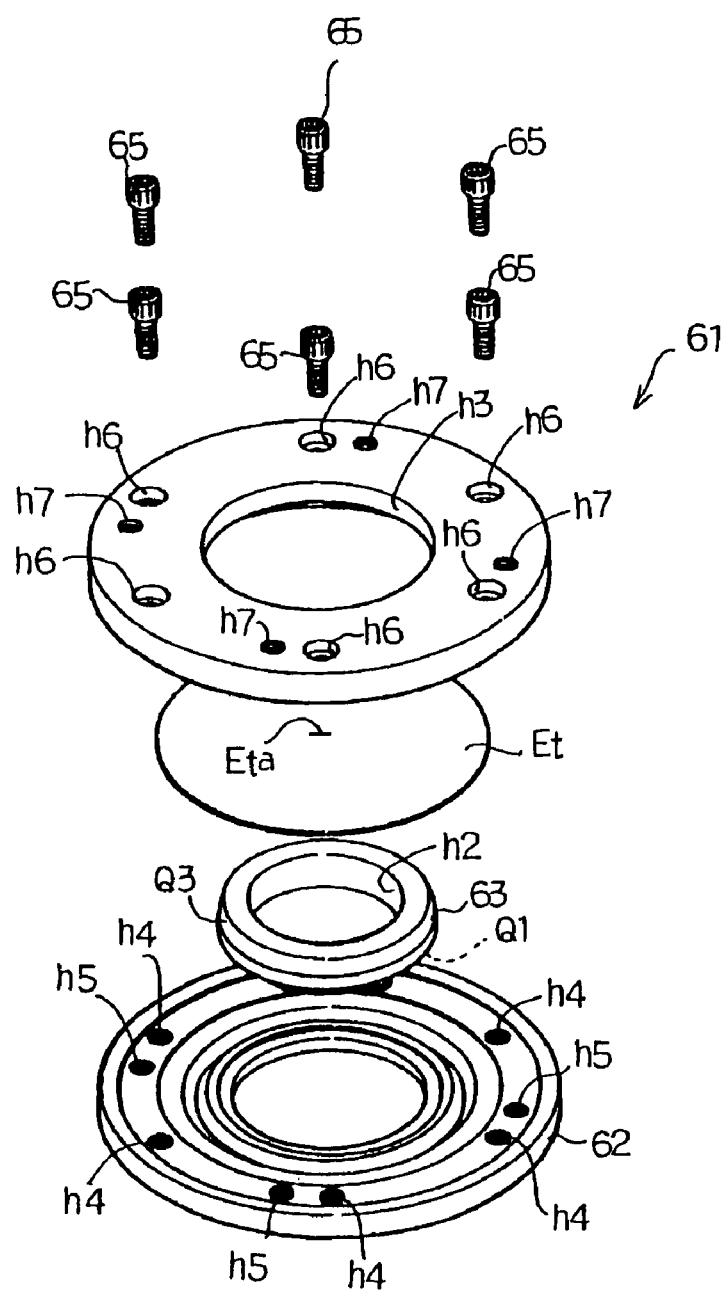
FIG. 16 is a disjoined perspective view diagrammatically showing the construction of the elastic membrane installation means shown in FIG. 15.

FIG. 15 is an oblique perspective view when the elastic membrane is attached to the elastic membrane installation means used in the lubricant powder discharge means 51. FIG. 16 is an exploded perspective view diagrammatically showing the construction of the elastic membrane installation means shown in FIG. 15. FIG. 17 is a sectional view diagrammatically showing the construction of the elastic membrane installation means shown in FIG. 15.

The elastic membrane installation means 61 has a pedestal 62, a push-up member 63 and a presser member 64.

The pedestal 62 has an opening h1 and a ring-like platform S1 for placing the push-up member 63 is provided at the periphery of the opening h1. Further, a V-groove Dv is provided for the pedestal 62 so as to surround the opening h1 like a ring.

The push-up member 63 has an opening h2. In this embodiment, the push-up member 63 has a stepped part Q1 at its lower part as shown in FIG. 17 in such a manner that the part Q1 is positioned on the platform S1 of the pedestal 62 when the push-up member 63 is placed on the pedestal 62.

When the push-up member 63 is placed on the pedestal 62 in this embodiment, a lower extended part Q2 formed so as to be extended downward from the step part Q1 of the push-up member 63 is designed to be incorporated in the opening h1 of the pedestal 62. Namely, the lower extended part Q2 of the push-up member 63 is precisely processed in such a manner that its outer diameter D2 is almost the same as or a little smaller than the inside diameter D1 of the opening h1 of the pedestal 62.

Furthermore in this embodiment, an inclined plane extending from top to bottom in a sectional view is provided at the periphery of an upper part Q3 of the push-up member 63.

The presser member 64 has an opening h3. A ring-like V-shaped projection Cv is provided for a surface S4 of the presser member 64 facing the pedestal 62 so as to be engaged in the V-groove Dv on the surface of the pedestal 62.

The member indicated by a numeral 65 in FIG. 15 and FIG. 16 shows fastening means such as a bolt.

The hole shown as h4 in FIG. 16 is a fixing hole of the fastening means 65 formed on the pedestal 62, and the hole shown as h6 is a fixing hole of the fastening means 65 formed on the presser member 64, respectively. The hole shown as h5 in FIG. 16 is a fixing hole of the pedestal 62 for attaching the elastic membrane installation means 61 to a desired device by means of fixing means such as a bolt (not shown). The hole h7 formed on the presser member 64 is for attaching the elastic membrane installation means 61 to a desired device by means of fixing means such as a bolt (not shown).

In this embodiment, the inside diameter D4 of the opening h3 of the presser member 64 is precisely processed so as to be the same as or a litter larger than the external diameter D3 of the push-up member 63.

Next, installation procedures of the elastic membrane Et on the elastic membrane installation means 61 will be explained hereinafter.

The push-up member 63 is placed on the surface of the pedestal 62 at first for installing the elastic membrane Et on the elastic membrane installation means 61.

Then, the elastic membrane Et is placed on the push-up member 63.

The presser member 64 is placed on the push-up member 63 so as to cover both the push-up member 63 and the elastic membrane Et in such a manner that each fixing hole h4 . . . on the pedestal 62 is aligned with each fixing hole h6 . . . on the presser member 64.

Next, the presser member 4 is fastened to the pedestal 62 by screwing each fastening means such as a bolt 65 . . . into each fastening hole h4 . . . and each corresponding fastening hole h5 . . . .

Accordingly, the elastic membrane Et is placed on the push-up member 63 on the pedestal 62 of the elastic membrane installation means 61 and the presser member 64 is fastened to the pedestal 62 so that the elastic membrane Et is pushed upward to the presser member 64 by the push-up member 63. As a result, the elastic membrane Et is expanded from its inside to its periphery by being pushed upward into the presser member 64.

At first, the elastic membrane Et expanded by the push-up member 63 is gradually inserted between the V-groove Dv formed on the pedestal 62 and the V-shaped projection Cv formed on the surface of the presser member 64 facing the pedestal 62 via the space between the periphery P3 of the push-up member 63 and the surface (inner surface) forming the opening h3 of the presser member 64.

Furthermore, as the presser member 64 is fastened to the pedestal 62 by means of the fastening means such as a bolt 65 . . . , the elastic membrane Et comes to be held between the periphery P3 of the push-up member 63 and the inner surface of the opening h3 of the presser member 64 while being pushed up into the presser member 64 by the push-up member 63. When the elastic membrane Et is further pushed up into the presser member 64 by the push-up member 63, the expanded part of the elastic membrane Et from inside to outside is held between the V-groove Dv formed on the surface of the pedestal 62 and the V-shaped projection Cv on the surface of the presser member 64 facing the pedestal 62.

In other words, according to the elastic membrane installation means 61, the elastic membrane Et is placed on the push-up member 63 on the pedestal 62 and the presser member 64 is fastened to the pedestal 62, then the elastic membrane Et is pushed up to the presser member 64 by the push-up member 63, so that the elastic membrane Et is kept stretched from its inside to outside. Furthermore, the periphery of the elastic membrane Et expanded by the push-up member 63 is held between the V-groove Dv formed on the pedestal 62 and the V-shaped projection Cv provided on the face of the presser member 64 opposing the pedestal 62. As a result, the elastic membrane installation means 61 can keep the elastic membrane Et stretched only by a simple operation such that the elastic membrane Et is placed on the push-up member 63 on the pedestal 62 and the presser member 64 is fastened to the pedestal 62.

In addition, the inclined plane Q3 enlarging from top to bottom in its section is provided at the periphery of the push-up member 63 of the elastic membrane installation means 61.

The inclined plane Q3 is an important element of the elastic membrane installation means 61 and is detailed hereunder.

The inclined plane Q3 of which the bottom section is broader than the top section is provided for the periphery of the push-up member 63 of the elastic membrane installation means 61. Therefore, the expanded part of the elastic membrane Et from inside to outside by being pushed up into the presser member 64 is easily moved into between the V-groove Dv annularly formed on the pedestal 62 and the V-shaped projection Cv annularly formed on the surface of the presser member 64 facing the pedestal 62.

More specifically, when the external diameter of the inclined plane Q3 of the push-up member 63 is substantially smaller than the inner diameter D4 of the opening h3 of the presser member 64, there is an adequate gap (space) between the inclined plane Q3 of the push-up member 63 and the surface forming the opening h3 of the presser member 64, so that the expanded part of the elastic membrane Et from inside to outside by the push-up member 63 is easily guided to the V-groove Dv annularly provided on the surface of the pedestal 62 via the gap.

The inclined plane Q3 of the periphery of the push-up member 63 is designed so as to be enlarged from top to bottom in a section. Therefore, the expanded part of the elastic member Et from inside to outside by the push-up member 63 is guided to the V-groove Dv annularly provided on the pedestal 62 along the surface of the inclined plane Q3.

Then the presser member 64 is fastened to the pedestal 62 by screwing each fastening means such as a bolt 65 . . . into each fixing hole h4 . . . and each corresponding fixing hole h6 . . . . Accordingly the external diameter of the inclined plane Q3 of the push-up member 63 gets closer to the inner diameter D4 of the opening h3 of the presser member 64. When the gap (space) between the inclined plane Q3 of the push-up member 63 and the surface consisting the opening h3 of the presser member 64 becomes about the thickness (wall thickness) of the elastic membrane Et, the elastic membrane Et comes to be held between the inclined plane Q3 of the push-up member 63 and the surface consisting the opening h3 of the presser member 64.

According to the above-mentioned operations, the elastic membrane Et is placed on the push-up member 63 on the pedestal 62 of the elastic membrane installation means 61, then the presser member 64 is fastened to the pedestal 62 by means of the fixing means such as a bolt 65 . . . , thereby keeping the elastic membrane Et strained by such simple operations.

When the presser member 64 is fastened to the pedestal 62 by means of the fixing means such as a bolt 65 . . . , the distance between the inclined plane Q3 of the periphery of the push-up member 63 and the inner circumference of the opening h3 of the presser member 64 becomes small, and the elastic membrane Et is tightly held between the inclined plane Q3 of the push-up member 63 and the inner circumference of the opening h3 of the presser member 64, preventing the elastic membrane Et from being slack.

Further, if the elastic membrane Et is attached with the elastic membrane installation means 61, it is doubly locked between the inclined plane Q3 of the push-up member 63 and the surface consisting the opening h3 of the presser member 64 and between the V-shaped projection Cv annularly provided on the surface of the presser member 64 facing the pedestal 62 and the V-groove Dv annularly provided on the pedestal 62. Thereby, the elastic membrane Et doesn't get slack after the presser member 64 is fastened to the pedestal 62.

According to the lubricant powder discharge means 51, the presser member 64 of the elastic membrane installation means 61 on which the elastic membrane Et is attached is airtightly installed at the lower part of the cylindrical body 53 and the pedestal 62 is airtightly provided on the top of the dispersion chamber 55.

In the lubricant powder discharge means 51, a bypass pipe Tv is provided between the dispersion chamber 55 and the cylindrical body 53 as shown in FIG. 10. This bypass pipe Tv is provided for quickly achieving the balance between the pressure in the dispersion chamber 55 and that in the cylindrical body 53.

A level sensor 71 for detecting the amount of lubricant powder stored on the elastic membrane Et in a lower cylindrical body 53b is provided for the lower cylindrical body 53b. The level sensor 71 has a light emitting element 71a for generating light such as infrared rays and visible rays and a light receiving element 71b for receiving the light generated from the light emitting element 71a. The light emitting element 71a and the light receiving element 71b are provided to be opposed each other so as to interpose the lower cylindrical body 53b.

The amount of lubricant powder stored on the elastic membrane Et in the lower cylindrical body 53b can be detected at a position Hth (at height where the level sensor 71 is provided above the elastic membrane Et).

Namely, when the amount of lubricant powder stored on the elastic membrane Et in the lower cylindrical body 53b exceeds the position Hth (height where the level sensor 71 is provided above the elastic membrane Et), the light radiated from the light emitting element 71a is blocked off by the lubricant powder and isn't received by the light receiving element 71b (off). Then it can be detected that the height H of the lubricant powder stored on the elastic membrane Et in the lower cylindrical body 53 exceeds the height Hth (H>Hth).

On the other hand, when the amount of lubricant powder stored on the elastic membrane Et in the lower cylindrical body 53b becomes lower than the position Hth (height where the level sensor 71 is provided above the elastic membrane Et), the light emitted from the light emitting element 71a can be received by the light receiving element 71b (on). Then it can be detected that the height H of the lubricant powder stored on the elastic membrane Et in the lower cylindrical body 53b is under the height Hth (H<Hth).

In this embodiment the material feed valve 54 moves up and down depending on the detected values of the level sensor 71 so as to open and close the discharge port 52a of the lubricant storage hopper 52. More specifically according to the lubricant powder discharge means 51, the light emitting element 71a of the level sensor 71 is turned on while the lubricant powder discharge means 51 is driven. When the light from the light emitting element 71a doesn't come to be received in the light receiving element 71b (off), the material feed valve 54 is moved up to close the discharge port 52a of the lubricant storage hopper 52. When the light from the light emitting element 71a is received by the light receiving element 71b (on), the material feed valve 54 is moved down to open the discharge port 52a of the hopper 52 until the light isn't received by the light receiving element 71b (off), thereby always storing substantially the same quantity of lubricant powder is always stored on the elastic membrane Et in the lower cylindrical body 53b while the lubricant powder discharge means 51 is driven.

The inner shape of the dispersion chamber 55 is designed to be approximately tubular so as to make a positive pulsating vibration gas swirl therein. In this embodiment, such a dispersion chamber 55 of which inner shape is tubular is used, however, its shape isn't limited as far as a positive pulsating vibration gas easily swirls therein. Therefore, the inner shape isn't limited to be approximately tubular.

The lower cylindrical body 53b of the cylindrical body 53 is made of clear resin, specifically a light permeable material such as glass, acrylate resin, polycarbonate resin, and so on.

Further, it is preferable that the lower cylindrical body 53b is made of polycarbonate resin and its inner circumferential wall is mirror finished.

It is because that if the lower cylindrical body 53b is made of polycarbonate resin and its inner circumferential wall is mirror finished, a powdered material is hardly adhered on the inner circumference of the lower cylindrical body 53b comparing with the case when other material is used, thereby obtaining high detection accuracy of the level sensor 71.

The pulsating vibration gas supply port 55a is provided at a lower part of the dispersion chamber 55 in substantially a tangential direction against the inside perimeter of the chamber 55. The discharge port 55b is provided at an upper part of the dispersion chamber 55 in substantially a tangential direction against the inside perimeter of the chamber 55. A conduit T5 is connected to the pulsating vibration gas supply port 55a and a conduit (for example see the conduit T6 in FIG. 12) is connected to the pulsating vibration gas discharge port 55b.

Further referring to FIG. 12, the pulsating vibration gas supply port 55a is provided at a lower part of the dispersion chamber 55 in substantially a tangential direction against the inside perimeter of the chamber 55 and the discharge port 55b is provided at an upper part of the dispersion chamber 55 in substantially a tangential direction against the inside perimeter of the chamber 55.

The pulsating vibration gas supply port 55a of the dispersion chamber 55 and the pulsating vibration gas generator 41 are connected with the conduit T1 to supply a positive pulsating vibration gas generated from the pulsating vibration gas generator 41 into the dispersion chamber 55 via the conduit T1 when the pulsating vibration gas generator 41 is driven.

The discharge port 55b and the lubricant application means (lubricant application means 91 in FIG. 10) are connected by a conduit (conduit T2 in FIG. 10).

Here the position of the pulsating vibration gas supply port 55a provided for the dispersion chamber 55 is detailed referring to FIG. 18.

Figure 18A:
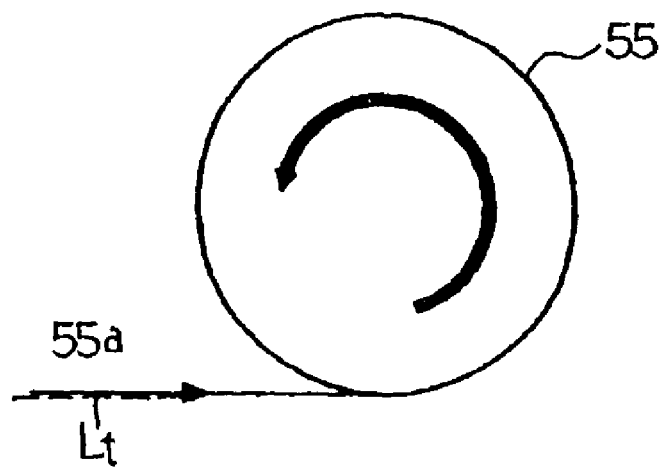
FIG. 18a is an explanatory view showing a preferable position of the pulsating vibration gas supply port for the dispersion chamber and FIG. 18b is an explanatory view showing an actual attachable position of the pulsating vibration gas supply port for the dispersion chamber.
Figure 18B:
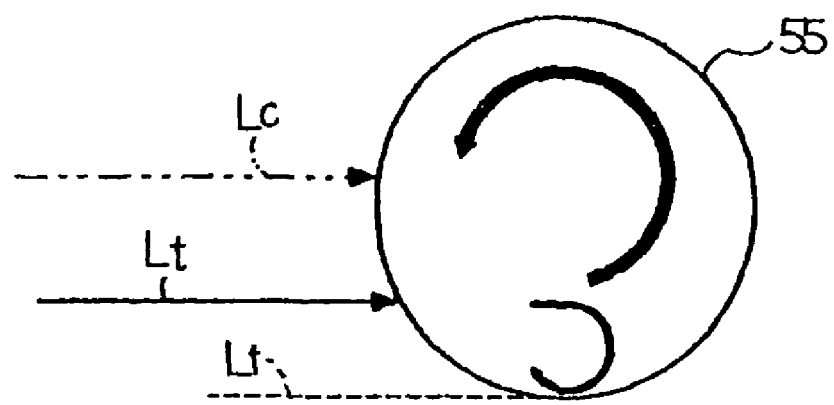

FIG. 18 is a plane view diagrammatically showing the position of the pulsating vibration gas supply port 55a provided for the dispersion chamber 55 when the chamber 55 is seen from top, FIG. 18a is an explanatory view showing a preferable position for providing the pulsating vibration gas supply port 55a against the dispersion chamber 55 and FIG. 18b is an explanatory view showing an actual attachable position for providing the pulsating vibration gas supply port 55*a* against the dispersion chamber 55.

The curved arrows in FIG. 18*a* and FIG. 18*b* diagrammatically show the directions of the swirling positive pulsating vibration gas generated in the dispersion chamber 55.

The pulsating vibration gas supply port 55*a* is preferably provided in a substantially tangential direction (a direction shown with a dashed line Lt in FIG. 18*a*) against the inside perimeter of the dispersion chamber 55 in order to generate a swirling positive pulsating vibration gas in the dispersion chamber 55.

However, the supply port 55*a* isn't always provided in a tangential direction against the inside perimeter of the dispersion chamber 55 as shown in FIG. 18*a*. It may be provided in an equivalent direction (namely, in a direction parallel to the tangential direction (for example a dashed line Lt in FIG. 18*b*) against the inner circumference of the dispersion chamber 55) to the tangential direction (a direction shown with a dashed line Lt in FIG. 18*b*) as far as one dominant swirling flow is generated in the dispersion chamber 55.

If the pulsating vibration gas supply port 55*a* is provided in a direction into a center line of the dispersion chamber 55 as shown with an imaginary line Lc in FIG. 18*b*, two swirls, both of which don't seem a dominant flow, are generated when the inner shape of the dispersion chamber 55 is approximately cylindrical. Therefore, it isn't preferable to provide the supply port 55*a* in such a position considering generation of the swirling positive pulsating vibration gas in the dispersion chamber 55.

Next, the positional relation of the pulsating vibration gas supply port 55*a* and the discharge port 55*b* in the dispersion chamber 55 is detailed referring to FIG. 19.

Figure 19A:
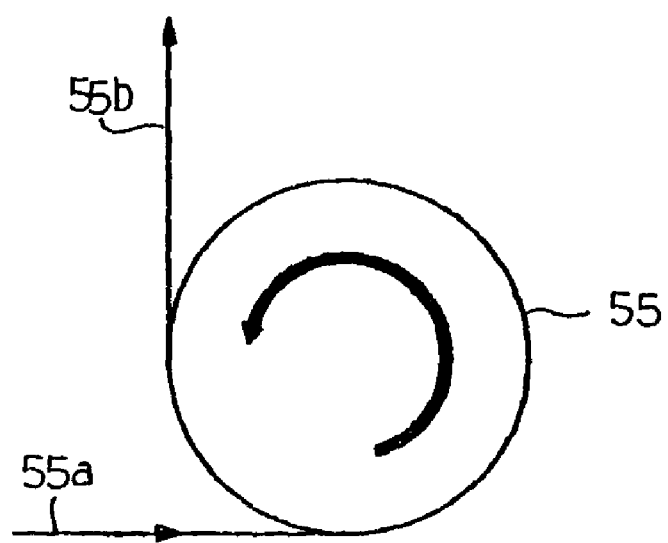
FIG. 19a is an explanatory view showing a preferable position of the pulsating vibration gas supply port and its discharge port for the dispersion chamber and FIG. 19b is an explanatory view showing an actual attachable position of the pulsating vibration gas supply port and its discharge port for the dispersion chamber.
Figure 19B:
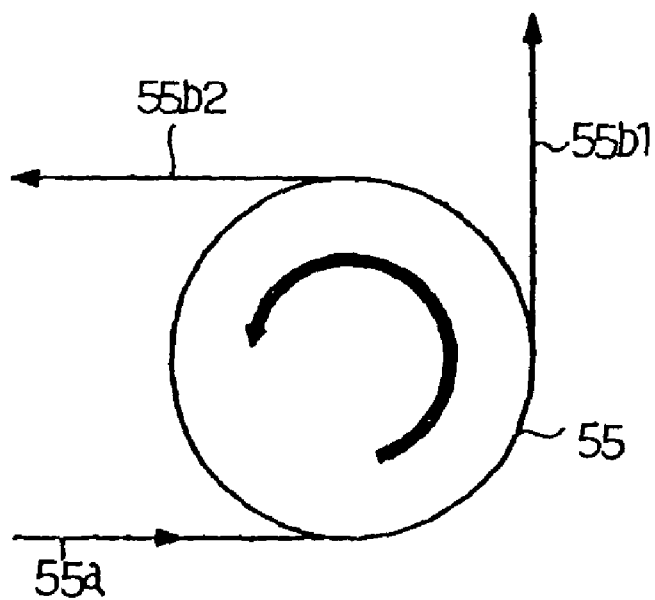

FIG. 19 is a plane view diagrammatically showing the position of the pulsating vibration gas supply port 55*a* and its discharge port 55*b* provided for the dispersion chamber 55 when the chamber 55 is seen from top, FIG. 19*a* is an explanatory view showing a preferable position for providing the pulsating vibration gas supply port 55*a* and its discharge port 55*b* against the dispersion chamber 55 and FIG. 19*b* is an explanatory view showing an actual attachable position for providing the pulsating vibration gas supply port 55*a* and its discharge port 55*b* against the dispersion chamber 55.

The curved arrows in FIG. 19*a* and FIG. 19*b* diagrammatically show directions of the swirling positive pulsating vibration gas generated in the dispersion chamber 55.

When the discharge port 55*b* is provided for the dispersion chamber 55 as shown in FIG. 19*a*, the position of the port 55*b* becomes opposite to the direction of the swirling pulsating vibration gas (movement of the air flow) generated in the chamber 55. In such a case, the discharge efficiency of the lubricant powder fluidized by being dispersed in air from the discharge port 55*b* can be set low.

Contrary, if the discharge efficiency of the fluidized lubricant powder from the discharge port 55*b* is to be heightened, the port 55*b* is preferably provided in a forward direction of the swirling positive pulsating vibration gas generated in the dispersion chamber 55 like the discharge port 55*b*1 or 55*b*2 illustrated in FIG. 19*b*.

The inner shape of the dispersion chamber 55 is designed to be approximately tubular so as to make a positive pulsating vibration gas swirl therein. In this embodiment, such a dispersion chamber 55 of which inner shape is tubular is used, however, its shape isn't limited as long as a positive pulsating vibration gas easily swirls therein. Therefore, the inner shape isn't limited to be approximately tubular.

The member shown with the reference numeral 72 in FIG. 12 is a pressure sensor for measuring the pressure in the lubricant storage hopper 52 and the reference numeral 73 shows a pressure sensor for measuring the pressure in the cylindrical body 53.

In the externally lubricating type tabletting machine S as shown in FIG. 10, the controller 121 and the member, v1, v2, v3, v5, v6, v7, vp1, vp2, vp3, 41, 71, 72, 73, 102, 111 are connected with signal lines respectively so as to drive, stop, or control each of them.

Next, the operation of the lubricant powder discharge means 51 is explained.

FIG. 20 diagrammatically explains the operation of the gas injection means 56, 56 and the material feed valve 54 provided for the lubricant storage hopper 52 of the lubricant powder discharge means 51. FIG. 21 is a flow chart diagrammatically showing an operation program of the gas injection means 56, 56 and the material feed valve 54 which are stored in a memory of the controller 121 in advance.

Open and close operations of the material feed valve 54 are executed as follows in the lubricant powder discharge means 51.

At first, the discharge port 52*a* of the lubricant storage hopper 52 is closed by the material feed valve 54 of the lubricant powder discharge means 51.

Figure 20A:
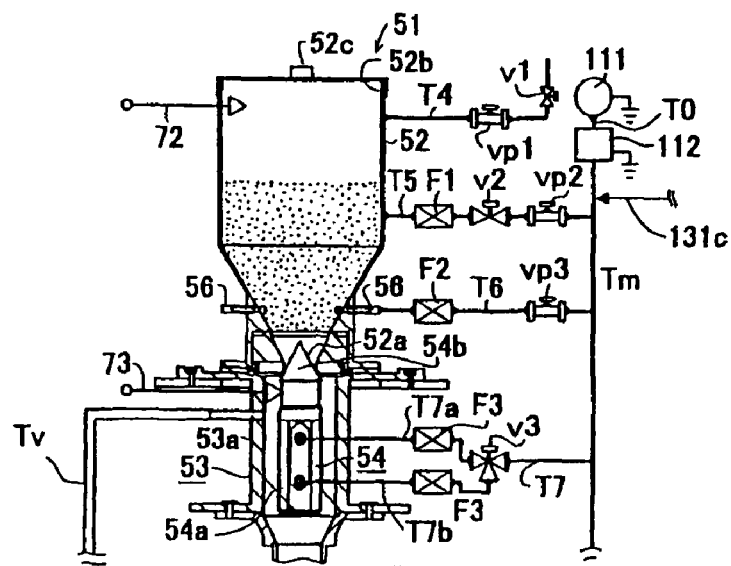
FIG. 20 an explanatory view showing the operation of a gas injection means and a material feed valve provided for a lubricant storage hopper of a lubricant powder discharge means.
Figure 20B:
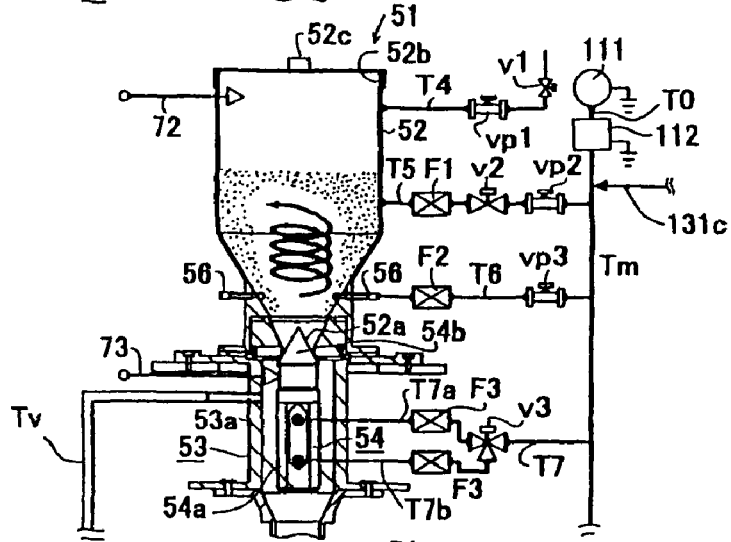
Figure 21:
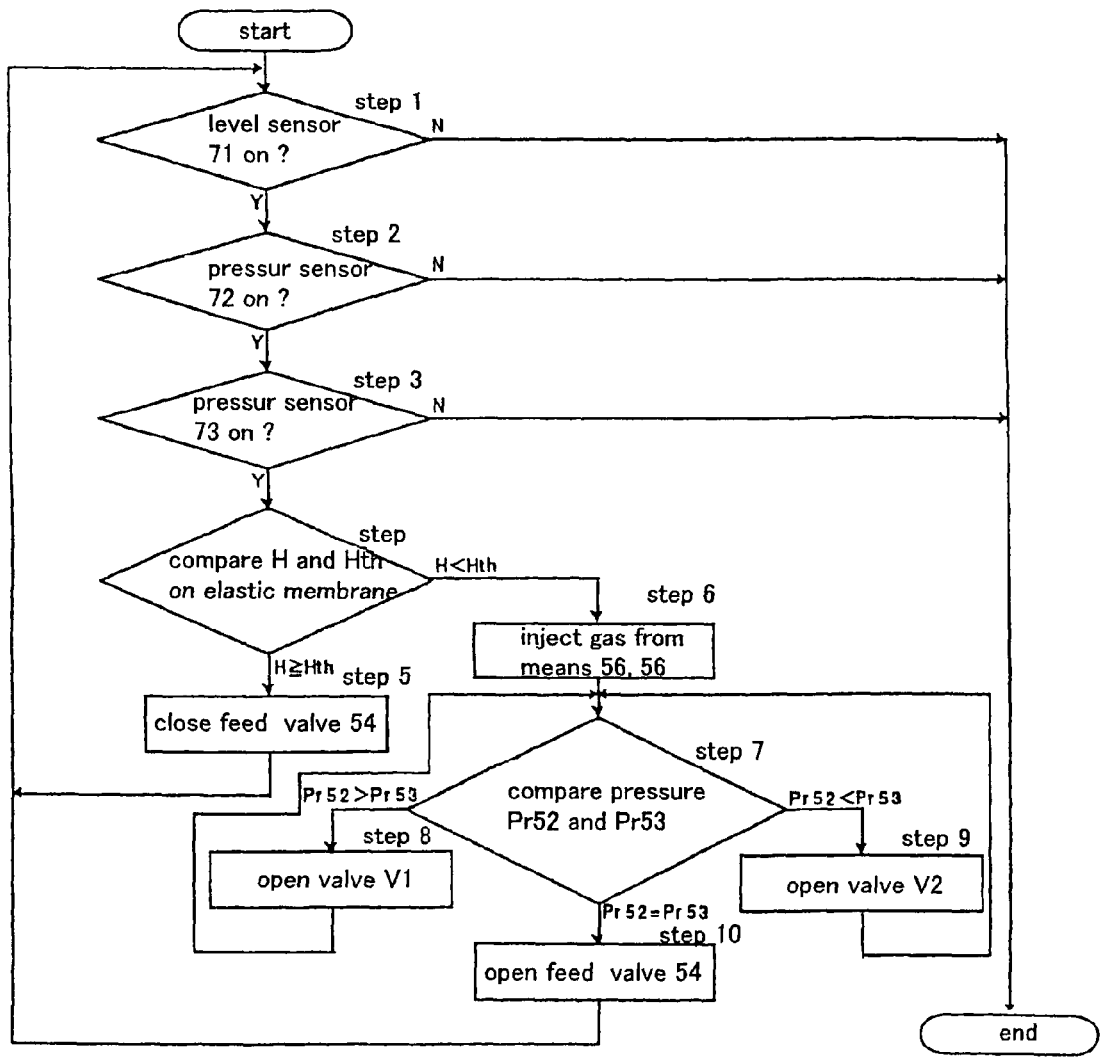
FIG. 21 is a flow chart diagrammatically showing an operation program of a gas injection means and a material feed valve which is stored in a memory of a controller in advance.

Operator feeds a lubricant powder in the lubricant storage hopper 52 and attaches a cover 52*c* on the material feed port 52*b* (see FIG. 20*a*).

Then the blower 111 is driven and a rotary cam 45 of the pulsating vibration gas generator 41 is rotated at a predetermined rotary speed so that a positive pulsating vibration gas with a fixed flow amount, pressure and frequency and a desirable wave shape is generated in the conduit T1.

Each one of the pressure control valves vp1, vp2, vp3, vp4 is controlled. The switching valve v1, v2, v3 are closed at a first stage.

Level sensor 71 is actuated (see step 1) and pressure sensors 72, 73 are turned on respectively (see steps 2 and 3).

Light emitted from an emitting element 71*a* of the level sensor 71 is received in a light receiving element 71*b* as mentioned above. The signal that the light receiving element 71 has received the light emitted from the light emitting element 71*a* is sent to the controller 121.

When the controller 121 receives the signal showing the light emitted from the light emitting element 71*a* of the level sensor 71 has been received in the light receiving element 71*b*, the controller 121 decides that the height H of the lubricant powder on the elastic membrane Et is under a threshold Hth (see step 4).

In this case the controller 121 opens the switching valve v1 to keep the pressure control valve vp3 opened for a predetermined time at step 6. Then gas is injected from the gas injection means 56, 56 for a fixed time to break a caked portion of the lubricant powder stored in the lubricant storage hopper 52 even if caking is caused therein (see FIG. 20*b*)

Pressure (Pr52) in the lubricant storage hopper 52 measured by the pressure sensor 72 and the pressure (Pr53) in the cylindrical body 53 measured by the pressure sensor 73 are sent to the controller 121.

When the controller 121 receives a signal showing gas injection from the gas injection means 56, 56 for a fixed time (signal showing the pressure control valve vp3 is opened for a fixed time and then is closed again), the pressure (Pr52) in the lubricant storage hopper 52 and the pressure (Pr53) in the cylindrical body 53 after the gas injection from the gas injection means 56, 56 for a while are compared (see step 7).

The controller 121 detects that the pressure (Pr52) in the lubricant storage hopper 52 is the same as the pressure (Pr53) in the cylindrical body 53 (Pr52=Pr53) in the step 7, the material feed valve 54 is opened. Namely in this embodiment, the branch pipe T7a side of the switch valve v3 is opened and the branch pipe T7b side is closed.

Figure 20C:
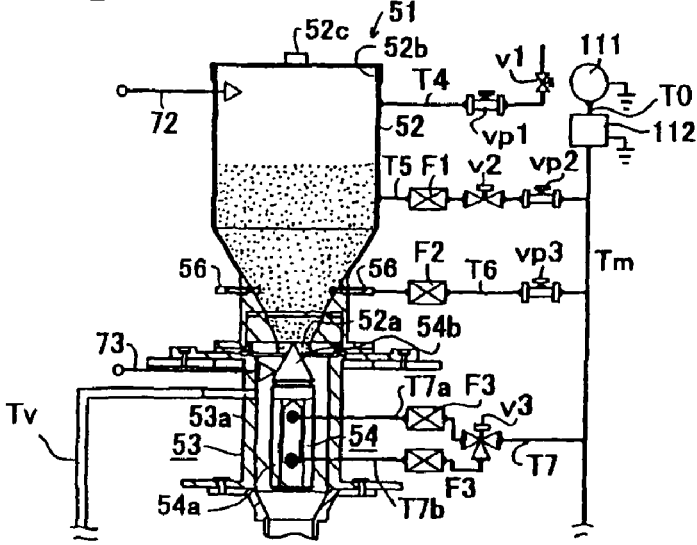

Thus the material feed valve 54 is opened and the lubricant powder stored in the lubricant storage hopper 52 is discharged to the cylindrical body 53 (see FIG. 20c).

Thereafter, when the controller 121 receives the signal showing the light emitted from the emitting element 71a of the level sensor 71 hasn't been received in the light receiving element 71b, the material feed valve 54 is closed. Namely in this embodiment, the controller 121 closes the branch pipe T7a side of the switch valve v3 and opens the branch pipe T7b side (see step 10).

Thus the material feed valve 54 is kept closed (see FIG. 20a).

When the controller 121 detects the pressure (Pr52) in the lubricant storage hopper 52 is higher than the pressure (Pr53) in the cylindrical body 53 (Pr52>Pr53), the controller 121 opens the switching valve v1 until the pressure (Pr52) becomes equal to the pressure (Pr53). When the pressure (Pr52) in the lubricant storage hopper 52 is substantially same as the pressure (Pr53) in the cylindrical body 53, the controller 121 closes the switching valve v1 again (see step 7 and step 8). Then the controller 121 detects that the pressure (Pr52) in the lubricant storage hopper 52 is the same as the pressure (Pr53) in the cylindrical body 53 (Pr52=Pr53) in the step 7, the material feed valve 54 is opened. Namely in this embodiment, the branch pipe T7a side of the switch valve v3 is opened and the branch pipe T7b side is closed (see step 10).

Thereafter, when the controller 121 receives the signal showing the light emitted from the emitting element 71a of the level sensor 71 hasn't been received in the light receiving element 71b, the controller 121 closes the material feed valve 54. Namely in this embodiment the controller 121 closes the branch pipe T7a side of the switch valve v3 and opens the branch pipe T7b side (see step 5).

When the controller 121 detects the pressure (Pr52) in the lubricant storage hopper 52 is lower than the pressure (Pr53) in the cylindrical body 53 (Pr52<Pr53), the controller 121 opens the switching valve v2 until the pressure (Pr52) becomes equal to the pressure (Pr53). When the pressure (Pr52) in the lubricant storage hopper 52 becomes the same as the pressure (Pr53) in the cylindrical body 53 (Pr52=Pr53), the controller 121 closes the switching valve v2 again (see step 7 and step 8). Then the controller 121 detects that the pressure (Pr52) in the lubricant storage hopper 52 is the same as the pressure (Pr53) in the cylindrical body 53 (Pr52=Pr53) in the step 7, the material feed valve 54 is opened. Namely in this embodiment, the branch pipe T7a side of the switch valve v3 is opened and the branch pipe T7b side is closed.

Thereafter, when the controller 121 receives the signal showing the light emitted from the light emitting element 71a of the level sensor 71 hasn't been received in the light receiving element 71b, the controller 121 closes the material feed valve 54. Namely in this embodiment the controller 121 closes the branch pipe T7a side of the switch valve v3 and opens the branch pipe T7b side (see step 5).

FIG. 22 is a diagrammatic explanatory view showing the operation of the elastic membrane Et and the bypass pipe Tv when the positive pulsating vibration gas is supplied in the dispersion chamber 55.

When the pulsating vibration gas generator 41 is driven, a positive pulsating vibration gas with a desirable flow amount, pressure, wave length and wave shape is supplied to the conduit T1.

The positive pulsating vibration gas supplied in the conduit T1 is further supplied in the dispersion chamber 55 from the pulsating vibration gas supply port 55a.

The positive pulsating vibration gas supplied to the dispersion chamber 55 becomes a positive pulsating vibration gas swirling upwardly like a convolution such as a tornado therein, then is discharged from the discharge port 55b.

The swirling positive pulsating vibration gas generated in the dispersion chamber 55 doesn't lose its nature as a pulsating vibration gas so that the elastic membrane Et vibrates according to the frequency, amplitude, and wave shape of the positive pulsating vibration gas.

Figure 22A:
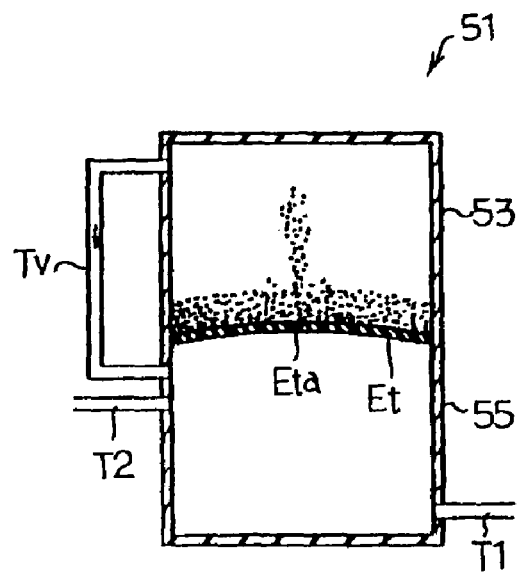
FIG. 22 is a diagrammatic explanatory view showing the operation of an elastic membrane and a bypass pipe when a positive pulsating vibration gas is supplied in a dispersion chamber.

At a peak of the positive pulsating vibration gas supplied to the dispersion chamber 55, when the pressure Pr55 in the dispersion chamber 55 becomes higher than the pressure Pr53 in the cylindrical body 53 (pressure Pr55>pressure Pr53), the elastic membrane Et is elastically deformed so as to be curved upwardly as shown in FIG. 22a.

A penetrating aperture Eta becomes V-shaped with its upper end opened in the sectional view and a part of the lubricant powder stored on the elastic membrane Et in the cylindrical body 53 falls in the V-shaped aperture Eta.

Further, in this lubricant powder discharge means 51, an air communication passage between the cylindrical body 53 and the dispersion chamber 55 is formed with two systems in this lubricant discharge means 51: the penetrating aperture Eta of the elastic membrane Et and the bypass pipe Tv. Therefore, the air can pass between the cylindrical body 53 and the dispersion chamber 55 via an available system.

When the air flows from the dispersion chamber 55 to the cylindrical body 53 via the penetrating aperture Eta of the elastic membrane Et as shown in FIG. 22a, the air flow from the cylindrical body 53 to the dispersion chamber 55 is generated in the bypass pipe Tv. Accordingly the air can flow therebetween via the aperture Eta.

Then when the positive pulsating vibration gas supplied to the dispersion chamber 55 gradually comes to its valley of the amplitude, the elastic membrane Et returns to its original position from an upwardly curved position by its resilience. At the same time the penetrating aperture Eta returns to its original position from the V-shape with it upper part opened and the lubricant powder dropped in the opened aperture Eta is kept therein (see FIG. 22b).

As the air communication passage between the cylindrical body 53 and the dispersion chamber 55 is comprised of two lines: the penetrating aperture Eta of the elastic membrane Et and the bypass pipe Tv, the air can flow therebetween via an available one.

Figure 22B:
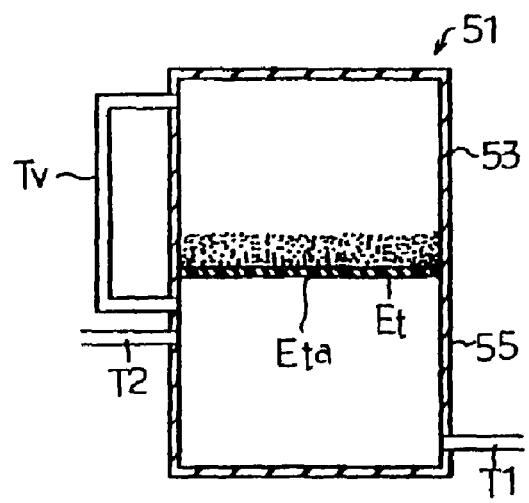
Figure 22C:
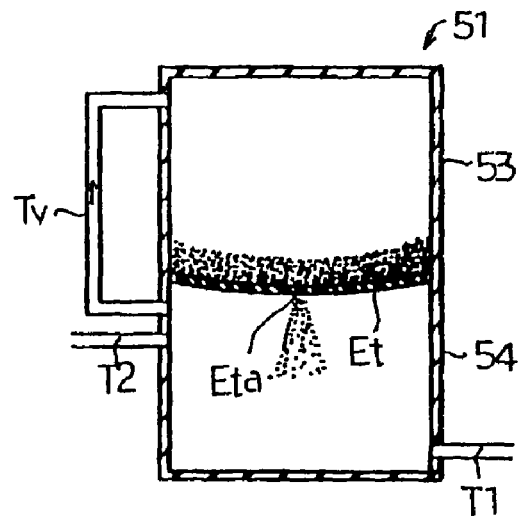

Namely even when the penetrating aperture Eta is closed as shown in FIG. 22b, air flows through the bypass pipe Tv from the cylindrical body 53 to the dispersion chamber 55 so that the pressure in the dispersion chamber 55 and the pressure in the cylindrical body 53 are rapidly balanced.

Then the pressure in the dispersion chamber 55 is reduced at the amplitude valley of the positive pulsating vibration gas supplied in the dispersion chamber 55, the elastic membrane Et is elastically deformed with its center curved downwardly. The penetrating aperture Eta becomes reverse V-shaped with its lower end opened in its section. Then the powder material kept in the aperture Eta falls in the dispersion chamber 55 (see FIG. 22c).

The air flows between the cylindrical body 53 and the dispersion chamber 55 through an available one because there are two air communication passages therebetween: the penetrating aperture Eta and the bypass pipe Tv.

In other words, when the elastic membrane Et is curved downwardly with its center deformed downwardly and the volume of the cylindrical body 53 becomes larger, the air flows from the dispersion chamber 55 to the cylindrical body 53 via the bypass pipe Tv. Therefore, the air flow from the dispersion chamber 55 to the cylindrical body 53 via the penetrating aperture Eta isn't caused. Accordingly, the lubricant powder can be safely and quantitatively discharged through the aperture Eta.

Thus the lubricant powder discharge means 51 is constructed such that the bypass pipe Tv is provided between the dispersion chamber 55 and the cylindrical body 53. Therefore, the time required for balancing the pressure in the cylindrical body 53 and the pressure in the dispersion chamber 55 when the positive pulsating vibration gas is supplied to the dispersion chamber 55 is reduced so that the responsibility of the vertical vibration of the elastic membrane Et to the vibration of the positive pulsating vibration gas becomes superior. As a result, the powder material can be smoothly discharged via the penetrating aperture Eta.

Further in the lubricant powder discharge means 51, the up and down vibration of the elastic membrane Et with its center being antinode and its periphery being node depends on the frequency, amplitude and wave shape of the positive pulsating vibration air supplied in the dispersion chamber 55.

Therefore, as far as the positive pulsating vibration gas supplied to the dispersion chamber 55 is constant, a fixed amount of lubricant powder is always accurately discharged to the dispersion chamber 55 via the penetrating aperture Eta of the elastic membrane Et. Accordingly such a lubricant powder discharge means 51 can stably supply the lubricant powder at a constant concentration to the lubricant application means 91.

The lubricant powder discharge means 51 also has an advantage that if the frequency, amplitude and wave shape of the positive pulsating vibration gas supplied to the dispersion chamber 55 are controlled, the amount of powder supplied to a desired place (instruments and so on) can be easily changed.

Furthermore according to the lubricant powder discharge means 51, the positive pulsating vibration gas becomes a swirl directing upward in the dispersion chamber 55. Even if the aggregated particles with a large diameter are contained in the lubricant powder discharged to the dispersion chamber 55, most of all can be broken and dispersed to be small particles by being caught in the positive pulsating vibration gas swirling in the dispersion chamber 55.

In addition, according to the lubricant powder discharge means 51, the positive pulsating vibration gas in the dispersion chamber 55 becomes an upward swirling flow so that the dispersion chamber 55 has a size classification function like a cyclone.

Therefore, the lubricant powder with a predetermined particle size can be discharged to the conduit T2 from the discharge port 55b.

Namely, the aggregated particles with a large diameter keep swirling in the lower part of the dispersion chamber 55 and are pulverized into a predetermined particle size by being caught in the positive pulsating vibration gas swirling in the chamber 55, and they are discharged to the conduit T2 from the discharge port 55, thereby preventing a large lubricant powder from being sprayed in the lubricant application means 91.

The lubricant powder supplied to the conduit T2 connected to the discharge port 55b is pneumatically transported to the other end e2 of the conduit T2 by means of the positive pulsating vibration gas.

Thereby, according to the lubricant powder discharge means 51, a deposit phenomenon and a pinhole phenomenon aren't caused in the conduit, which have been seen in a transportation means wherein the powdered material in the conduit is pneumatically transported by a steady pressure air with a constant flow amount.

Therefore, according to the lubricant discharge means 51, the lubricant powder can be discharged from the other end e2 of the conduit T2 while keeping the original concentration of the lubricant powder discharged in the conduit T2 from the discharge port 55b of the dispersion chamber 55, thereby enabling an accurate control of the quantitativeness of the lubricant powder sprayed from the other end e2 of the conduit T2.

Furthermore, according to the lubricant powder discharge means 51, almost the same amount of lubricant powders is always placed on the elastic membrane Et (where the level sensor 71 is provided (height Hth where the level sensor 62 is provided above the membrane Et)) while operating the lubricant powder discharge means 51. The amount of lubricant powder discharged from the penetrating aperture Eta of the elastic membrane Et doesn't vary depending on the change in the amount of lubricant powder placed on the elastic membrane Et. Accordingly, the lubricant powder discharge means 51 can supply a fixed amount of lubricant powders to the lubricant application means 91.

Still further according to the lubricant powder discharge means 51, even if the large size powder is discharged to the dispersion chamber 55, almost all of the large powder is pulverized into a predetermined particle size by being caught in the positive pulsating vibration gas swirling in the chamber 55 to be discharged to the conduit T2 from the discharge port 55b, so that the large size powder isn't deposited in the dispersion chamber 55.

Therefore, even if the lubricant powder discharge means 51 is operated for a long time, the lubricant powder doesn't deposit in the dispersion chamber 55 so that the number of cleaning in the dispersion chamber 55 can be reduced.

When the externally lubricating type tabletting machine S provided with such a lubricant powder discharge means 51 continuously produces tablets, the cleaning in the dispersion chamber 55 isn't almost required. Therefore, an externally lubricated tablet (tablet without including lubricant therein) can be effectively produced using such a tabletting machine S.

In addition, according to this lubricant powder discharge means 51, the elastic membrane Et is stretched by means of the elastic membrane installation means 61 as shown in FIG. 15, FIG. 16 and FIG. 17. The quantitativenes of this lubricant powder discharge means 51 isn't damaged because of a loosed elastic membrane Et.

The discharge of the lubricant powder to the dispersion chamber 55 via the penetrating aperture Eta of the elastic membrane Et is repeated while the positive pulsating vibration gas is supplied in the dispersion chamber 55 of the lubricant powder discharge means 51.

Next the construction of the rotary type tabletting machine 81 is explained.

FIG. 23 is a plane view diagrammatically showing the rotary type tabletting machine 81.

Normal one is used for the rotary type tabletting machine 81. The tabletting machine 81 has a turntable 34 rotatable around a rotary axis, plural upper dies (upper punches 31 . . . in FIG. 10), and plural lower dies (lower punches 33 . . . in FIG. 10).

On the turntable 34, plural dies 32 . . . are provided and a pair of the upper punch 31 . . . and the lower punch 33 . . . are provided for each one of the plural dies 32 . . . in such a manner that they rotate synchronously.

Further, plural upper punches 31 . . . are constructed so as to move up and down in a rotary axis direction at a predetermined position by a cam mechanism (not shown) and the lower punches 33 . . . are also constructed so as to move up and down in a rotary axis direction at a predetermined position by means of a cam mechanism (see cam mechanism in FIG. 10).

The member shown as a reference numeral 36 in FIG. 10 and FIG. 23 indicates a feed shoe for charging a molding material in each die 32 . . . , 37 shows a scraper for making the molding material charged in each die 32 . . . at a fixed quantity, and 38 is a tablet discharge scraper provided for discharging the produced tablet t into a discharge sheet 39.

The reference numeral R1 in FIG. 23 is a lubricant powder spray point. The lubricant application means 91 is provided at the lubricant powder spray point R1 in the externally lubricating type tabletting machine S. More specifically, the lubricant application means 91 is fixedly provided on the turntable 34 in such a manner that a lubricant powder is applied on each surface of the dies 32 . . . , the upper punches 31 . . . , the lower punches 33 . . . which are sequentially accommodated in the lubricant application means 91 according to the rotation of the turntable 34, the upper punches 31 . . . , and the lower punches 33 . . . . Application method on each surfaces thereof are detailed later.

The position shown as R2 in FIG. 23 is a molding material charge point where the molding material m is charged by the feed shoe 36 in the space formed by the die 32 and the lower punch 33 inserted in a fixed position in the die 32.

The position R3 in FIG. 23 is a pre-tabletting point where a fixed amount of molding material charged in the space formed with the die 32 and the lower punch 33 and scraped by the scraper 37 is preliminary tableted by means of a pair of the upper punch 31 and the lower punch 33.

Further the position R4 in FIG. 23 is a main tabletting point where the pre-tableted molding material is fully compressed to be a tablet t by means of the pair of the upper punch 31 and the lower punch 33.

The position R5 in FIG. 23 is a tablet discharge point where the tablet t discharged out of the die 32 by inserting the upper face of the lower punch 33 into the upper face of the die 32 is fed to a discharge chute 39 by a scraper 38 for discharging a tablet.

Next, the construction of the lubricant application means 91 is explained in detail.

Figure 24:
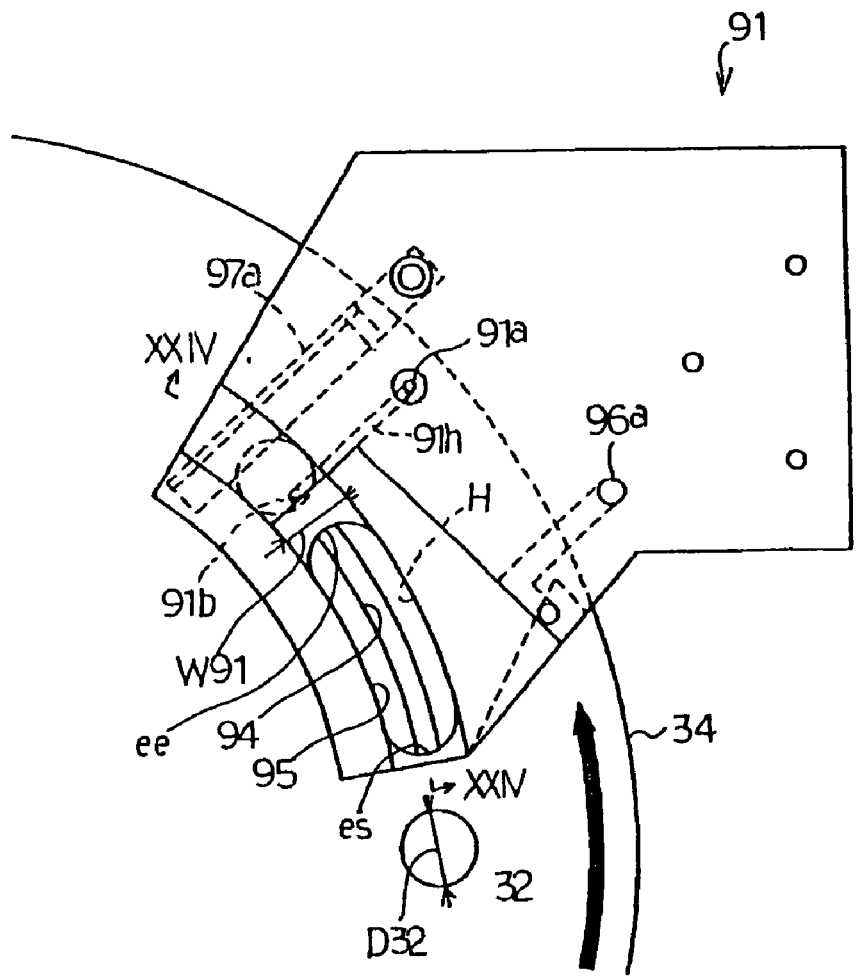
FIG. 24 is a plane view diagrammatically showing enlarged lubricant application means shown in FIG. 24.
Figure 25:
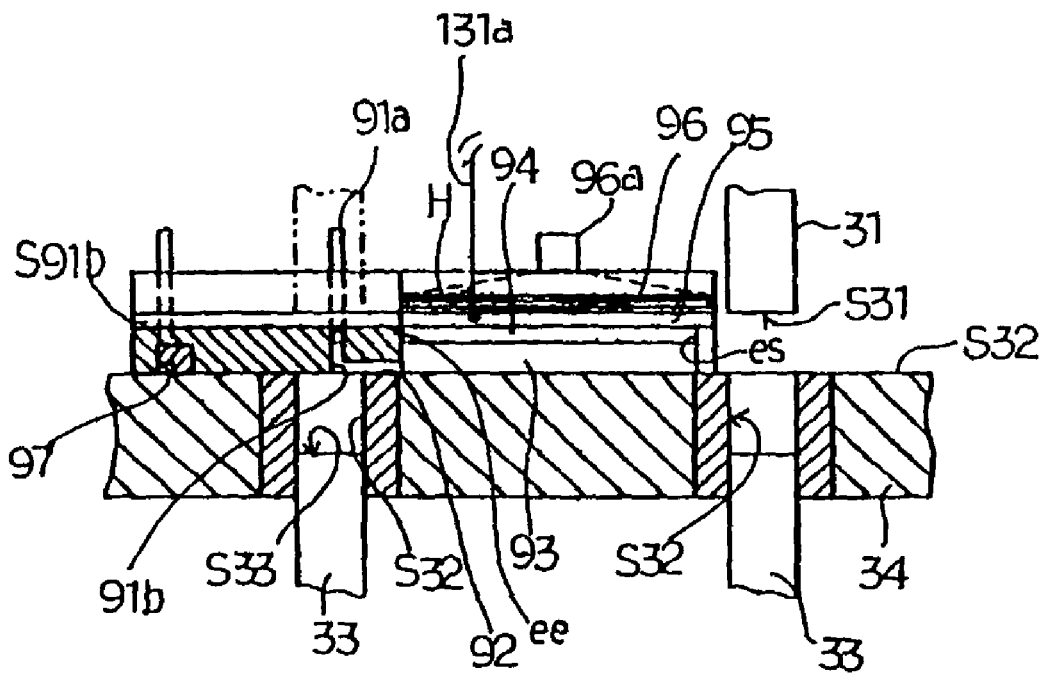
FIG. 25 is a sectional view diagrammatically showing the construction of the lubricant application means along the line XXIV-XXIV in FIG. 24.

FIG. 24 is a plane view diagrammatically showing enlarged lubricant application means 91 shown in FIG. 23. FIG. 25 is a sectional view diagrammatically showing the construction of the lubricant application means 91 along the line XXIV-XXIV in FIG. 24.

The lubricant application means 91 is fixedly provided for a predetermined position above the turntable 34 of the rotary type tabletting machine 81.

The face S91a (bottom) which is an opposing side against the turntable 34 of the lubricant application means 91 is arranged to be in contact with the face S34 of the turntable 34 or to have a minute gap with the face S34. Therefore, the turntable 34 is rotated in such a manner that it rubs on the bottom S91a or without having any gap therebetween.

The lubricant application means 91 has a lubricant introduction port 91a for connecting the conduit T2 on an outer face S91b.

The lubricant powder dispersed with the positive pulsating vibration air and supplied from the lubricant introduction port 91a is sent to the face (bottom), opposing the turntable 34, of the lubricant application means 91 via an aperture 91h penetrating through the lubricant application means 91 to be sprayed on the surface (upper face) S33 of the lower punch 33 inserted in the predetermined position in the die 34 of the turntable 34 from a discharge port 91b of the penetrating aperture 91h.

In this embodiment the lubricant powder dispersed with air is sprayed on the surface (upper face) S33 of the lower punch 33 in substantially vertical from the discharge port 91b of the penetrating aperture 91h.

A groove 92 is provided for the surface (bottom) S91a of the lubricant spray chamber 91 facing the turntable 34 in the reverse direction of the rotation of the turntable 34 from the discharge port 91b of the penetrating hole 91h.

The extra lubricant powders accumulated on the surface (upper face) S33 of the lower punch 33 are blown off by the air supplied together with the lubricant powders. A part of blown-out powders is designed to be applied on the surface S32 (inner circumference) of the die 32.

Further, the lubricant powder passes through a tubular portion formed by the groove 92 provided on the surface (bottom) of the lubricant application means 91 facing the turntable 34 and by the surface of the turntable 34 to be fed in reverse direction of the rotation of the turntable 34.

The end of the groove 92 provided on the surface (bottom) of the lubricant spray chamber 91 facing the turntable 34 is communicated with a hollow chamber 93 provided at the surface (bottom) side of the lubricant application means 91 facing the turntable 34.

A slit 94 is formed at the upper part of the hollow chamber 93 so as to penetrate the lubricant application means 91.

At the outer surface of the lubricant application means 91, an upper punch accommodation part 95 for sequentially accommodating the upper punches 31 . . . which rotate in synchronism with the turntable 34 along the slit 94 is formed along the rotary orbit of the upper punches 31 . . . .

The width W95 of the upper punch accommodation part 95 is equal to or a little larger than the diameter of the upper punch 31.

A suction head 96 is provided above the slit 94.

The numeral 91a in FIG. 25 is a connection port to be connected with the conduit T2.

The size of a suction port H of the suction head 96 is designed so as to cover the entire slit 94 and so as to be a similar shape to the slit 94.

As a result, when a suction means (the dust collector 102 in FIG. 10) is driven, an upward air flow is uniformly and evenly generated from one end es to the other end ee of the slit 94.

Therefore, a lubricant powder can be applied taking enough time on the surface (lower face) S31 of the upper punch 31 on which a lubricant powder has difficulty to be applied while the upper punch 31 moves from the end es to the other end ee of the slit 94 in the upper punch accommodation part 95.

Further in this embodiment, at the downstream of the lubricant spray point of the lubricant application means 91 (at the upstream of the material charge point), a lubricant suction part 97 is provided for removing the lubricant powder L flown out on the turntable 34 or the lubricant powder exceedingly attached on the surface (upper face) S33 of the lower punch 33 and on the circumferential wall (inner circumference) S43 of the die 32.

A suction means such as a blower (not shown) is connected to the lubricant suction part 97. When the suction means (not shown) is driven, the lubricant powder exceedingly attached on the turntable 34 around the die 32, on the surface (inner circumference) S32 of the die 32, and on the surface (upper face) S33 of the lower punch 33 can be sucked and removed from the suction port 97a.

The suction port 97a is formed like a slit (long shape) on the surface (bottom) facing the turntable 34 in such a manner that the longitudinal direction substantially directs into the center from the periphery of the turntable 34 and the suction port 97a bridges the die 32.

The distance between the suction port 97a and the discharge port 91b is set to be a little larger than the diameter D32 of the die 32.

Therefore, when the suction means such as a blower (not shown) connected to the lubricant suction part 97 is driven, the turntable 34 around the dies 32 can be always kept clean. As a result, the lubricant powder attached around the die 32 on the turntable 34 doesn't fall in the die 32 so that externally lubricated tablet which doesn't include any lubricant can be continuously tableted.

Next, the construction of the suction means (lubricant suction means) 101 will be detailed.

FIG. 26 is a constructional view diagrammatically enlarging around the suction means (lubricant suction means) 101 shown in FIG. 10.

The lubricant suction means 101 has a dust collector 102 and a conduit T3 connected to the dust collector 102.

One end of the conduit T3 is connected to the lubricant head 96 of the lubricant application means 91.

The conduit T3 is connected to the lubricant head 96 of the lubricant application means 91. The conduit T3 is branched into two branch pipes T3a and T3b, integrated into one pipe T3c again and connected to the dust collector 102.

A switch valve v5 and a light scattering type powder concentration measuring means 103a are provided from the lubricant application means 91 to the dust collector 102 in order.

Light permeable type powder concentration measuring means 105 may be provided instead of the light scattering type powder concentration measuring means 103a.

Measurement cell 104 is made of quartz and connected in midstream of the branch pipe T7a.

The light scattering type measuring means 105 is provided with a laser beam emitting system 105a for emitting laser beams and a scattering beam receiving system 105b for receiving the light scattered by an object and emitted from the laser beam emitting system 105a and is designed to measure the flow rate, particle diameter, particle size distribution and concentration of the object according to the Mie theory. In this embodiment, the laser beam emitting system 105a and the scattering beam receiving system 105b are opposed so as to interpose the measurement cell 104 in such a manner that the flow rate, particle diameter, particle size distribution and concentration of the powdered material (lubricant powder in this embodiment) running in the branch pipe T3a can be measured in the measurement cell 104.

A switch valve v6 is provided for the branch pipe T3b.

Further, a switch valve v7 is provided for the conduit T7c.

For controlling the concentration of the lubricant powder in the lubricant application means 91 by means of the suction means (lubricant suction means) 102, the switch valves v5 and v7 are opened while the switch valve v6 is closed, and then the dust collector 102 is driven.

Driving the pulsating vibration gas generator 41 and the lubricant powder discharge means 51 respectively, the lubricant powder mixed and dispersed with a positive pulsating vibration gas is supplied in the lubricant application means 91 together with the positive pulsating vibration gas from the end e2 of the conduit T2.

Then a part of the lubricant powder fed in the lubricant application means 91 is used for applying on each surface (lower face) S31 of the upper punches 31 . . . , each surface S33 (upper face) of the lower punches 33 . . . , and each inner circumference S32 of the dies 32 . . . . The extra lubricant powder is sucked to the dust collector 102 from the suction head via the conduit T3, the branch pipe T3a and the conduit T3c.

In this time the light permeable type measuring means 105 consisting the light scattering type powder concentration measuring means 103a is driven to measure the flow rate, particle diameter, particle size distribution, and concentration of the lubricant powder running in the measurement cell 104, namely in the branch pipe T3a.

Under such operations, a problem is caused such that the lubricant powder is adhered in the inner circumference of the measurement cell 104 and the light permeable type measuring means 105 can't accurately measure the flow rate and so on of the lubricant powder running in the branch pipe T3a because of thus adhered lubricant powder in the measurement cell 104. In such a case a compensation is required for removing the affection (noise) caused by the lubricant powder adhered in the measurement cell 104 from the measured value of the light permeable type measuring means 105. However, according to this dust collector 102, the switch valve v5 is closed and the switch valve v6 is opened while keeping the suction means 102 driven for measuring the affection (noise) by the lubricant powder attached in the measurement cell 104. The lubricant powder sucked in the conduit T3 from the suction head H is further sucked to the dust collector 102 through the branch pipe T3b and the conduit T3c so that the lubricant powder doesn't run in the branch pipe T3a.

When the light permeable type measuring means 105 is driven at this time, the affection (noise) by the lubricant powder adhered in the measurement cell 104 can be measured.

The measured value of the affection (noise) by the lubricant powder adhered in the cell 104 is temporarily stored in a memory means of the controller 121.

Thereafter, the switch valve v5 is opened and the switch valve v6 is closed while keeping the dust collector 102 driven so as to run the lubricant powder through the branch pipe T3a. Then the powder concentration measuring means 103a is driven to measure the flow rate and so on of the lubricant powder running in the branch pipe T3a. The compensation value obtained by removing the affection (noise) of the lubricant powder adhered in the cell 104 from the measured value of the light permeable type measurement means 105 based on the compensation program and the measured value of the affection (noise) of the lubricant powder adhered in the cell 104 stored in the memory means of the controller 121 in advance. Then the concentration of the lubricant powder in the lubricant application means 91 is controlled by adjusting the driving amount of dust collector 102 and that of pulsating vibration gas generator 71 based on the obtained compensation value, otherwise the light permeable type measuring means 131 may be used and the driving amount of dust collector 102 and that of pulsating vibration gas generator 71 are appropriately adjusted based on the measured value, thereby controlling the concentration of the lubricant powder in the lubricant application means 91.

Next, a production method of a tablet by means of the externally lubricating type tabletting machine Sb according to the present invention will be diagrammatically explained.

The following explanation is the case when the externally lubricating type tabletting machine is normally operated.

At first, predetermined operation conditions are input in the controller 121.

Lubricant powder is contained in the lubricant storage hopper 52.

A molding material is stored in the feed shoe 36 of the rotary type tabletting machine 81.

Then the rotary type tabletting machine 81 and the dust collector 102 are driven.

Further the suction means (not shown) connected to the lubricant suction part 97 is driven if necessary.

Then the blower 111 is driven under the operational conditions input in the controller 121.

At the same time, a rotary cam 45 of the pulsating vibration gas generator 41 is driven at a fixed rotational speed, thereby supplying a positive pulsating vibration gas with a fixed flow amount, pressure, frequency and wave shape in the conduit T1.

Also the security lamp of the first alarm means (not shown) provided for the controller 121 is confirmed to be turned on.

Further, the level sensor 71 is actuated.

Actuating the level sensor 71, the gas injection means 56 and 56 and the material feed valve 54 are operated as shown in FIG. 22 and FIG. 23, thus a fixed amount of lubricant powder is stored on the elastic membrane Et.

The positive pulsating vibration gas generated from the pulsating vibration gas generator 41 is supplied in the dispersion chamber 55. Therefore, the elastic membrane Et is vibrated up and down to discharge the lubricant powder into the dispersion chamber 55 through the penetrating aperture Eta provided on the elastic membrane Et.

Thus discharged lubricant powder in the dispersion chamber 55 is mixed and dispersed with the positive pulsating vibration gas swirling in the dispersion chamber 55 and is discharged to the conduit T2 from the discharge port 55b.

The lubricant powder mixed and dispersed with the positive pulsating vibration gas which have been discharged in the conduit T2 is pneumatically transported in the conduit T2 into the lubricant application means 91 by means of the positive pulsating vibration gas.

The lubricant powder fed in the lubricant application means 91 passes through the penetrating aperture 91h from the lubricant introduction port 91a together with the positive pulsating vibration gas and sprayed on the surface (upper face) S33 of the lower punch 33 inserted in a predetermined position in the die 32 which has come to the lubricant spray point R1 by the rotation of the turntable 34 from the discharge port 91b.

The extra lubricant powder accumulated on the surface (upper face) S33 of the lower punch 33 is blown off by the air fed together with the lubricant powder L and a part of blown powder is applied on the surface S32 (inner circumference) of the die 32.

Further the lubricant powder is fed through the cylindrical body formed by the groove 92 provided on the surface (bottom), facing the turntable 34, of the lubricant application means 91 and by the surface of the turntable 34 into a reverse direction of rotation of the turntable 34 and is supplied in the hollow chamber 93.

The lubricant powder fed in the hollow chamber 93 rides on an upward flow uniformly generated above the slit 94 and moves in the suction port H of the suction head 96 when the dust collector 102 is driven.

Lubricant powder is applied on the lower face S31 of the upper punch 31 passing in the upper punch accommodation part 95 while the upper punch 31 moves from the one end es to the other end ee of the slit 94.

Extra lubricant powder is removed from the suction head 96.

Next when the die 32 fed in the downstream of the lubricant spray point R1 by the rotation of the turntable 34 and the lower punch 33 fed in the downstream of the lubricant spray point in synchronism with the rotation of the turntable 34 pass under the suction port 97a of the lubricant suction part 97, the extra lubricant powder attached around the die 32 on the turntable 34 and the extra lubricant powder attached on the surface S32 (inner circumference) of the die 32 and the surface S33 (upper face) of the lower punch 33 are removed.

At the molding material charge point R2, a mixture (molding material) is charged in the die 32 in which the lower punch 32 is inserted into a fixed position, the surface S33 of the lower punch 33 and the surface (inner circumference) S32 of the die 32 being applied with a lubricant powder.

After extra mixture is removed by the scraper 37, the mixture (molding material) is preliminary tabletted at the pre-tabletting point R3 by means of the upper punch 31 on which the surface S31 (lower face) lubricant powder is uniformly applied, the lower punch 33 on which the surface S33 (upper face) lubricant powder is uniformly applied, and the die 32 on which surface S32 (inner circumference) lubricant powder is uniformly applied. Then the mixture is compressed at a main tabletting point R4 to be produced as an effervescent tablet t to be sequentially discharged into the discharge chute 39 at the tablet discharge point R5.

Accordingly, an effervescent tablet t of which part or all of the lubricant powder uniformly applied on the surfaces of the punches 31 and 33 and the surface of the die 32 is transferred on the surface of the tablet is produced.

Operators observe the tablets t . . . discharged in the discharge chute 39.

If the tablets t . . . causing tabletting problems such as sticking, capping and laminating are included, the concentration of the lubricant powder in the lubricant application means 91 is increased by appropriately controlling the drive amount of blower 111, dust collector 102, and pulsating vibration gas generator 41 (generally the frequency of the pulsating vibration gas is enlarged by increasing the drive amount) in order to reduce the frequency of the tabletting problems such as sticking, capping and laminating caused on the produced tablets t . . . . Further, the elastic membrane Et may be replaced with the one with a larger penetrating aperture Eta.

Because the externally lubricating type tabletting machine Sb has the above-mentioned superior effects, tablets, more specifically, externally lubricated tablets which have been difficult to produce in a good industrial productivity in prior arts can be stably produced in large scale under a high industrial productivity.

Even if tabletting problems such as sticking, capping and laminating aren't caused, the composition of the tablets t . . . is analyzed. If the amount of lubricant in the tablet composition is increased comparing with a scheduled amount, the driving amounts of blower 111, dust collector 102, and pulsating vibration gas generator 41 (generally the frequency of the pulsating vibration gas is reduced by lowering the drive amount) are appropriately controlled so as to control the concentration of the lubricant powder in the lubricant application means 91 in a steady condition. When the amount of lubricant powder applied on each surface of the upper punches 31 . . . , each surface of the lower punches 33 . . . , each surface of the dies 32 . . . is controlled to be a fixed amount, the amount of lubricant powder transferred to each surface of the tablet t . . . from each surface of the upper punches 31 . . . , each surface of the lower punches 33 . . . , each surface of the dies 32 . . . is reduced. Further, the elastic membrane Et may be replaced with the one having a smaller penetrating aperture Eta.

Next, the construction of the pulsating vibration gas generator 41 will be explained in detail.

Figure 27:
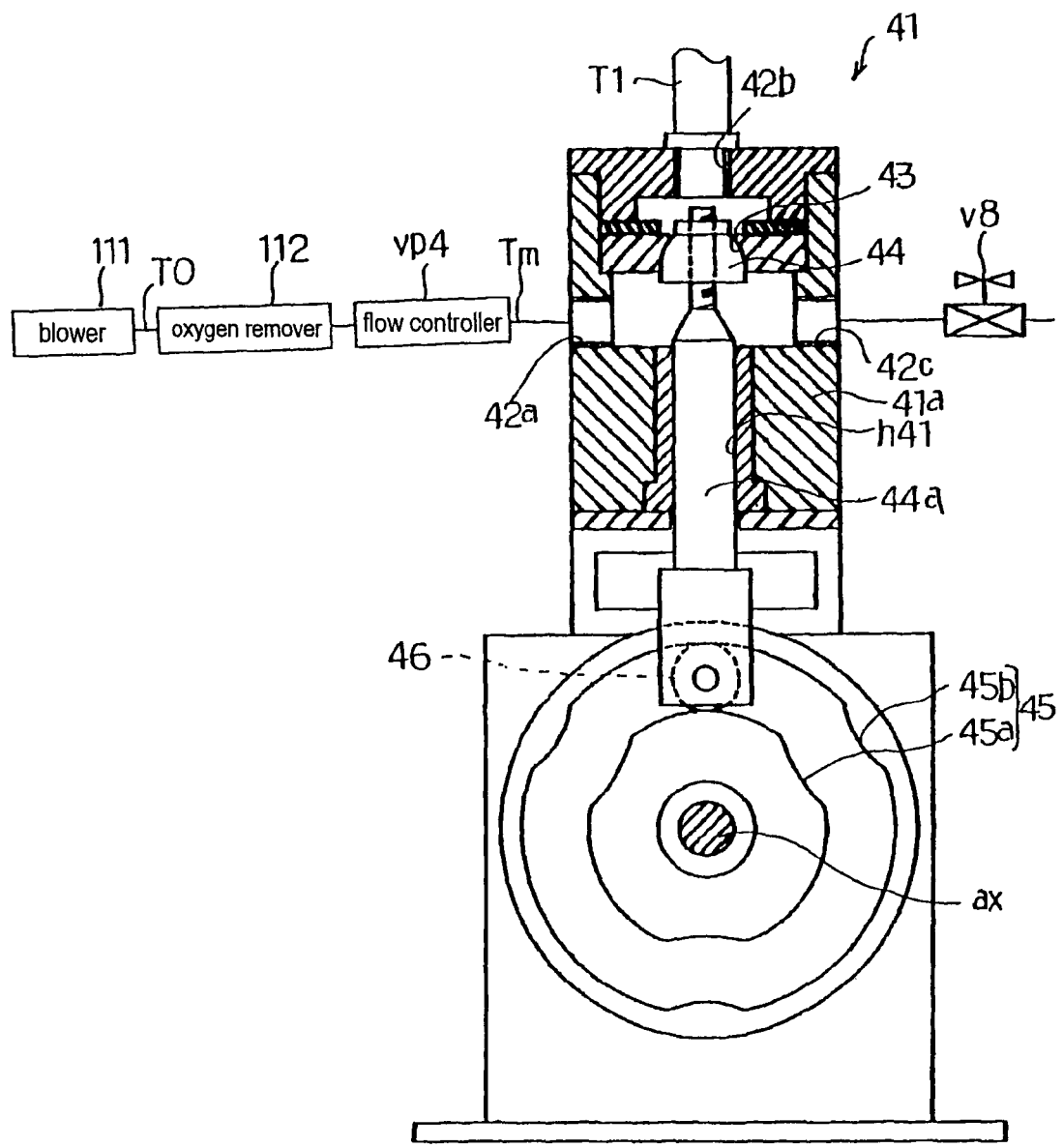
FIG. 27 is a diagrammatic sectional view showing one construction of a pulsating vibration gas generation means.

FIG. 27 is a diagrammatic sectional view showing the construction of the pulsating vibration gas generator 41.

The pulsating vibration gas generator 41 has a hollow chamber 42 with an air supply port 42a and an air discharge port 42b, a valve seat 43 provided in the chamber 42, a valve plug 44 for opening and closing the valve seat 43, and a rotary cam 45 for opening and closing the valve plug 44 for the valve seat 43.

A conduit Tm is connected to the air supply port 42a and a conduit T1 is connected to the air discharge port 42b.

The member 42c in FIG. 27 is a pressure regulating port provided for the hollow chamber 42 if required and a pressure regulating valve v8 is provided for the pressure regulating port 42c so as to communicate with and block off the atmosphere.

The valve plug 44 has a shaft 44a, under which a rotary roller 46 is rotatably connected.

A shaft hole h41 for containing the shaft 44a of the valve plug 44 airtightly and movably up and down is provided for a main body 41a of the pulsating vibration gas generator 41.

The rotary cam 45 has an inside rotary cam 45a and an outside rotary cam 45b.

A predetermined concavo-convex pattern is formed on each one of the inside rotary cam 45a and the outside rotary cam 45b so as to have a space about the distance of the diameter of the rotary roller 46.

The rotary cam 45 which has a concavo-convex pattern suitable for mixing and dispersing a lubricant powder depending on its physical property is used.

The rotary roller 46 is rotatably inserted between the inside rotary cam 45a and the outside rotary cam 45b of the rotary cam 45.

A member shown as ax in FIG. 27 is a rotary axis of the rotary drive means such as a motor (rotary drive means 41M in FIG. 10) and the rotary cam 45 is detachably provided for the rotary axis ax.

Next, a method for supplying a positive pulsating vibration gas to the conduit T1 by means of the pulsating vibration gas generator 41 is explained.

At first, the rotary cam 45 with a concavo-convex pattern suitable for mixing and dispersing a lubricant powder depending on its physical property is attached on the rotary axis ax of the rotary drive means 47.

Then the blower 111 is driven to supply a compressed air to the conduit T0.

Oxygen ($O_2$) contained in the compressed air removed when the air passes through an oxygen removing means 112 and a noninflammable gas is generated to be supplied to the conduit Tm.

When the flow rate control valve vp4 is provided, the inflammable gas with a steady pressure supplied in the conduit Tm is supplied to the hollow chamber 42 from the air supply port 42a after being adjusted to a predetermined flow amount by the flow rate control valve vp4.

The blower 111 and the rotary drive means 47 are driven, so that the rotary cam 45 attached to the rotary axis ax of the rotary drive means 47 is rotated at a fixed rotational speed.

Accordingly, the rotary roller 46 is rotated between the inside rotary cam 45a and the outside rotary cam 45b of the rotary cam 45 which are rotated at a predetermined rotational speed in such a manner that the rotary roller 46 reproducibly moves up and down according to the concavo-convex pattern of the rotary cam 45. As a result, the valve plug 44 opens and closes the valve seat 43 according to the concavo-convex pattern formed on the rotary cam 45.

If the pressure regulating port 42c and the pressure regulating valve v8 are provided for the hollow chamber 42, the pressure of the positive pulsating vibration gas supplied to the conduit T1 is regulated by appropriately controlling the pressure regulating valve v8 provided for the pressure regulating port 42c.

Thus a positive pulsating vibration gas is fed to the conduit T1.

The wavelength of the positive pulsating vibration gas fed in the conduit T1 is properly controlled depending on the concavo-convex pattern of the rotary cam 45 and/or the rotational speed of the rotary cam 45. The wave shape of the positive pulsating vibration gas is also adjusted by the concavo-convex pattern of the rotary cam 45. The amplitude of the positive pulsating vibration gas is controlled by adjusting the driving amount of blower 111, by adjusting the pressure regulating valve vp4 if it is provided or by adjusting the pressure regulating valve v8 provided for the pressure regulating port 42c if they are provided, or by adjusting them in combination.

The pulsating vibration gas generator used for the externally lubricating type tabletting machine S isn't limited to the pulsating vibration gas generator 41 and other pulsating vibration gas generator can be used.

Figure 28:
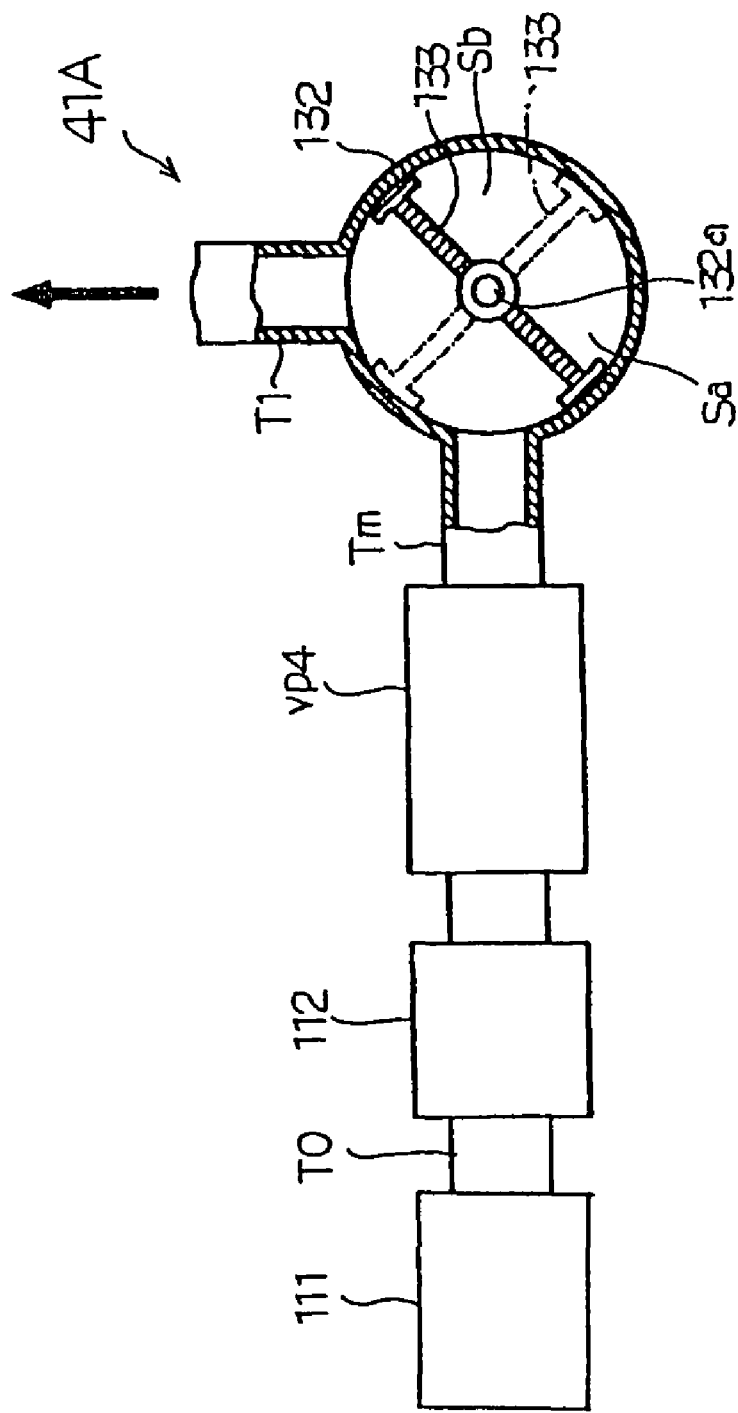
FIG. 28 is a diagrammatic sectional view showing other construction of a pulsating vibration gas generation means.

FIG. 28 is a diagrammatic sectional view showing other embodiment of a pulsating vibration gas generator.

The pulsating vibration gas generator 41A has the same construction as the pulsating vibration gas generator 41 other than the following constructions. Corresponding members have the same reference numerals and their explanations are omitted here.

The pulsating vibration gas generator 41A has a cylindrical body 132 and a rotary valve 133 attached to a rotary axis 132a consisting a center axis of the cylindrical body 132 so as to divide a hollow chamber 133 in the cylindrical body 132 into substantially two parts. The rotary axis 132a is designed to be rotated at a fixed rotational speed by a rotary drive means such as an electric motor (not shown).

Conduits Tm and T1 are connected to the external circumferential wall of the cylindrical body 132 with a fixed space.

The blower 111 is driven to supply a fixed amount of compressed air to the conduit Tm for supplying a desired positive pulsating vibration gas to the conduit T1 by means of the pulsating vibration gas generator 41A. If the flow rate control valve vp4 is provided, the flow rate of the compressed air to be fed in the conduit Tm is controlled by adjusting the flow rate control valve vp4.

The rotary axis 132a is rotated at a fixed rotational speed by the rotary driving means such as an electric motor (not shown) so that the rotary valve 133 attached to the axis 132a is rotated at a fixed speed.

Then the compressed air generated from the blower 111 is fed to the conduit T1 through the conduit Tm because the conduits Tm and T1 are communicated when the rotary valve 133 is at a position shown with solid lines in the figure.

When the rotary valve 133 is positioned as shown in imaginary lines, the conduits Tm and T1 are shut off by the rotary valve 133.

In such a case the compressed air is fed from the conduit Tm to one space Sa in the cylindrical body 132 divided by the rotary valve 133 and the air is compressed in the space Sa.

On the other hand, the compressed air stored in another space Sb in the cylindrical body 132 formed by the rotary valve 133 is fed to the conduit T1.

Repeating such operations by the rotation of the rotary valve 133, a positive pulsating vibration gas is transmitted to the conduit T5b.

Figure 29:
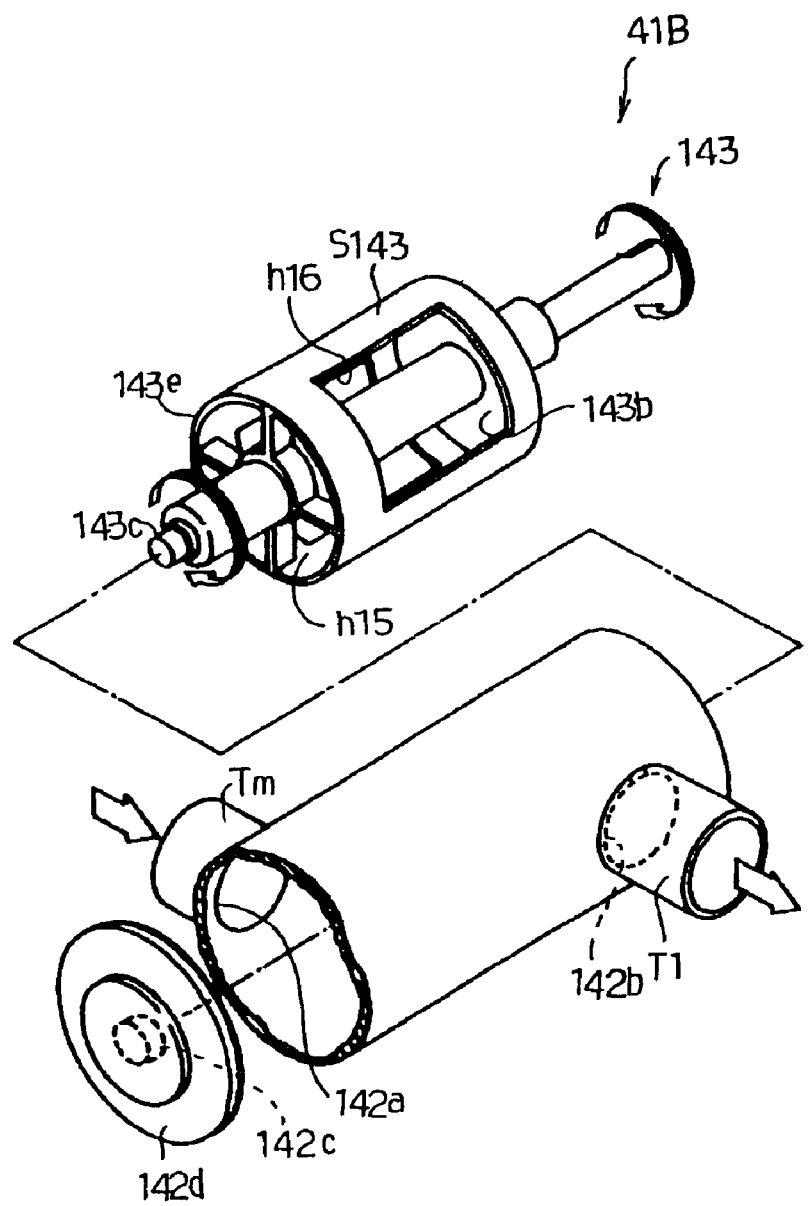
FIG. 29 is a disjoined oblique perspective view diagrammatically explaining other construction of a pulsating vibration gas generation means.

FIG. 29 is an exploded perspective view diagrammatically showing other embodiment of a pulsating vibration gas generator.

The pulsating vibration gas generator 41B has a cylindrical body 142 and a rotary valve 143 rotatably provided in the body 142.

The cylindrical body 142 is constructed such that one end 142e is opened and the other end is closed by a cover 142d and a suction port 142a and a transmission port 142b are provided for its circumferential side wall.

The conduit Tm to be connected to the blower 111 is connected to the suction port 142a and the conduit T1 to be connected to the lubricant powder discharge means 51 is connected to the transmission port 142b.

The member shown as 142c in FIG. 29 is a bearing hole for pivotally providing the rotary valve 143.

The rotary valve 143 is cylindrical with a hollow part h15 and an opening h16 is provided on its circumferential wall S143. One end 143e of the rotary valve 143 is opened and the other end is closed by the cover 143b.

A rotary axis 144 is extended in the rotary center of the rotary valve 143. Rotary drive means such as an electric motor (not shown) is connected to the rotary axis 144 and the rotary valve 143 is rotated around the rotary axis 144 when the rotary drive means (not shown) is driven.

The outer diameter of the circumferential wall S143 of the rotary valve 143 is almost the same as the inner diameter of the cylindrical body 142 in such a manner that the rotary valve 143 is contained in the cylindrical body 142 so that the circumferential wall S143 of the rotary valve 143 rubs against the inner circumference of the body 142 when the rotary valve 143 is rotated.

The member shown as 143c in FIG. 29 is a rotary axis rotatably contained in the rotary bearing hole 142c provided for the cover 142b of the cylindrical body 142.

The rotary valve 143 is rotatably provided in the cylindrical body 142 such that the rotary axis 143c is attached to the rotary bearing hole 142c.

When a desired positive pulsating vibration gas is supplied to the conduit T1 by means of the pulsating vibration gas generator 41B, a compressed air is supplied to the conduit Tm by driving the blower 111.

The rotary valve 143 is rotated at a fixed rotational speed by rotating the rotary axis 144 at a fixed rotational speed by the rotary drive means such as an electric motor (not shown).

When the opening h16 of the rotary valve 143 is positioned at the transmission port 142b, the conduits Tm and T1 are communicated so that a compressed air is fed to the conduit T1.

When the circumferential wall S143 of the rotary valve 143 is positioned at the transmission port 142b, the conduits Tm and T1 are closed by the wall S143 so that a compressed air isn't fed to the conduit T1.

Repeating such operations by the rotation of the rotary valve 143, a positive pulsating vibration gas is fed in the conduit T1.

Any one of the pulsating vibration gas generator 41 shown in FIG. 27, the pulsating vibration gas generator 41A shown in FIG. 28, and the pulsating vibration gas generator 41B shown in FIG. 29 may be used as the pulsating vibration gas generator for the externally lubricating type tabletting machine S. However, considering the decrescence property of a positive pulsating vibration gas, it is preferable to produce a positive pulsating vibration gas with clear on and off conditions from the pulsating vibration gas generator. In order to generate such a clear positive pulsating vibration gas, it is preferable to use the rotary cam type pulsating vibration gas conversion means 41 in FIG. 27 rather than the rotary type pulsating vibration gas conversion means 41A and 41B shown in FIG. 28 and FIG. 29.

Figure 30:
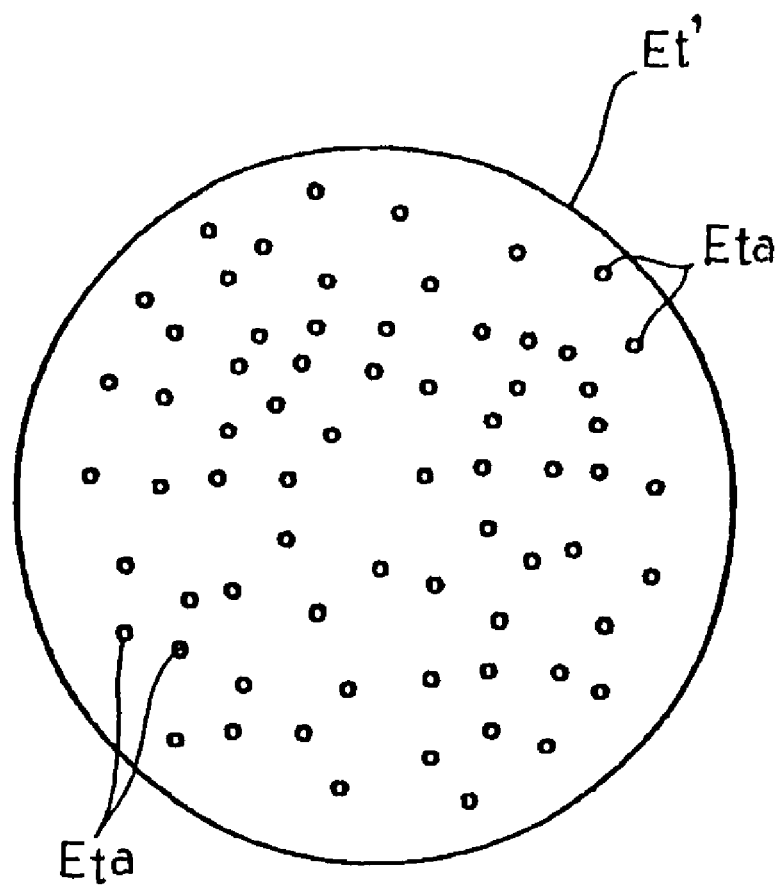
FIG. 30 is a plane view diagrammatically showing other embodiment of an elastic membrane used for a lubricant powder discharge means of an externally lubricating type tabletting machine of the present invention.

In the above-mentioned embodiment, an elastic membrane Et having one penetrating aperture Eta is explained, however, the elastic membrane isn't limited to the elastic membrane Et having one penetrating aperture Eta. An elastic membrane Et' with plural penetrating apertures Eta . . . as shown in FIG. 30 may be used.

The above-mentioned externally lubricating type tabletting machine and the method for applying a lubricant on each surface of the punches 31 and 33 and the die 32 are only preferable embodiments for producing a tablet of the present invention. Other machines or apply methods may be used as far as the minimum amount of lubricant powder can be applied on each surface of the punches 31 and 33 and the die 32.

Figure 31:
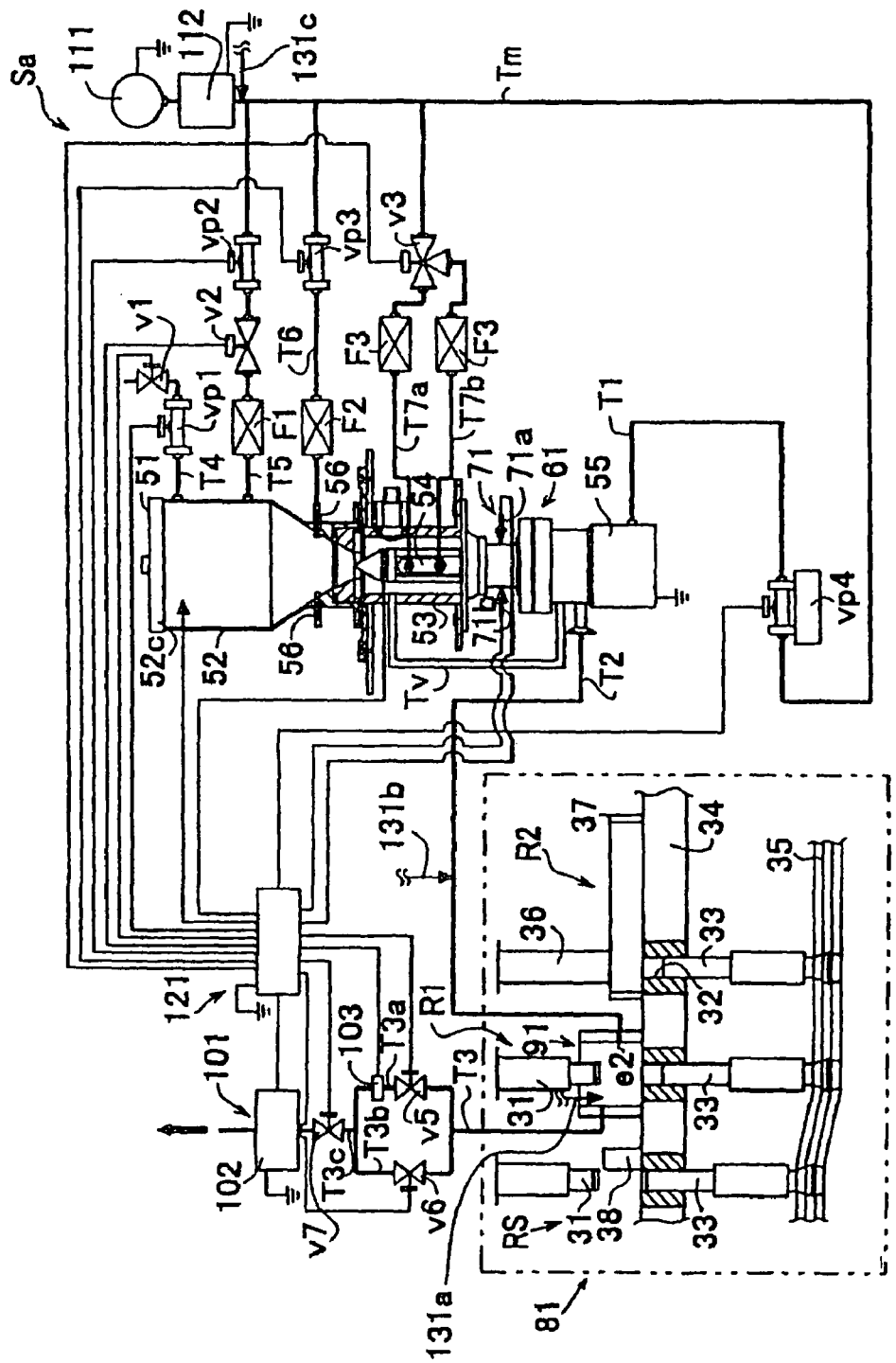
FIG. 31 diagrammatically shows the entire construction of the tablet production apparatus shown in FIG. 1.

Here the tablet production apparatus (externally lubricating type tabletting machine) Sb is mainly explained. As shown in FIG. 31 if the pulsating vibration gas generator 41 is removed from the tablet production apparatus (externally lubricating type tabletting machine) Sb, it becomes the tablet production apparatus (externally lubricating type tabletting machine) Sa shown in FIG. 1. As shown in FIG. 32, if the oxygen removing means 112 and the pulsating vibration gas generator 41 are removed and the noninflammable gas generator 111a is provided instead of the blower 111, it becomes the tablet production apparatus (externally lubricating type tabletting machine) Sc shown in FIG. 8.

Figure 33:
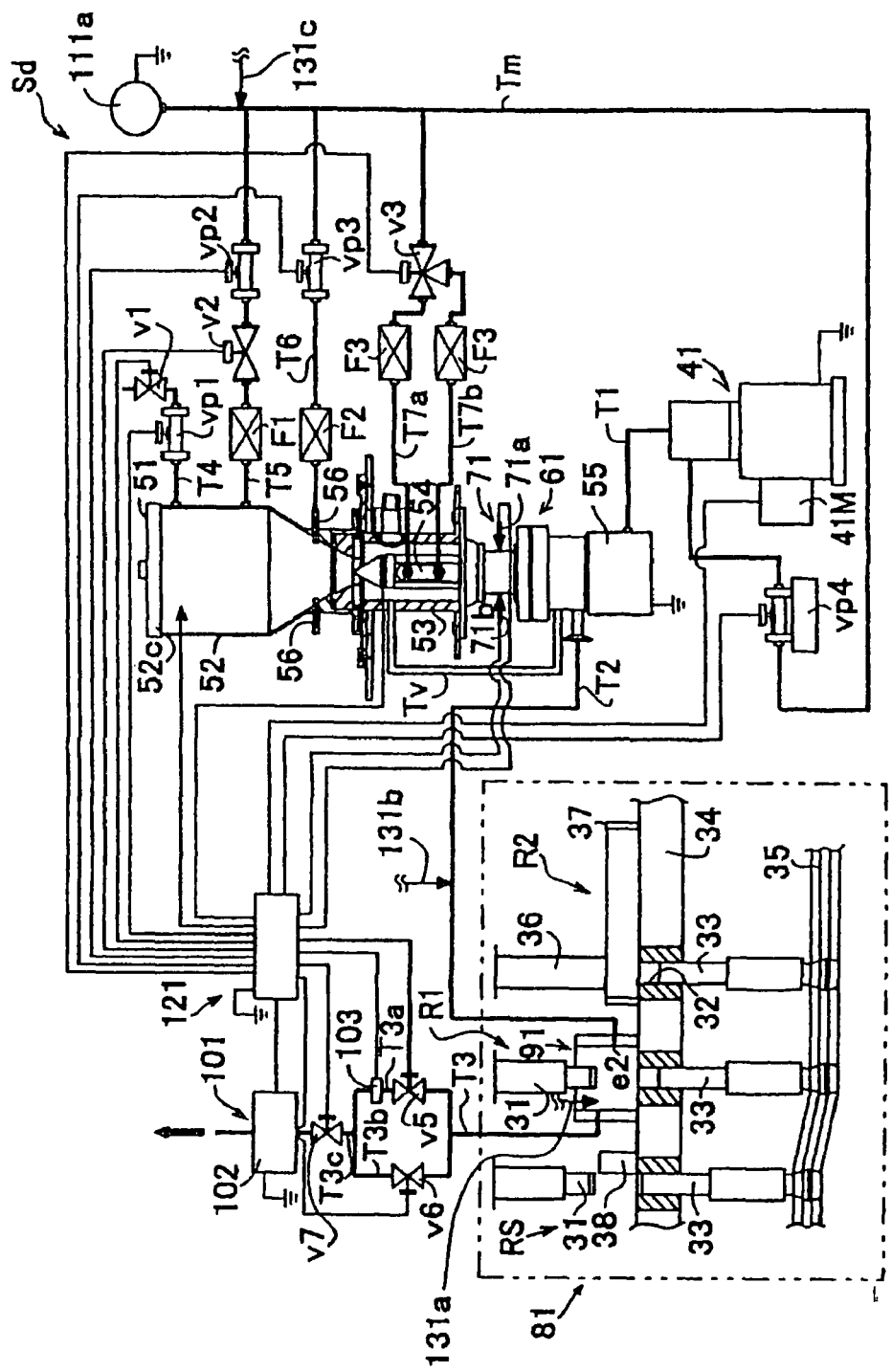
FIG. 33 diagrammatically shows the entire construction of the tablet production apparatus shown in FIG. 9.

As shown in FIG. 33, if the noninflammable gas generator 111a is provided instead of the blower 111 and the oxygen removing means 112 is removed, it becomes the tablet production apparatus (externally lubricating type tabletting machine) Sd shown in FIG. 9.

Figure 34:
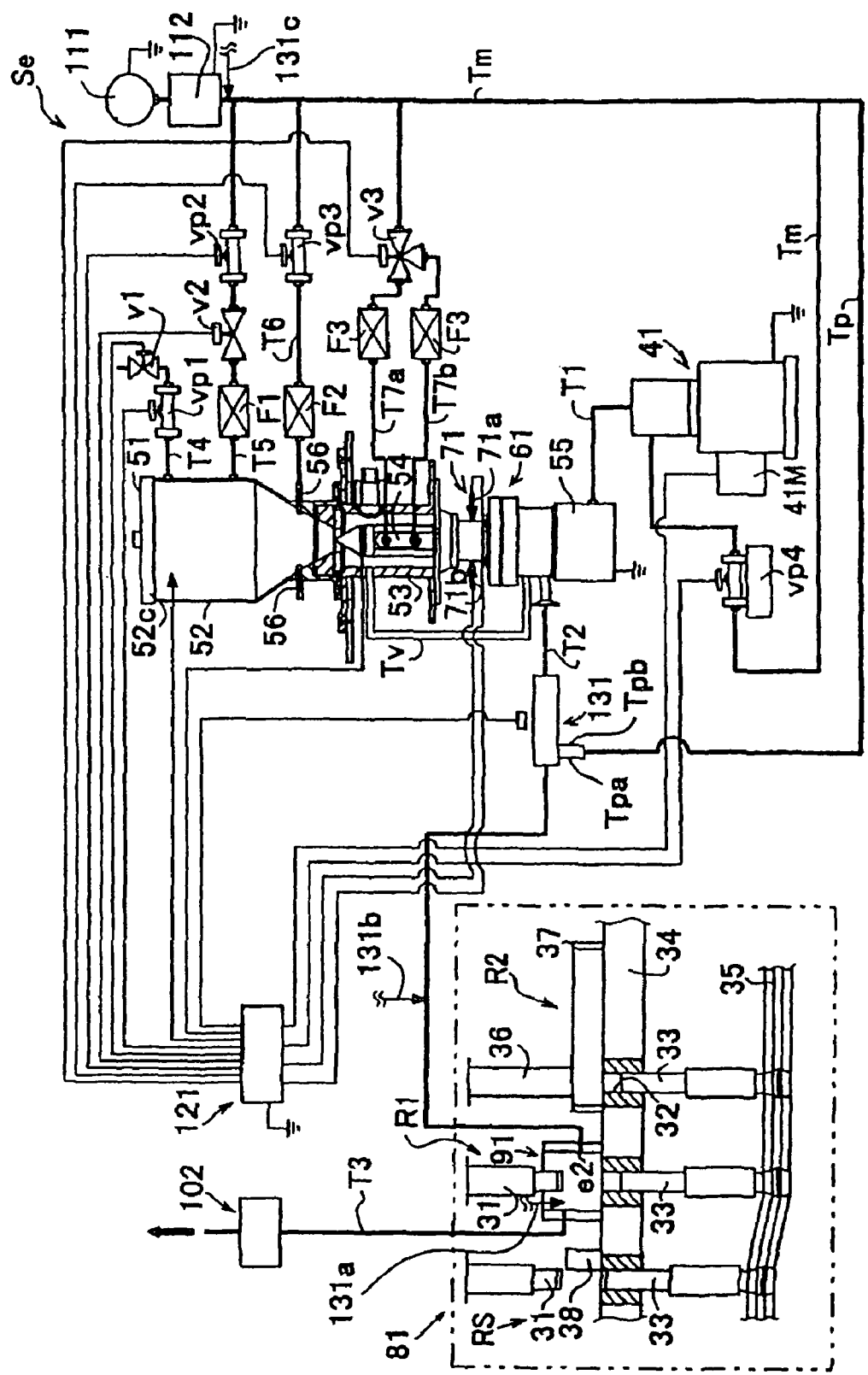
FIG. 34 shows the entire construction diagrammatically showing other embodiment of a tablet production apparatus according to the present invention.

FIG. 34 shows the entire construction diagrammatically showing other embodiment of a tablet production apparatus according to the present invention.

The tablet production apparatus Se has the same construction as that of the tablet production apparatus Sa in FIG. 31, therefore the same members have the same corresponding reference numerals as the apparatus Sa and their explanations are omitted here.

According to the tablet production apparatus Se as shown in FIG. 34, the suction means (dust collector 102) is attached to the suction duct 103 and the apparatus Se has the suction means (dust collector 102) and the spray amount measuring means 131 for measuring the lubricant powder concentration at an optional position from the lubricant powder discharge means 51 (more specifically the discharge port 55b of the dispersion chamber 55).

Figure 35:
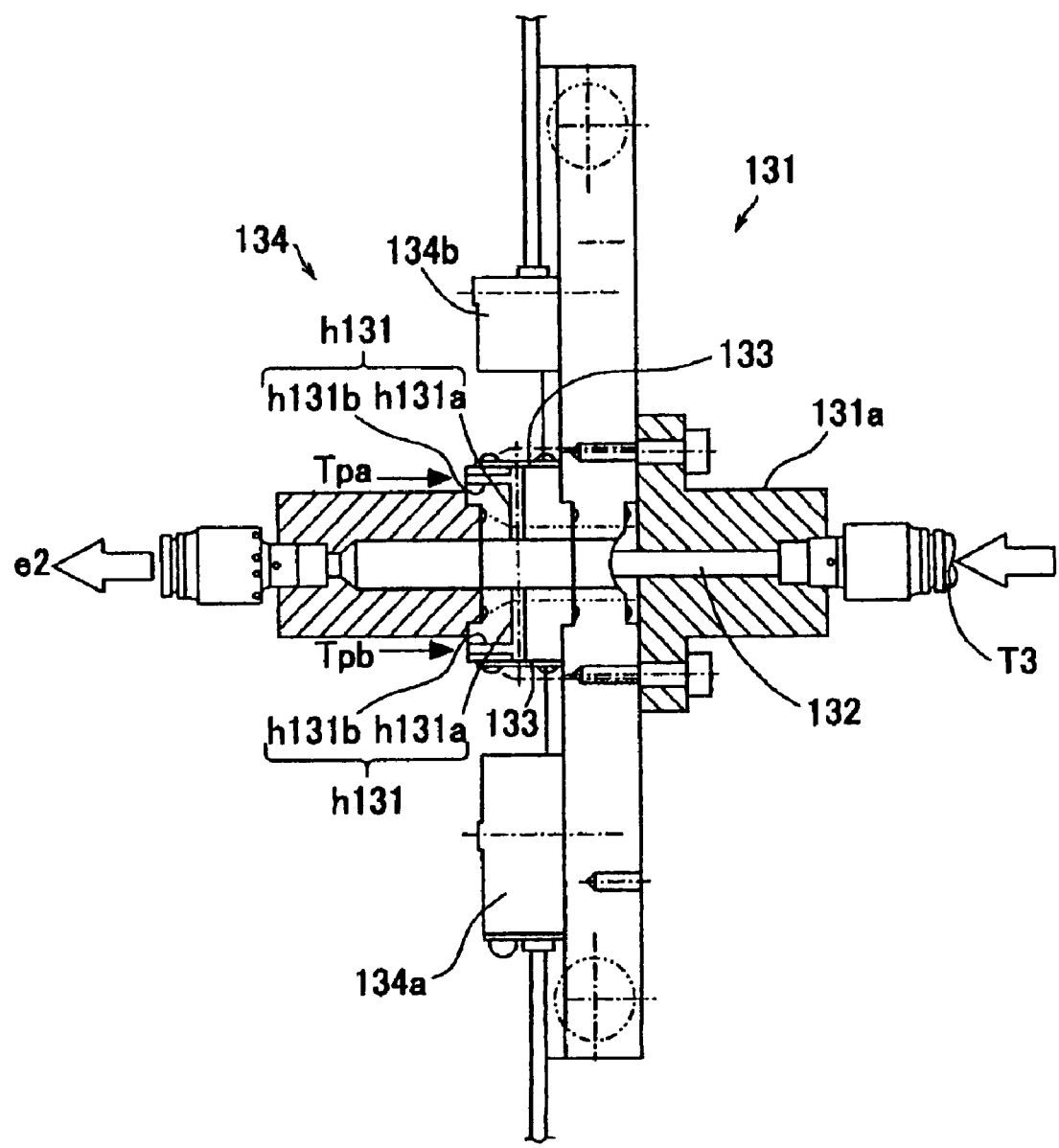
FIG. 35 diagrammatically shows the construction of a spray amount measuring means shown in FIG. 34.
Figure 36:
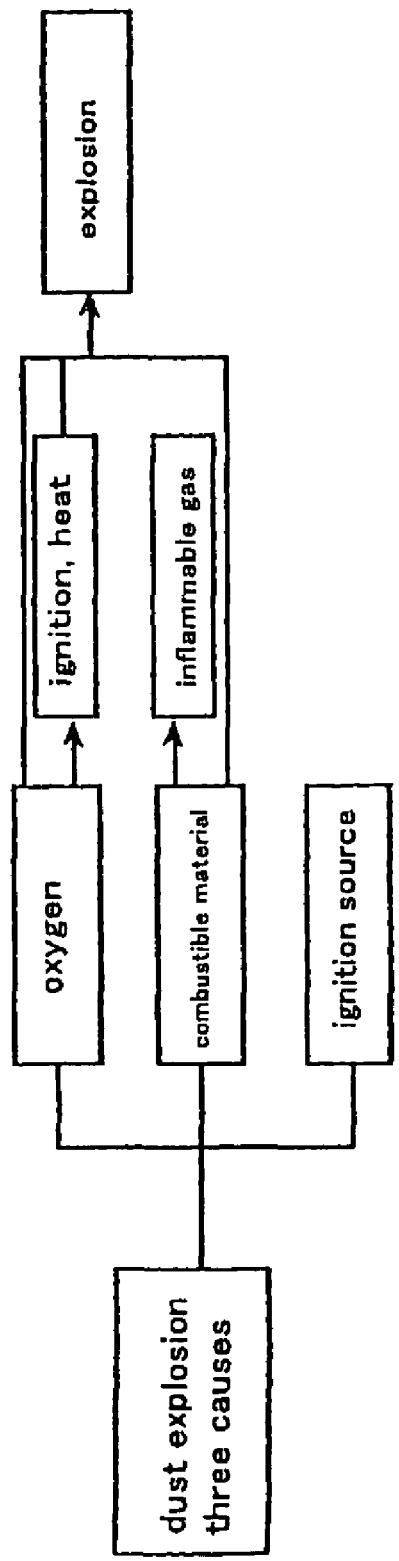
FIG. 36 shows characteristic causes explaining the factor to cause a dust explosion.

FIG. 35 diagrammatically shows the construction of a spray amount measuring means 131.

The spray amount measuring means 131 has a body 131a, a lubricant powder supply pipe 132 connected to a conduit T2, and a laser beam emitting system 134a and a laser beam receiving system 105b.

In this embodiment, a laser beam emitting system 105 and a scattering light receiving system 134b are opposed so as to intervene the lubricant powder supply pipe 132.

The spray amount measuring means 131 also has purge gas supply pipes h131, h131.

Each one of the purge gas supply pipes h131, h131 has light permeable pipes h131a, h131a and gas supply pipe h131b, h131b respectively.

Each light permeable pipe h131a, h131a is provided so as to penetrate the body 131a and light permeable windows 133, 133 are provided for the external surface of the body 131a respectively.

Each gas supply pipe h131b, h131b is connected in the midstream of the light permeable pipes h131a, h131a respectively.

A purge gas supply pipe (purge gas supply pipe Tp in FIG. 34) which is branched from the conduit Tm is connected to each gas supply pipe h131b, h131b.

In the spray amount measuring means 131, the amount of powder material (lubricant powder in this embodiment) running in the lubricant powder supply pipe 132 is measured at where light permeable pipes h131a, h131a are provided.

In the tablet production apparatus Se, the lubricant powder concentration running in the lubricant powder supply pipe 132 is observed by the spray amount measuring means 131 and the amount of lubricant powder is also observed. The lubricant concentration is calculated from the suction flow amount and the lubricant powder amount in the controller 121. If the calculated lubricant powder concentration reaches its lower explosion limit, the lubricant powder amount mixed and dispersed with the gas generated from the gas generator 111 is controlled to be under the lower explosion limit concentration so as to prevent a dust explosion.

Further the lubricant powder concentration fed in the suction means (dust collector 102) is arranged to be under the lower explosion limit, thereby preventing a dust explosion in the suction means (dust collector 102).

In the tablet production apparatus Se shown in FIG. 34, a blower 111 is used as a gas generator 111 in such a manner that the oxygen contained in the compressed air generated from the blower 111 is removed by the oxygen removing means 112. However, instead of the blower 111 and the oxygen removing means 112, a noninflammable gas generation means 111a may be provided like the tablet production apparatus Sd in FIG. 33.

INDUSTRIAL APPLICABILITY

According to one embodiment of the tablet production method of the present invention, the lubricant powder is discharged in the gas depending on the gas to be mixed and dispersed together so that a fixed amount of lubricant powder can be mixed and dispersed with a fixed amount of gas as far as the gas to be mixed and dispersed with the lubricant powder is constant. Thus, according to the tablet production method, the lubricant powder with a constant concentration is always supplied to the lubricant application means, enabling constant application of a fixed amount of lubricant powder on each material contacting surface of the die, the upper punch and the lower punch. Because of applying a fixed amount of lubricant powder on the material contacting surfaces of the die and the punches, once the gas generation amount (flow amount, pressure and so on) to be mixed and dispersed with the lubricant powder is determined so as to make the lubricant powder amount applied on the material contacting surfaces thereof most suitable, the amount of lubricant powder applied on the surfaces can be kept most appropriately by making the gas generation amount constant. As the result, once the gas generation amount (flow amount, pressure and so on) to be mixed and dispersed with the lubricant powder is controlled so as not to cause tabletting problems such as sticking, capping and laminating and not to generate griding between the die, the upper punch and the lower punch, tablets are stably produced for a long time only by keeping the gas generation amount constant without causing the tabletting problems and the griding. As mentioned above, the tablet production method is suitable for producing tablets (externally lubricated tablets) at a profitable industrial production base.

In addition, according to the tablet production method, the oxygen concentration in the transporting system from the gas generation means to the lubricant application means is under the oxygen concentration of lower explosion limit, preventing a dust explosion in the transporting system.

Further, according to the tablet production method, if the oxygen concentration contained in the gas around the lubricant application means is under the oxygen concentration of lower explosion limit, preventing a dust explosion around the lubricant application means.

In the other embodiment of the tablet production method of the present invention, the oxygen concentration in the transporting system from the gas generation means to the lubricant application means is equal to or less than 14% so that a dust explosion isn't caused in the transporting system. And/or the oxygen concentration included in the gas around the lubricant application means is equal to or less than 14%, thus preventing a dust explosion therearound.

In the other embodiment of the production method according to the present invention, supposing the oxygen concentration of lower explosion limit is equal to or less than 14%, the oxygen concentration contained in the gas existing in the transporting system from the gas generation means to the lubricant application means and/or around the lubricant application means is set to be equal to or less than 8% in order to clear the static safety guide by the National Institute of Industrial Safety in the tablet production method, thereby preventing dust explosion.

The other embodiment of the tablet production method according to the present invention comprises the gas generating step, the lubricant dispersing step and the tabletting step like the method mentioned above. Therefore, this production method is also suitable for a production method of a tablet (externally lubricated tablet) at an industrial production base like the above-mentioned method.

In addition, the lubricant powder concentration in the suction means at the surplus lubricant powder sucking step is set to be under the concentration of lower explosion limit, thereby preventing a dust explosion in the suction means.

According to the other embodiment of the tablet production method of the present invention, the concentration of the lubricant powder is set under the lower explosion limit namely equal to or under 70 g/m$^3$, more preferably equal to or under 50 g/m$^3$ in the suction means at the surplus lubricant sucking step, thereby preventing a dust explosion in the suction means.

In the other embodiment of the tablet production method of the present invention, a noninflammable gas is used as a supply gas to the lubricant powder discharge means at the lubricant dispersing step so that a dust explosion isn't happened at all in a place (in the instrument) where the gas mixed and dispersed with the lubricant powder doesn't admix with air.

In the other embodiment of the tablet production method of the present invention, a pulsating vibration gas is used as a supply gas to the lubricant powder discharge means at the lubricant dispersing step. Further the lubricant powder discharge means for discharging a lubricant powder into the gas depending on the gas to be mixed and dispersed with the gas is used as a lubricant powder discharge means. Therefore, when the pulsating vibration gas is used as a supply gas to the lubricant powder discharge means, the amount of lubricant powder discharged from the lubricant powder discharge means depends on the frequency, amplitude and wave shape of the pulsating vibration gas. According to this tablet production method, when the frequency, amplitude and wave shape of the pulsating vibration gas are constant at the lubricant dispersing step, a fixed amount of lubricant powder is designed to be always mixed and dispersed with a fixed amount of gas, thereby enabling to supply the lubricant powder with a constant concentration to the lubricant application means. Thus the lubricant powder with a constant concentration is always supplied to the lubricant application means so that a fixed amount of lubricant powder can be always applied on each material contacting surface of the die, the upper punch and the lower punch. Namely, a fixed amount of lubricant powder can be applied on those material contacting surfaces with this tablet production method. When the frequency, amplitude and wave shape of the pulsating vibration gas are once determined in such a manner that the amount of lubricant powder to be applied on the material contacting surfaces is designed to be most appropriate, the appropriate amount of lubricant powder applied on the surfaces can be kept only by keeping the frequency, amplitude and wave shape of the pulsating vibration gas constant. As the result, according to this tablet production method, once the frequency, amplitude and wave shape of the pulsating vibration gas is once controlled in such a manner that the lubricant powder amount to be applied on each material contacting surface of the die, the upper punch and the lower punch is adjusted so as not to cause tabletting problems such as sticking, capping and laminating and not to cause griding between the die and the punches, then tablets can be stably produced for a long time without causing such tabletting problems for the produced tablets and griding between the die and punches only by keeping the frequency, amplitude and wave shape of the pulsating vibration gas and also keeping the constant amount of lubricant powder to be applied on the material contacting surfaces of the die and punches. Therefore, a tablet (externally lubricated tablet) can be produced with this production method at an industrial production base.

In the other embodiment of the tablet production method of the present invention, the antistatic means is further provided for any one of the above mentioned methods, thereby preventing sparks caused by static electricity. Therefore, a dust explosion isn't happened in this tablet production method.

The other embodiment of the tablet production apparatus according to the present invention uses the lubricant powder discharge means for discharging the lubricant powder into the gas depending on the gas generated from the gas generator to be mixed and dispersed so that a fixed amount of lubricant powder can be mixed and dispersed in a fixed amount of gas (flow amount, pressure and so on) as far as keeping the gas generation amount (flow amount, pressure and so on) constant.

Thus the lubricant powder with a constant concentration is always supplied to the lubricant application means, enabling a constant application of a fixed amount of lubricant powder on each material contacting surface of the die, the upper punch and the lower punch.

As the result, a fixed amount of lubricant powder can be applied on the material contacting surfaces of the die and punches with this production apparatus. Once the gas generation amount (flow amount, pressure and so on) generated from the gas generator is determined so as to make the lubricant powder amount applied on the material contacting surfaces thereof most suitable, the amount of lubricant powder applied on the surfaces can be kept most appropriately by making the gas generation amount (flow amount, pressure and so on) constant.

Further, once the gas generation amount (flow amount, pressure and so on) generated from the gas generator is controlled so as not to cause tabletting problems such as sticking, capping and laminating and not to generate griding between the die, the upper punch and the lower punch, tablets are stably produced for a long time only by keeping the gas generation amount (flow amount, pressure and so on) constant without causing the tabletting problems and the griding. As mentioned above, the tablet production method is suitable for producing tablets (externally lubricated tablets) at an industrial production base.

In addition, according to the tablet production method, the gas amount generated from the gas generator is controlled based on the oxygen concentration measured by the oxygen concentration measuring means.

Therefore, when a noninflammable gas is generated from the gas generation means, air in the space in the transporting system from the gas generation means to the lubricant application means and air (normal air including oxygen) around the lubricant application means are exchanged with the noninflammable gas.

If all or a part of the air in the space in the transporting system from the gas generation means to the lubricant application means and/or all or a part of the air (normal air including oxygen) around the lubricant application means are exchanged with the noninflammable gas to reduce the oxygen amount in the gas existing in those spaces, a dust explosion is prevented in the space in the lubricant application means, in the space between the lubricant spray port for upper punch of the lubricant application means and the material contacting surface of the upper punch, or in the space formed by the lubricant spray port for lower punch of the lubricant application means, the die and the lower punch inserted in a predetermined position in the die.

Namely, this tablet production apparatus is constructed such that the gas amount generated from the gas generator is controlled based on the oxygen concentration measured by the oxygen concentration measuring means so that the oxygen amount contained in the gas existing in the space in the transporting system from the gas generation means to the lubricant application means and the oxygen amount contained in the gas existing in the space around the lubricant application means are reduced. Therefore, a dust explosion is prevented from causing in those spaces.

In other embodiment of the tablet production apparatus of the present invention, the oxygen concentration in the gas in the transporting system from the gas generation means to the lubricant application means and/or around the lubricant application means is equal to or less than the oxygen concentration of lower explosion limit by the gas amount generated from the gas generation means, thereby preventing a dust explosion in the transporting system or around the lubricant application means.

In other embodiment of the tablet production apparatus of the present invention, the oxygen concentration in the transporting system from the gas generation means to the lubricant application means and/or around the lubricant application means is defined to be equal to or less than the oxygen concentration of lower explosion limit, namely 14%, thereby preventing a dust explosion in the transporting system and/or around the lubricant application means.

In other embodiment of the tablet production apparatus according the present invention, supposing the oxygen concentration of lower explosion limit is equal to or less than 14%, the oxygen concentration contained in the gas existing in the transporting system from the gas generation means to the lubricant application means and/or around the lubricant application means is set to be equal to or less than 8% in order to clear the static safety guide by the National Institute of Industrial Safety in the tablet production apparatus, thereby preventing a dust explosion in the transporting system and/or around the lubricant application means.

According to other embodiment of the tablet production apparatus of the present invention, the lubricant powder sprayed from the lubricant application means is immediately sucked by means of the suction means. Therefore, the lubricant powder sprayed from the lubricant spray port for upper punch of the lubricant application means to the material contacting surface of the upper punch doesn't scatter around the lubricant application means, thereby preventing a dust explosion around the lubricant application means.

In addition, the lubricant powder concentration to be supplied in the suction means (more specifically in the suction duct of the suction means) is controlled based on the lubricant powder concentration measured by the lubricant powder concentration measuring means. Hence, the lubricant powder concentration to be supplied in the suction means (more specifically in the suction duct of the suction means) is set to be equal to or under the lower explosion limit concentration, preventing a dust explosion in the suction means (more specifically in the suction duct of the suction means).

In other embodiment of the tablet production apparatus of the present invention, because the lubricant powder concentration to be supplied into the suction means (more specifically in the suction duct of the suction means) is equal to or less than the lower explosion limit concentration so that a dust explosion isn't caused in the suction means (more specifically in the suction duct of the suction means).

According to other embodiment of the tablet production apparatus of the present invention, the lubricant powder concentration to be supplied into the suction means is set under the lower explosion limit of the lubricant powder, namely equal to or under 70 g/m$^3$, more preferably equal to or under 50 g/m$^3$. Therefore, when a tablet is produced with this production apparatus, a dust explosion is prevented in the suction means (more specifically in the suction duct of the suction means).

In other embodiment of the tablet production apparatus of the present invention, the noninflammable gas is generated from the gas generation means as the gas to be mixed and dispersed with the lubricant powder, preventing a dust explosion in the transporting system from the gas generation means to the lubricant application means.

In other embodiment of the tablet production apparatus of the present invention, the pulsating vibration gas is used as a supply gas to be mixed and dispersed with the lubricant powder and the amount of lubricant powder to be mixed and dispersed with the gas depends on the frequency, amplitude and wave shape of the pulsating vibration gas.

According to this tablet production method, when the frequency, amplitude and wave shape of the pulsating vibration gas used for mixing and dispersing with the lubricant powder are constant and a fixed amount of lubricant powder are designed to be always mixed and dispersed with a fixed amount of gas, thereby enabling to supply the lubricant powder with a constant concentration to the lubricant application means.

Thus the lubricant powder with a constant concentration is always supplied to the lubricant application means so that a fixed amount of lubricant powder can be always applied on each material contacting surface of the die, the upper punch and the lower punch.

Namely, a fixed amount of lubricant powder can be applied on the material contacting surfaces of the dies, the upper punches and the lower punches with this tablet production method. Once the frequency, amplitude and wave shape of the pulsating vibration gas is determined in such a manner that the amount of lubricant powder to be applied on the material contacting surfaces makes most appropriate, the appropriate amount of lubricant powder applied on the surfaces can be kept only by keeping the frequency, amplitude and wave shape of the pulsating vibration gas constant.

As the result, according to this tablet production apparatus, the frequency, amplitude and wave shape of the pulsating vibration gas are once controlled in such a manner that the lubricant powder amount to be applied on each material contacting surface of the die, the upper punch and the lower punch is adjusted so as not to cause tabletting problems such as sticking, capping and laminating and not to cause griding between the die and the punches. Thereafter, tablets can be stably produced for a long time without causing such tabletting problems for the produced tablets and griding between the die and punches only by keeping the frequency, amplitude and wave shape of the pulsating vibration gas and also keeping the appropriate amount of lubricant powder to be applied on the material contacting surfaces of the die and punches.

Therefore, a tablet (externally lubricated tablet) can be produced with this production method at an industrial production base.

In other embodiment of the tablet production apparatus according to the present invention, the lubricant powder concentration is observed by the spray amount measuring means. The lubricant powder concentration is calculated from the lubricant amount and the suction amount. When the result reaches its lower explosion limit concentration, the lubricant powder amount mixed and dispersed with the gas generated from the gas generator is controlled so as to be under the lower explosion limit concentration, thereby preventing a dust explosion.

In the tablet production apparatus of the present invention, the concentration of the lubricant powder supplied into the suction means is equal to or less than the lower explosion limit concentration, thereby preventing a dust explosion in the suction means.

In other embodiment of the tablet production apparatus of the present invention, the concentration of the lubricant powder to be supplied in the suction means is set to be equal to or under the lower explosion limit concentration of the lubricant powder, namely equal to or less than 70 g/m$^3$, more preferably equal to or under 50 g/m$^3$. Therefore, when a tablet is produced with the production apparatus, a dust explosion is prevented in the suction means (more specifically in the suction duct of the suction means).

In other embodiment of the tablet production apparatus of the present invention, the noninflammable gas is generated from the gas generator so that a dust explosion isn't caused at all in a place (instrument) where the gas mixing and dispersing the lubricant powder doesn't mix with air.

In other embodiment of the tablet production apparatus of the present invention, when the frequency, amplitude and wave shape of the pulsating vibration gas to be supplied in the lubricant powder discharge means are constant at the lubricant dispersing step, a fixed amount of lubricant powder is always mixed and dispersed with a fixed amount of gas, thereby achieving the above-mentioned corresponding production method.

In other the tablet production apparatus of the present invention, the antistatic means is provided so as not to cause sparks derived from static electricity, thereby preventing sparks caused by static electricity.

Thus, such a tablet production apparatus doesn't generate a dust explosion while producing a tablet.

The invention claimed is:

1. A tablet production apparatus comprising:
 a gas generator for generating a nonflammable gas;
 a lubricant powder discharge means for discharging a lubricant powder into a gas generated from said gas generator for mixing said lubricant powder;
 a lubricant application means for spraying said lubricant powder onto each material contacting surface of a die, an upper punch and a lower punch;
 a suction means for sucking thereinto said lubricant powder sprayed from said lubricant application means;
 a spray amount measuring means for measuring the lubricant powder concentration at an optional point from said lubricant powder discharge means to said lubricant application means; and
 an antistatic means,
 whereby the flow amount to be sucked into said suction means is adjusted based on the lubricant powder concentration calculated from the amount of said lubricant powder measured by said spray amount measuring means and the flow amount sucked into said suction means to make the concentration of said lubricant powder in the suction means equal to or less than 30 $g/m^3$.

2. The tablet production apparatus as set forth in claim 1 wherein said gas generator generates a pulsating vibration gas therefrom.

* * * * *